US006947220B1

(12) United States Patent
Soskind

(10) Patent No.: US 6,947,220 B1
(45) Date of Patent: Sep. 20, 2005

(54) DEVICES FOR INFORMATION PROCESSING IN OPTICAL COMMUNICATIONS

(75) Inventor: Yakov G. Soskind, Plainsboro, NJ (US)

(73) Assignee: KSM Associates, Inc., Cincinnati, OH (US)

(*) Notice: Subject to any disclaimer, the term of this patent is extended or adjusted under 35 U.S.C. 154(b) by 260 days.

(21) Appl. No.: 10/130,141

(22) PCT Filed: Nov. 21, 2000

(86) PCT No.: PCT/US00/31969

§ 371 (c)(1),
(2), (4) Date: May 16, 2002

(87) PCT Pub. No.: WO01/45429

PCT Pub. Date: Jun. 21, 2001

Related U.S. Application Data
(60) Provisional application No. 60/166,779, filed on Nov. 22, 1999, and provisional application No. 60/188,496, filed on Mar. 10, 2000.

(51) Int. Cl.$^7$ .......................... G02B 27/30; G02B 27/14
(52) U.S. Cl. .......................... 359/641; 359/637; 385/7; 385/21
(58) Field of Search ................... 359/641, 637; 385/7, 21, 24, 33, 37, 16

(56) References Cited

U.S. PATENT DOCUMENTS

| | | | |
|---|---|---|---|
| 3,924,931 A | * 12/1975 | Cheo | .................. 385/8 |
| 4,355,864 A | * 10/1982 | Soref | .................. 385/18 |
| 4,474,424 A | 10/1984 | Wagner | .................. 385/24 |

(Continued)

FOREIGN PATENT DOCUMENTS

| | | |
|---|---|---|
| WO | WO 96/07114 | 3/1996 |
| WO | WO 99/30196 | 6/1999 |
| WO | WO 00/13048 | 3/2000 |

OTHER PUBLICATIONS

*Handbook of Optics*, Michael Bass, editor in chief, 2nd edition, McGraw–Hill, Inc., New York, NY, 1995, vol. 1, p. 32.15.
*Handbook of Optics*, 2nd edition, Michael Bass, editor in chief, McGraw–Hill, Inc., New York, NY, 1995, vol. 2, pp. 6.8–6.12.
*The Photonics Dictionary*, 44th edition, Laurin Publishing Company, Inc., Pittsfield, MA, 1998, pp D–57 and D–51.
N. Borrelli, *Microoptics Technology: Fabrication and Applications of Lens Arrays and Devices*, Marcel Dekker, NewYork, NY, 1999, pp 107–136.
M. Born and E. Wolf, *Principles of Optics*, 6th Ed. Pergamon Press, New York, NY, 1993, pp. 383–386 and 392–401.
Cheo, P.K., "Pulse amplitude modulation of a $CO_2$ laser in an electro–optic thin–film waveguide," *Appl. Phys. Lett*. Mar. 1973, 22:241–244.
W. J. Smith, *Modern Optical Engineering*, McGraw–Hill, Inc., New York, NY, 1990, p. 152.

*Primary Examiner*—Timothy Thompson

(74) *Attorney, Agent, or Firm*—Maurice M. Klee

(57) ABSTRACT

Devices and methods for information processing in optical communications are provided. In its simplest embodiments, collimated light (1) passes through a non-grating diffractive structure (2) and a lens (3). The light is spatially processed in the focal plane (4) of the lens (3). Thereafter, the light can, for example, be coupled into a fiber or detector array (5).

72 Claims, 99 Drawing Sheets

U.S. PATENT DOCUMENTS

| | | |
|---|---|---|
| 4,786,131 A | 11/1988 | Mahapatra et al. ............ 385/46 |
| 4,813,756 A | 3/1989 | Frenkel et al. ................. 385/73 |
| 4,904,042 A | 2/1990 | Dragone ....................... 385/46 |
| 4,950,045 A | 8/1990 | Bricheno et al. ............... 385/3 |
| 5,002,350 A | 3/1991 | Dragone ....................... 385/24 |
| 5,206,920 A | 4/1993 | Cremer et al. ................. 385/37 |
| 5,212,758 A | 5/1993 | Adar et al. ................... 385/129 |
| 5,226,100 A | 7/1993 | Maerz .......................... 385/45 |
| 5,243,672 A | 9/1993 | Dragone ....................... 385/46 |
| 5,333,117 A | 7/1994 | Ha et al. ..................... 708/191 |
| 5,351,317 A | 9/1994 | Weber ........................... 385/3 |
| 5,461,685 A | 10/1995 | Glance et al. ................. 385/24 |
| 5,467,418 A | 11/1995 | Dragone ....................... 385/37 |
| 5,497,234 A * | 3/1996 | Haga ........................... 356/613 |
| 5,636,300 A | 6/1997 | Keck et al. ................... 385/24 |
| 5,784,507 A | 7/1998 | Holm-Kennedy et al. .... 385/31 |
| 5,841,583 A | 11/1998 | Bhagavatula ................ 359/577 |
| 5,862,279 A | 1/1999 | Amersfoort et al. .......... 385/40 |
| 5,891,747 A | 4/1999 | Farah .......................... 438/31 |
| 5,917,625 A | 6/1999 | Ogusu et al. ................. 385/24 |
| 5,930,441 A | 7/1999 | Betts et al. ................. 385/140 |
| 6,097,859 A | 8/2000 | Solgaard et al. .............. 385/17 |
| 6,108,471 A | 8/2000 | Zhang et al. ................. 385/37 |
| 6,137,930 A | 10/2000 | Laughlin ...................... 385/34 |
| 6,157,488 A | 12/2000 | Ishii ........................... 359/569 |
| 6,282,336 B1 * | 8/2001 | Riza ............................ 385/21 |
| 6,462,874 B1 | 10/2002 | Soskind ....................... 359/565 |

\* cited by examiner

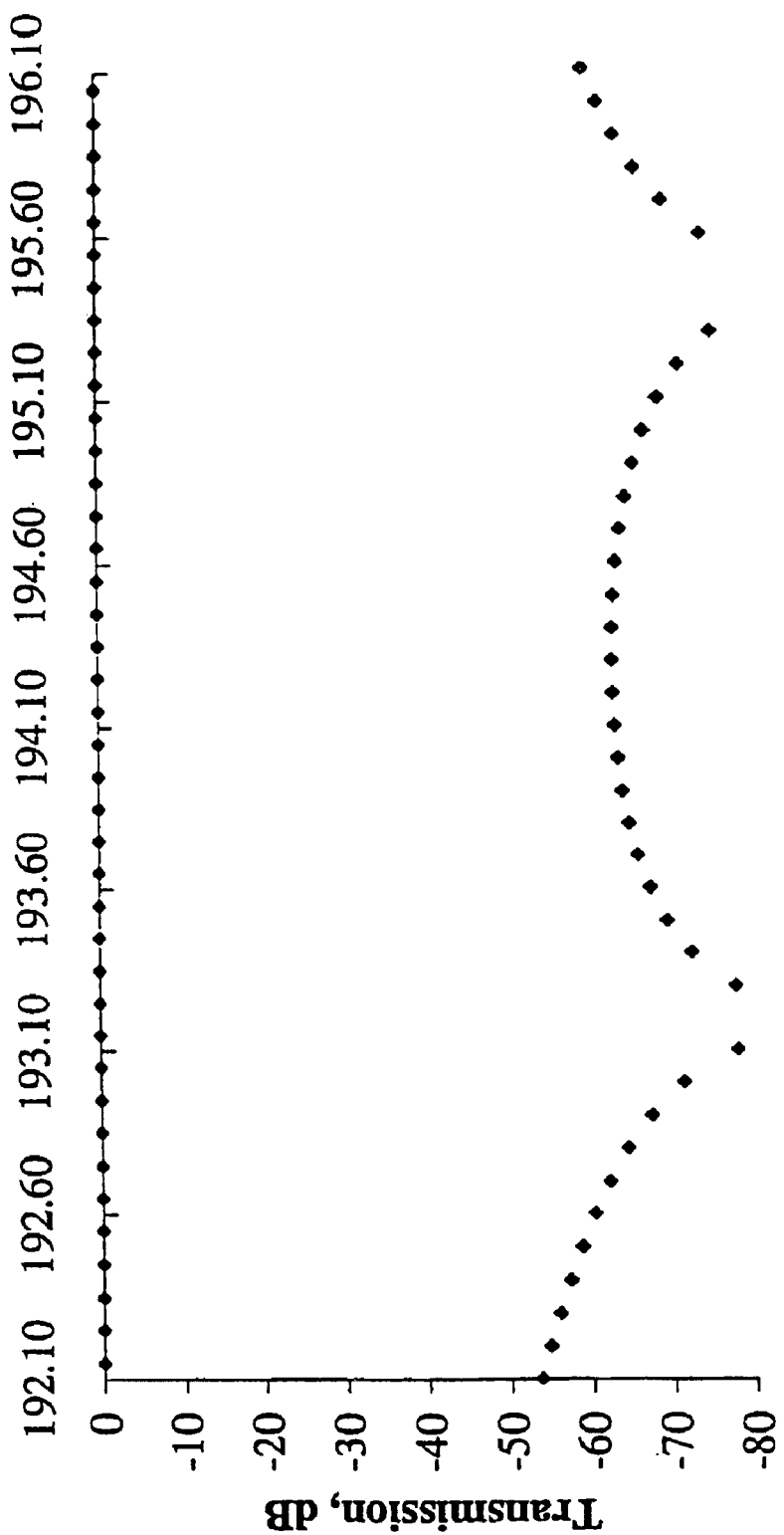

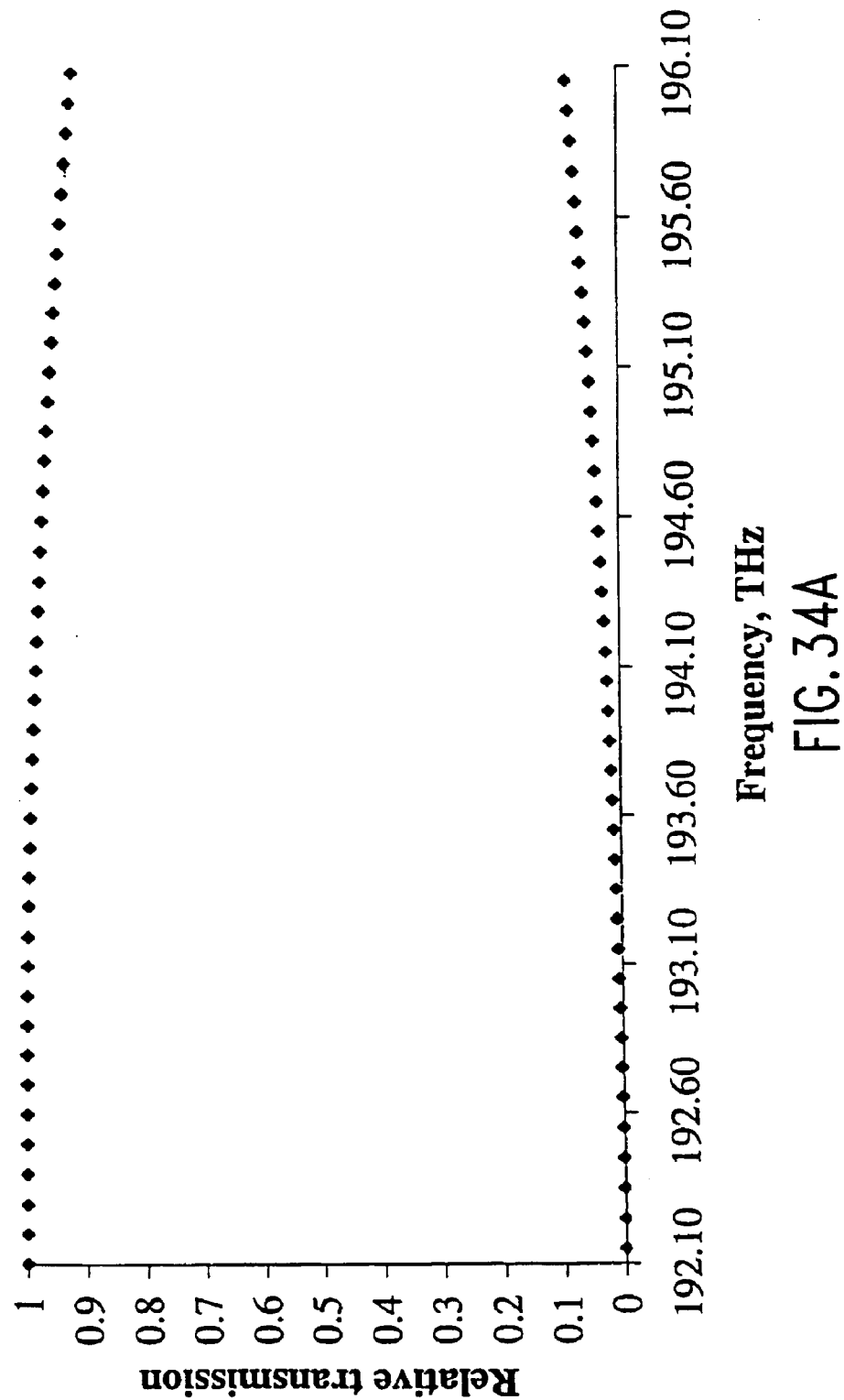

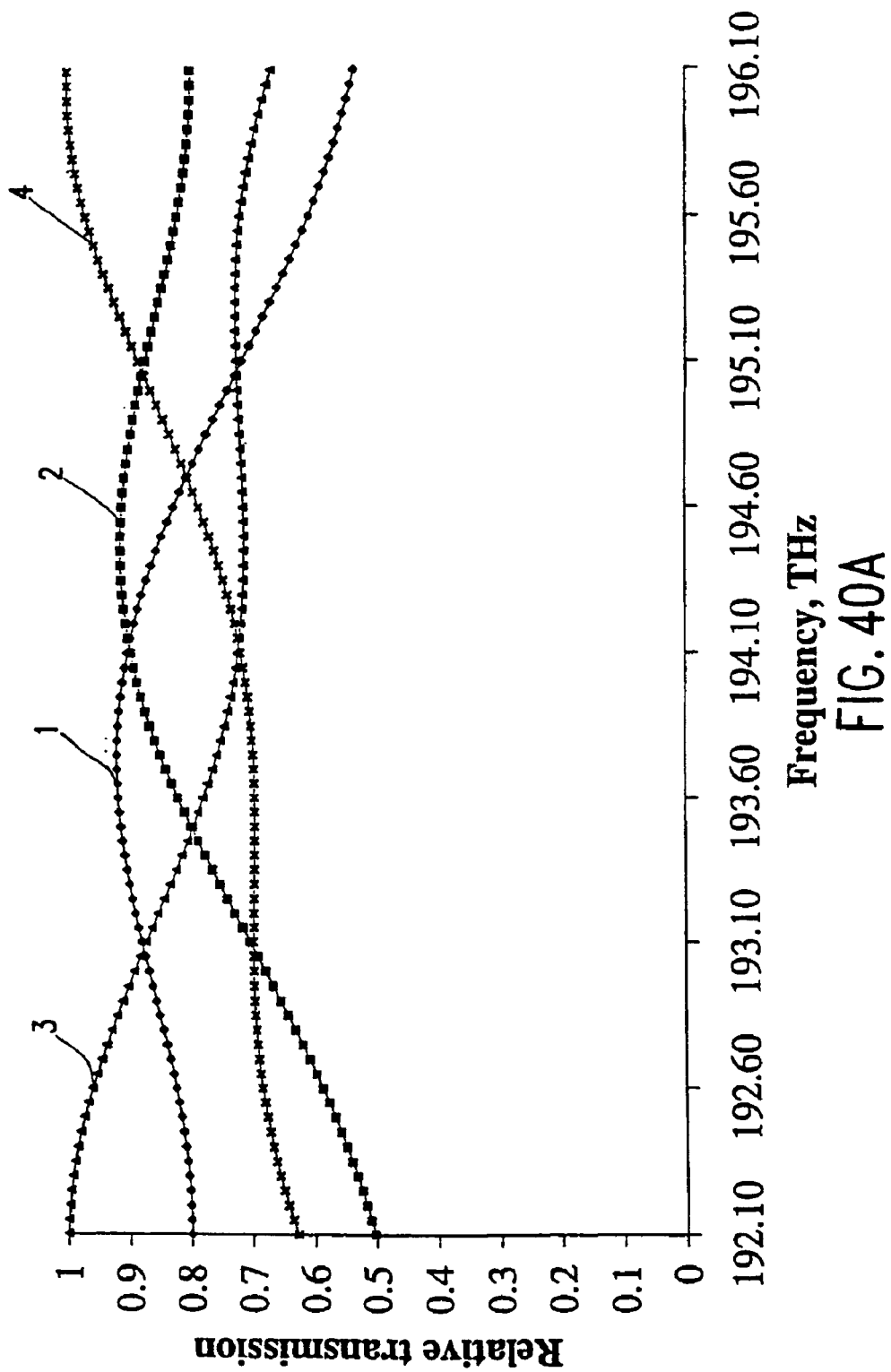

DEVICES FOR INFORMATION PROCESSING IN OPTICAL COMMUNICATIONS

CROSS REFERENCE TO RELATED APPLICATIONS

This application is the U.S. national phase under 35 USC §371 of International Application No. PCT/US00/31969, filed Nov. 21, 2001, which was published in English under PCT Article 21(2) on Jun. 21, 2001 as International Publication No. WO 01/45429. This application claims the benefit under 35 USC §119(e) of U.S. Provisional Applications Nos. 60/166,779 filed Nov. 22, 1999 and 60/188,496 filed Mar. 10, 2000.

I. FIELD OF THE INVENTION

The present invention relates to optical information processing devices that can be used in the fields of optical computing and optical communications.

In accordance with certain of its aspects, the invention relates to multifunctional devices that perform spatial processing of incoming optical signals including switching, coupling, wavelength multiplexing and routing.

In accordance with other aspects, the invention relates to multifunctional reconfigurable devices for optical information processing of incoming signals wherein device properties are adjusted based on the type of processing the incoming information signals require.

In accordance with some other aspects, the invention relates to dynamically reconfigurable multifunctional devices that perform both spatial and temporal processing of incoming signals.

II. BACKGROUND OF THE INVENTION

With the growth of optical communication systems, a need for a wide variety of devices of various forms, such as switches, couplers, filters, multiplexers, etc., has arisen. An even higher need exists for reconfigurable devices, i.e., ones that can be adjusted according to the communication system requirements by applying, for example, a control signal.

State of the art optical communication systems are based on wavelength division multiplexing (WDM) that allows for substantially higher bandwidth utilization. A significant number of information signals may be transmitted over a single optical fiber using the WDM technology.

Both wavelength filtering and routing are required to take advantage of the wavelength domain in WDM systems. That is, both wavelength filtering devices as well as routing devices need to be incorporated in an optical communication system for proper functioning. Any optical communication system that uses WDM technology also employs switches, splitters and coupling devices to add/drop channels as well as to distribute information between various channels.

Usually the above functions, including switching, coupling, filtering and routing are performed in optical communication systems by using separate components. These components have limited functionality; for example, a switching device can't perform as a wavelength router and vice versa, i.e., a switching device switches all the incoming wavelengths to a specific fiber and a wavelength router distributes incoming wavelengths between different fibers in a fixed manner.

Different devices based on various physical principles have been disclosed as wavelength dependent filters, WDMs, switches, etc. Some of them are based on interferometric phenomena that use wavefront division (see, for example, U.S. Pat. Nos. 5,930,441; 5,841,583; 5,862,279; 5,351,317; 4,950,045) and amplitude division (see U.S. Pat. Nos. 4,813,756; 4,474,424). Other devices are based on diffraction phenomena and employ diffraction gratings as key components (U.S. Pat. Nos. 5,917,625; 5,206,920).

The present invention is a non-grating diffractive device based on wavefront division. Due to its diffractive nature, the device according to the present invention provides substantially higher functionality compared to interferometric devices based on wavefront division, as well as diffractive devices employing diffractive gratings.

It would be desirable to provide an optical information processing device with an increased functionality such that the same device can accomplish several information processing tasks in an optical communication system, including switching, coupling, multiplexing and/or routing.

It would be desirable to provide an optical information processing device that can be used as a building block of an all-optical communication system.

It would also be desirable to provide an optical information processing device for an optical communication system that is reconfigurable and has high capacity.

III. SUMMARY OF THE INVENTION

In view of the foregoing, in accordance with certain of its aspects, the invention provides optical information processing devices with an increased functionality such that the same device can accomplish more than one information processing task in an optical communication system, e.g., combining switching, coupling, wavelength multiplexing, and/or routing.

In accordance with another aspect, the invention provides a reconfigurable device for an optical communication system such that properties of the device, e.g., switching, coupling, multiplexing, and/or routing, can he configured in accordance with operational needs.

In accordance with another aspect, the invention provides an optical information processing device for optical communications where the properties of the device can be adjusted by means of application of a control signal according to operational needs.

Examples of properties of the device, which can be modified according to the present invention, are explained below.

An optical information processing device according to the present invention employs optical field formation at the focal plane of an optical system due to diffraction effects on a phase structure. In the discussion that follows the device is referred to as a Multifunctional Reconfigurable Diffractive Device (MRDD).

The simplest case of optical field formation at the focal plane of an optical system is the phenomenon known as Fraunhofer diffraction. Fraunhofer diffraction by apertures is described in the literature (see, for example, M. Born and E. Wolf, Principles of Optics, 6th Ed., 1993, pp. 383–386, 392–401) and is observed at the focal plane of a lens. The shape of the aperture and the focal length of the lens determine the properties of the diffracted pattern. For a circular aperture, the intensity distribution is called an Airy pattern. The peak intensity of the 1st ring of the Airy pattern is 1.75% of the peak intensity in the central core and the fraction of the total incident energy contained in the central core of the diffraction pattern is 0.838 (see Born/Wolf, pp.

397–398). Fraunhofer diffraction is a fundamental factor that limits the resolution of an optical system due to diffraction by its aperture.

The present invention employs diffraction on phase structures rather than on circular apertures. The diffractive structures (DSs) according to the present invention comprise two or more components with specific aperture shapes and sizes, as well as phase properties. FIG. 1 illustrates the optical layout of a representative device. Collimated beam 1 composed of several wavelengths, each carrying specific information, propagates through the diffractive structure 2 (DS2) and further through the lens 3. The diffraction is observed at the focal plane 4 of the lens 3. A fiber array 5 or detector array is placed at the focal plane 4. The intensity distribution at the focal plane 4 is a function of the wavelength of light, diffractive structure 2, and the focal length of the lens 3. The information contained in the different wavelength channels is redistributed between the fibers or individual detector surfaces of the array 5. As will be shown below, it is the difference in optical thickness and the aperture shape and size of the diffractive structure's components that determine the light distribution at the focal plane 4 of the lens. By changing the difference in optical thickness and the aperture shape and size of the diffractive structure's components, the light distribution between the elements of the array 5 is adjusted. Changing the temperature, magnetic or electric field, applying pressure, etc. affects the optical thickness of the diffractive structure. In this way, the signal distribution between the elements of the array 5 can be controlled according to the communication system's requirements.

The focusing optical system 3 is not limited to a single lens component, as shown in FIG. 1, but can be a refractive, reflective or catadioptric focusing system of whatever complexity is desired. The aperture of the focusing system and the diffractive structure can take different shapes, including circular, square, rectangular, or any other. In the examples below a circular aperture shape is employed for purposes of illustration.

Although the diffractive structure 2 is shown in FIG. 1 as an independent element, it can be combined with one of the surfaces of the focusing system. In the simplest case, the diffractive structure is combined with one of the surfaces of a single lens to form a single component. In that case the diffractive structure is formed on one side of the component and the opposite side of the component performs focusing functions.

The diffractive structure 2 comprises two or more components of specific shapes that introduce an Optical Path Difference (OPD) to individual portions of the wavefront propagating through the structure. The structure may be comprised of two or more components of specific shapes that have the same length and are made from optical materials that have different refractive indices. The structure may be comprised of two or more components of specific shapes that are made from the same optical material but have different lengths. The structure may also be comprised of two or more components of specific shapes that differ in length and are made from optical materials with different refractive indices.

The components of the diffractive structure 2 can be made as independent blocks of material. The blocks may or may not be attached (bonded) to each other.

The specific shapes of the components and the controlled amounts of optical thickness required to obtain OPDs for individual portions of the wavefront can be obtained by various fabrication techniques, including material removal (etching, for example), material deposition, the sol-gel process, molding, etc.

The specific shapes of the components as well as the differences in optical thickness between components depend on the application. The components of diffractive structure 2 can have different shapes and sizes within the aperture of the propagating beam 1. The implications of different shapes will be understood from the several embodiments of the invention presented below. The difference in, for example, optical thickness can be made the same for all components of the diffractive structure or only for some of them, or it can be different for all components. In the simplest case, the difference is an increment of the same value. The value of the difference is not limited to a specific value. It can be less than a wavelength, of the order of a wavelength, several wavelengths or even several hundreds or thousands of wavelengths.

In one embodiment, DS2 is comprised of two components. The components are defined by two semi-circular sectors S1 and S2 of equal area axially offset from each other by a distance t. FIG. 2 shows a drawing of the diffractive structure according to this embodiment.

In another embodiment DS2 is comprised of four components Q1 through Q4 which are quadrants of the beam aperture (see FIGS. 3A through 3C). The relative OPD increments for Q1 through Q4 of the diffractive structure are different for the three configurations, providing different distributions of the incoming light.

Although the components of the DS shown in FIGS. 2 and 3 are based on circular sectors, their shape can be different. In still another embodiment shown in FIG. 4, the components of the DS according to the present invention have rectangular shapes.

In still another embodiment, the DS is comprised of three circular zones as illustrated in FIG. 5A.

In still another embodiment, the diffractive structure is comprised of a combination of components shaped, for example, as segments and circular zones. An example of this type of structure is shown in FIG. 5B.

It is to be understood that the shape and size of the components of the diffractive structures according to the present invention are not limited by the above drawings, but can take on a variety of different combinations and forms.

According to still another aspect of the invention, means are provided for adjustment of the optical path difference between the components of the diffractive structure by changing the refractive index of the material the structure is made from, so that the output of the device according to the present invention is adjusted accordingly.

According to still another aspect of the invention, means are provided for adjustment of the optical path difference between the components of the diffractive structure by changing the step heights of the structure's components, so that the output of the device according to the present invention is adjusted accordingly.

According to still another aspect of the invention, means are provided for adjustment of the optical path difference between the components of the diffractive structure by rotating the DS around an axis parallel, perpendicular, or at an angle to the optical axis, so that the output of the device according to the present invention is adjusted accordingly.

According to still another aspect of the invention, means are provided for adjustment of the optical path difference between the components of the diffractive structure by changing the refractive index of the material the structure is made from and the step heights of the structure's components, so that the output of the device according to the present invention is adjusted accordingly.

According to still another aspect of the invention, means are provided for adjustment of the optical path difference between the components of the diffractive structure by changing the refractive index of the material the structure is made from and by rotating the DS around an axis parallel, perpendicular, or at an angle to the optical axis, so that the output of the device according to the present invention is adjusted accordingly.

According to still another aspect of the invention means are provided for adjustment of the optical path difference between the components of the diffractive structure by changing the step heights of the structure's components and by rotating the DS around an axis parallel, perpendicular, or at an angle to the optical axis, so that the output of the device according to the present invention is adjusted accordingly.

According to still another aspect of the invention means are provided for adjustment of the optical path difference between the components of the diffractive structure by changing the refractive index of the material the structure is made from, by adjusting the step heights of the structure's components and by rotating the DS around an axis parallel, perpendicular, or at an angle to the optical axis, so that the output of the device according to the present invention is adjusted accordingly.

The diffractive structure according to still another embodiment of the invention is a composite structure comprising two or more individual diffractive structures displaced axially.

The diffractive structure according to still another embodiment of the invention is a composite structure comprising two or more individual diffractive structures displaced axially, where the diffractive structures are identical to each other.

According to still another aspect of the invention, means are provided for changing the relative orientation of the two or more individual diffractive structures such that the device output can be configured according to the system requirements.

This invention is particularly useful in high capacity all-optical communication networks. The device is well suited for integration on a single optoelectronic chip using micro-electromechanical system techniques (MEMS techniques) employing, for example, bulk silicon micromachining technology (see, for example, PCT publication WO 99/30196 "Micro B nchtop Optics by Bulk Silicon Micromachining", 17 Jun. 1999) or planar technology for producing integrated circuits. It can also be used in devices employing bulk optics configurations.

IV. BRIEF DESCRIPTION OF THE DRAWINGS

Figure 3A:
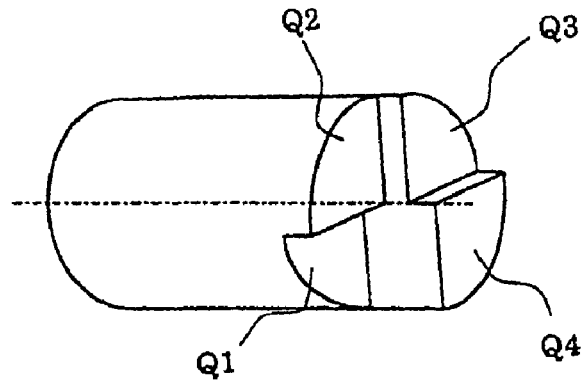
Figure 3B:
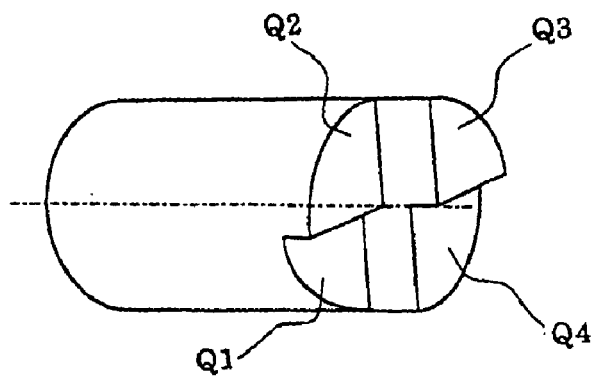
Figure 3C:
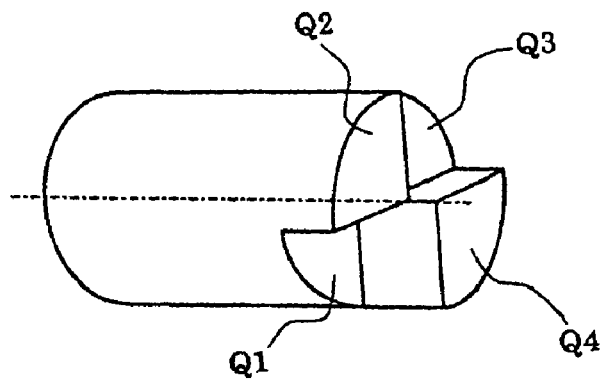

FIGS. 3A, 3B, and 3C illustrate diffractive structures according to the present invention based on four sectors.

Figure 4A:
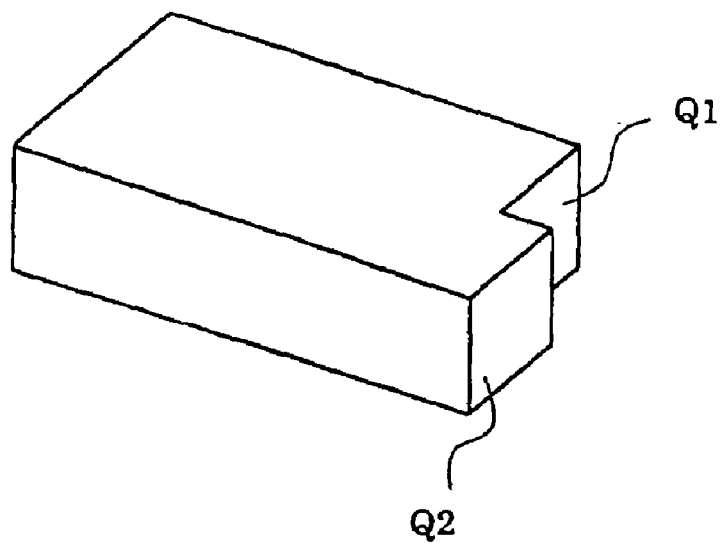
Figure 4B:
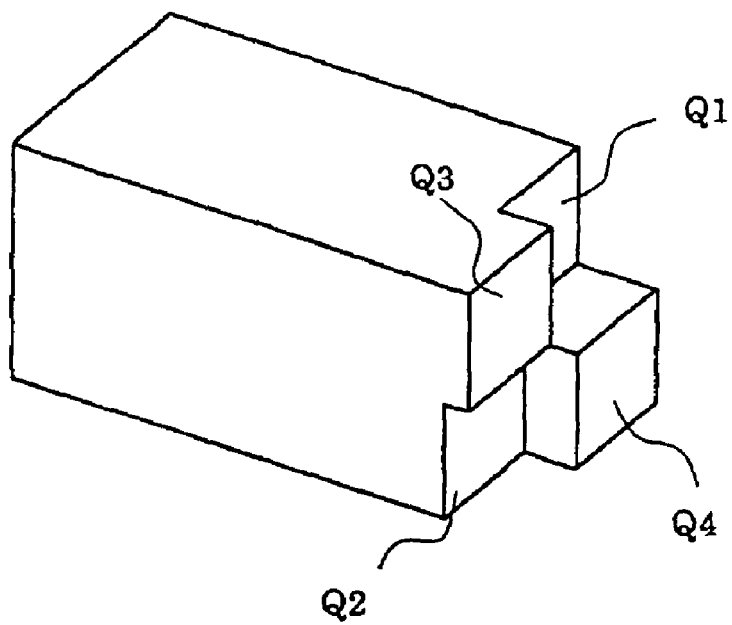

FIGS. 4A and 4B illustrate diffractive structures according to the present invention based on rectangular components.

Figure 5A:
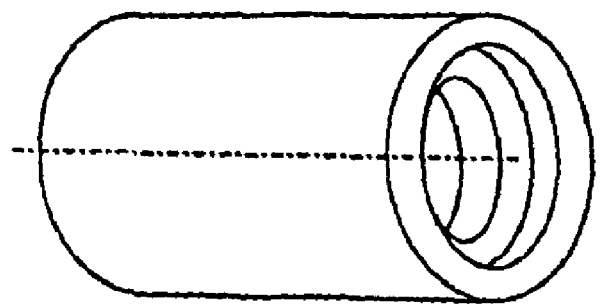

FIG. 5A presents a diffractive structure according to the present invention that employs three circular zones.

Figure 5B:
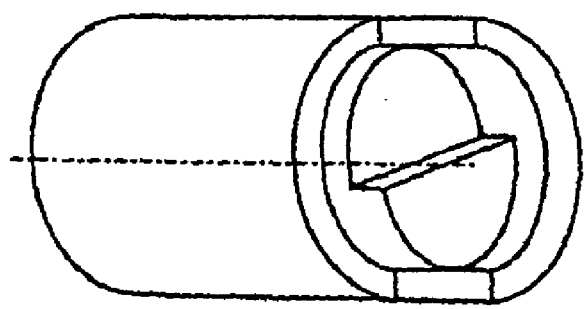

FIG. 5B presents a diffractive structure according to the present invention that employs circular segments and zones.

Figure 6A:
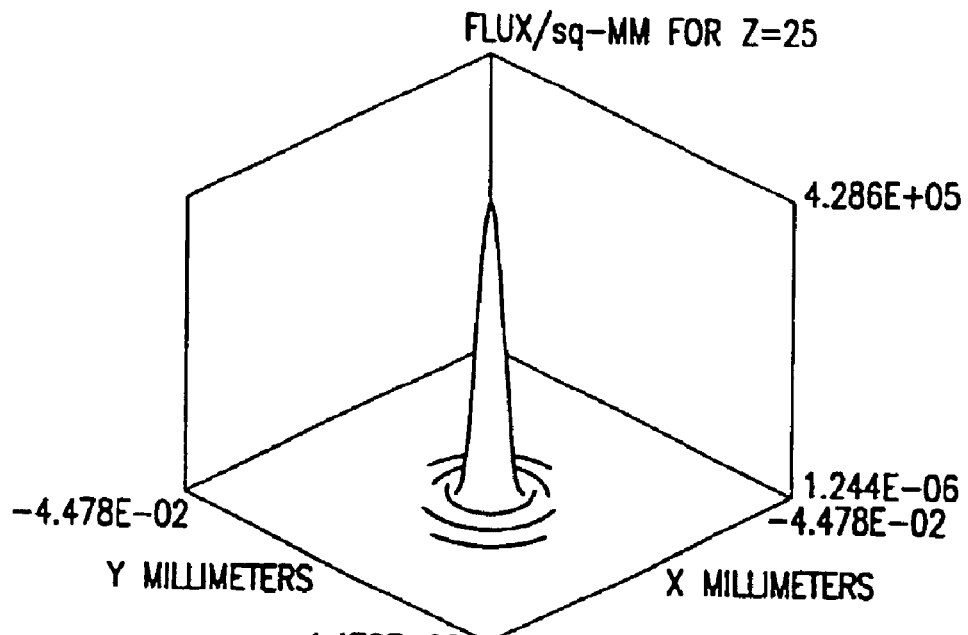
Figure 6B:
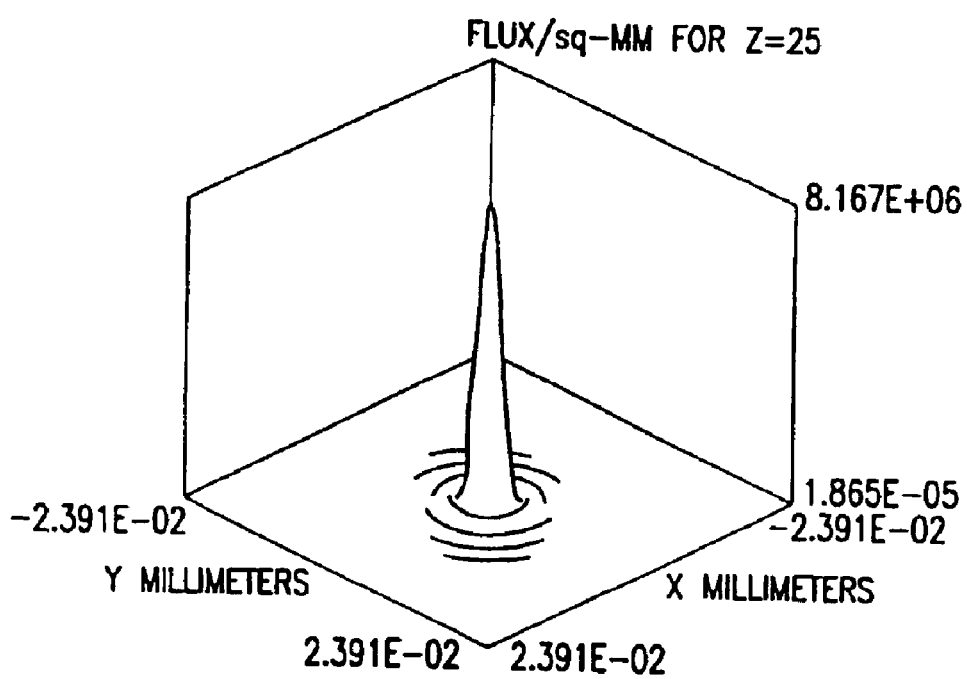
Figure 6C:
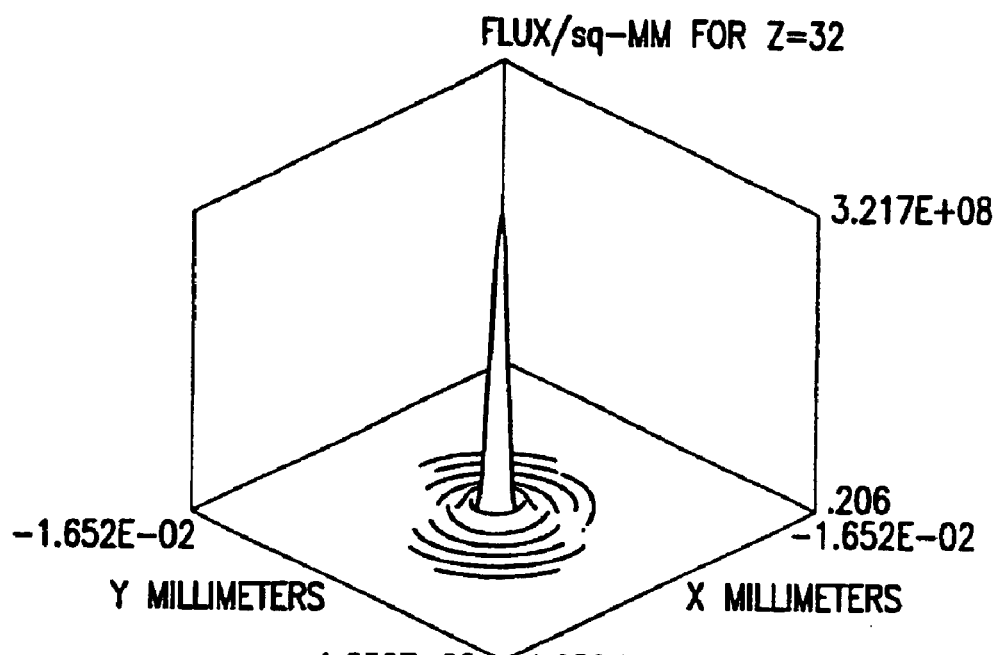

FIGS. 6A, 6B, and 6C present three-dimensional intensity distributions at the focal plane of focusing lenses with different f-numbers.

FIGS. 7A, 7B, 7C, 7D, and 7E present three-dimensional intensity distributions at the focal plane of a refractive singlet.

Figure 8A:
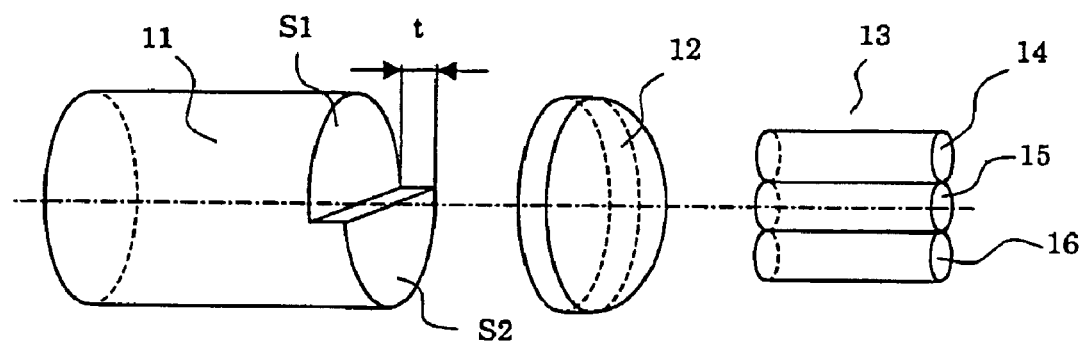
Figure 8B:
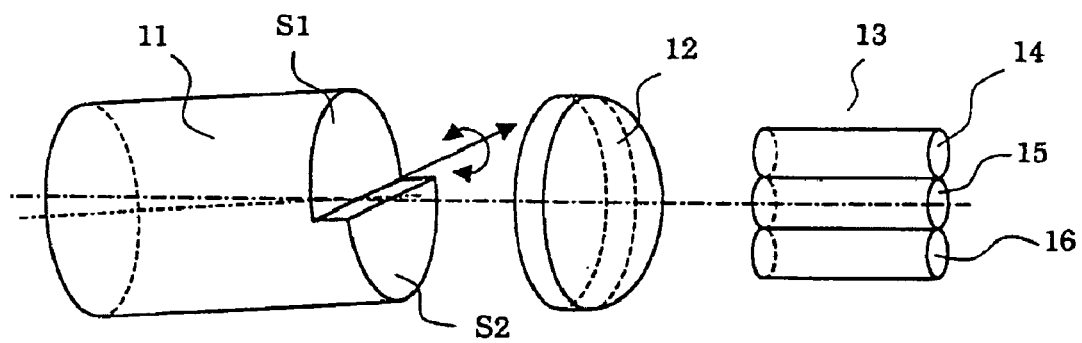

FIGS. 8A and 8B present schematic layouts of a multi-functional reconfigurable diffractive device (MRDD) according to a first embodiment.

Figure 9:
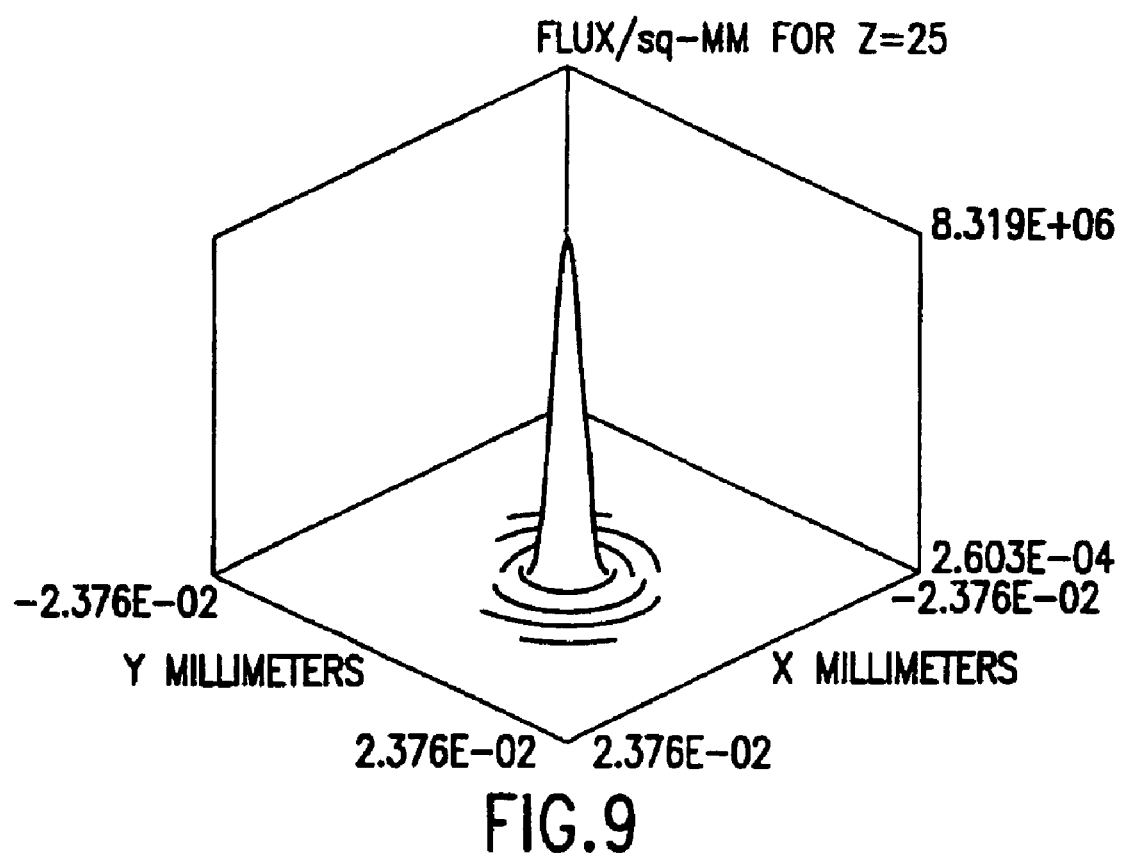

FIG. 9 shows a three-dimensional intensity distribution at the focal plane of the focusing lens according to the first embodiment for the wavelength 1.5353 $\mu$m listed in Table 1.

Figure 10:
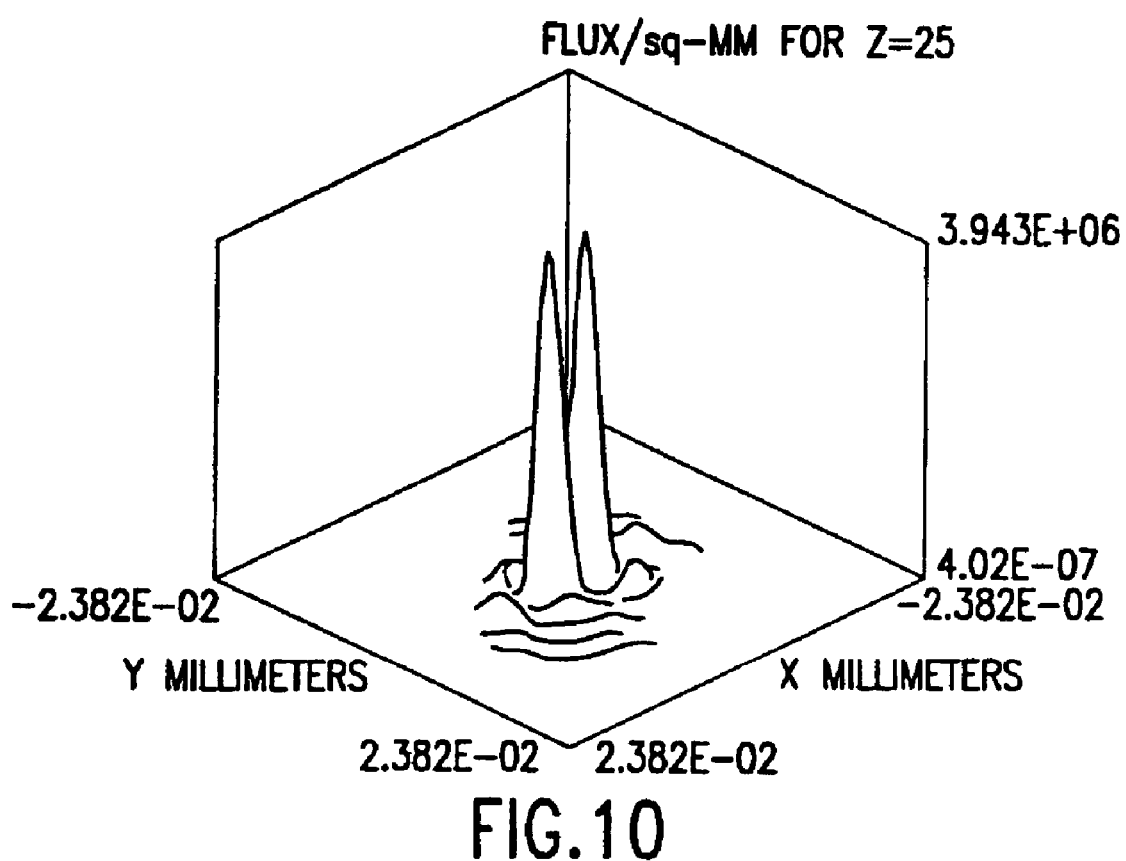

FIG. 10 shows a three-dimensional intensity distribution at the focal plane of the focusing lens according to the first embodiment for the wavelength 1.5426 $\mu$m listed in Table 2.

FIGS. 11A, 11B, 11C, 11D, 11E, 11F, and 11G show three-dimensional intensity distributions at the focal plane of the focusing lens according to the first embodiment for the wavelengths listed in Table 3.

FIGS. 12A, 12B, 12C, 12D, 12E, 12F, and 12G show three-dimensional intensity distributions at the focal plane of the focusing lens according to the first embodiment for the wavelength of 1.550 $\mu$m and the OPDs of Table 4.

FIGS. 13A, 13B, 13C and 13D present a reconfigurable diffractive structure according to a second embodiment.

Figure 14:
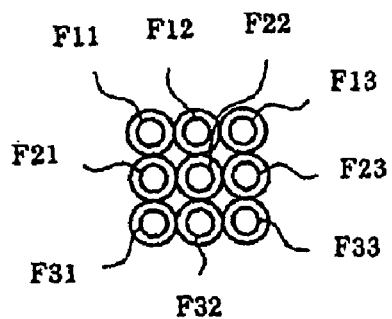

FIG. 14 presents a fiber array configuration for use with the second embodiment.

Figure 15:
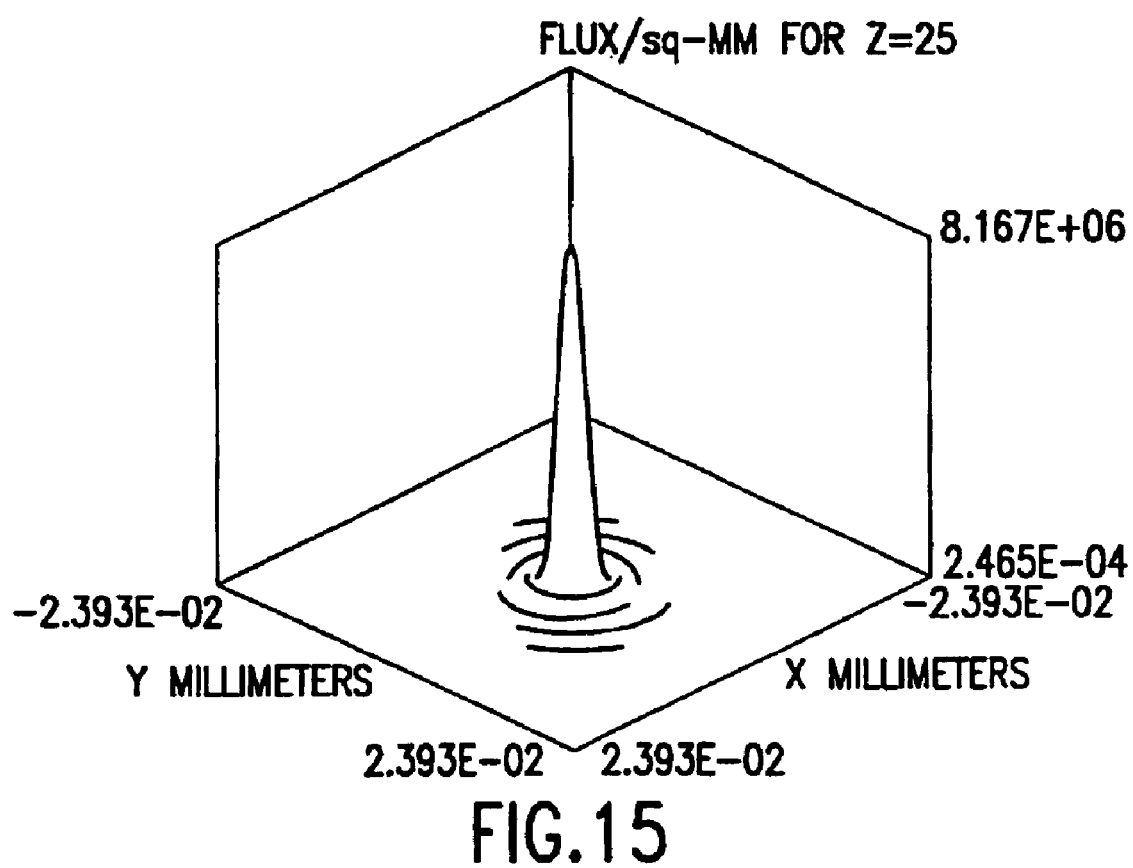

FIG. 15 presents an intensity distribution at the focal plane of the focusing lens according to a first example of the second embodiment for a wavelength of 1.5500 microns.

FIGS. 16A, 16B, 16C, and 16D present intensity distributions at the focal plane of the focusing lens according to the first example of the second embodiment for the wavelength of 1.5537 microns and relative rotation angles of 0, 90, 180, and 270 degrees, respectively.

FIGS. 17A, 17B, 17C, and 17D present intensity distributions at the focal plane of the focusing lens according to the first example of the second embodiment for the wavelength of 1.5650 microns and relative rotation angles of 0, 90, 180 and 270 degrees.

Figure 18:
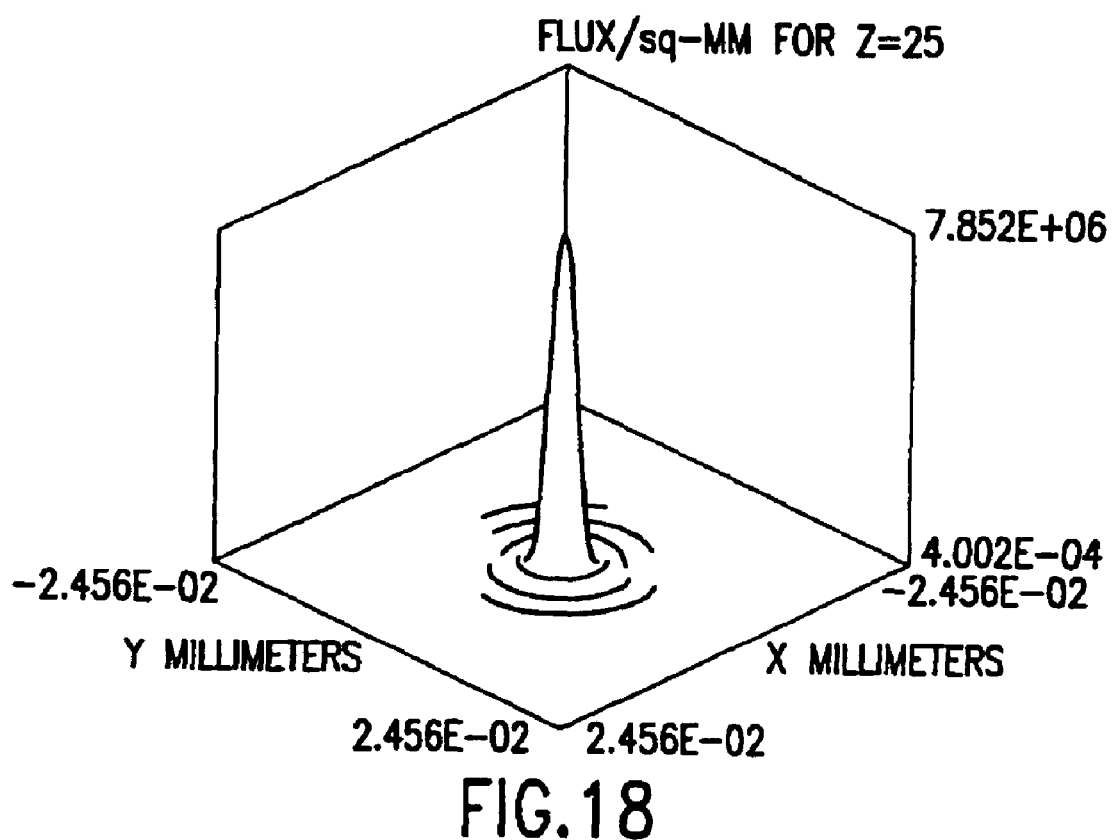

FIG. 18 presents an intensity distribution at the focal plane of the focusing lens according to the first example of the second embodiment for the wavelength of 1.5803 microns and relative rotation angles of 0, 90, 180 and 270 degrees.

FIGS. 19A, 19B, 19C, and 19D present intensity distributions at the focal plane of the focusing lens according to the second example of the second embodiment for the wavelength of 1.5500 microns and relative rotation angles of 0, 90, 180 and 270 degrees.

Figure 20:
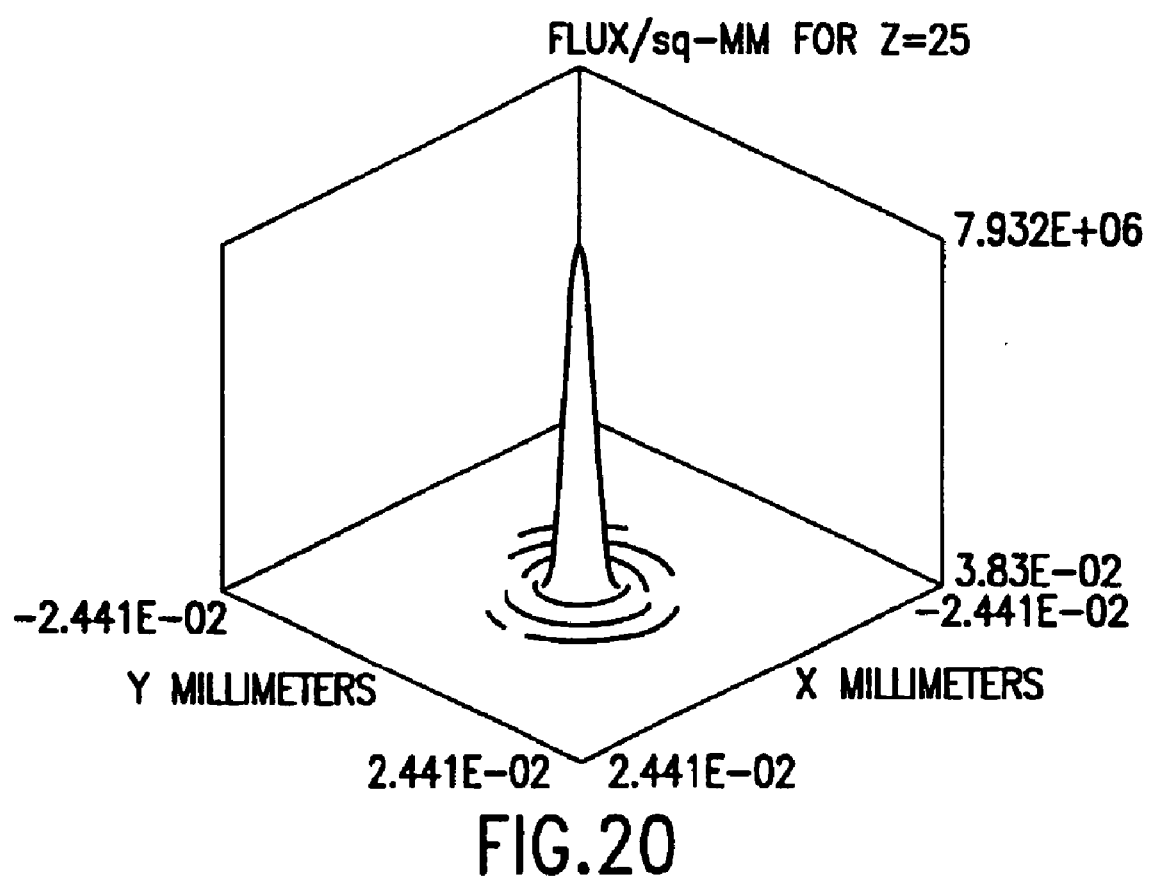

FIG. 20 presents an intensity distribution at the focal plane of the focusing lens according to the second example of the second embodiment for the wavelength of 1.5726 microns and relative rotation angles of 0, 90, 180 and 270 degrees.

FIGS. 21A, 21B, 21C, and 21D present intensity distributions at the focal plane of the focusing lens according to the second example of the second embodiment for the wavelength of 1.5803 microns and relative rotation angles of 0, 90, 180 and 270 degrees.

Figure 22:
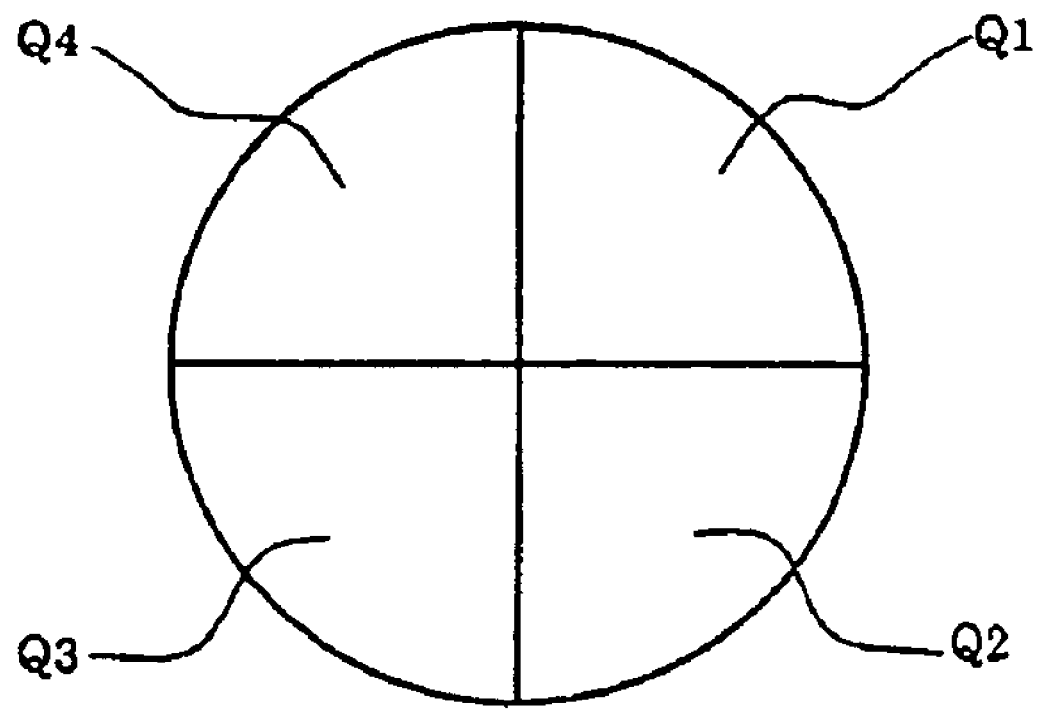

FIG. 22 presents the four quadrants of a diffractive structure according to a third embodiment.

Figure 23:
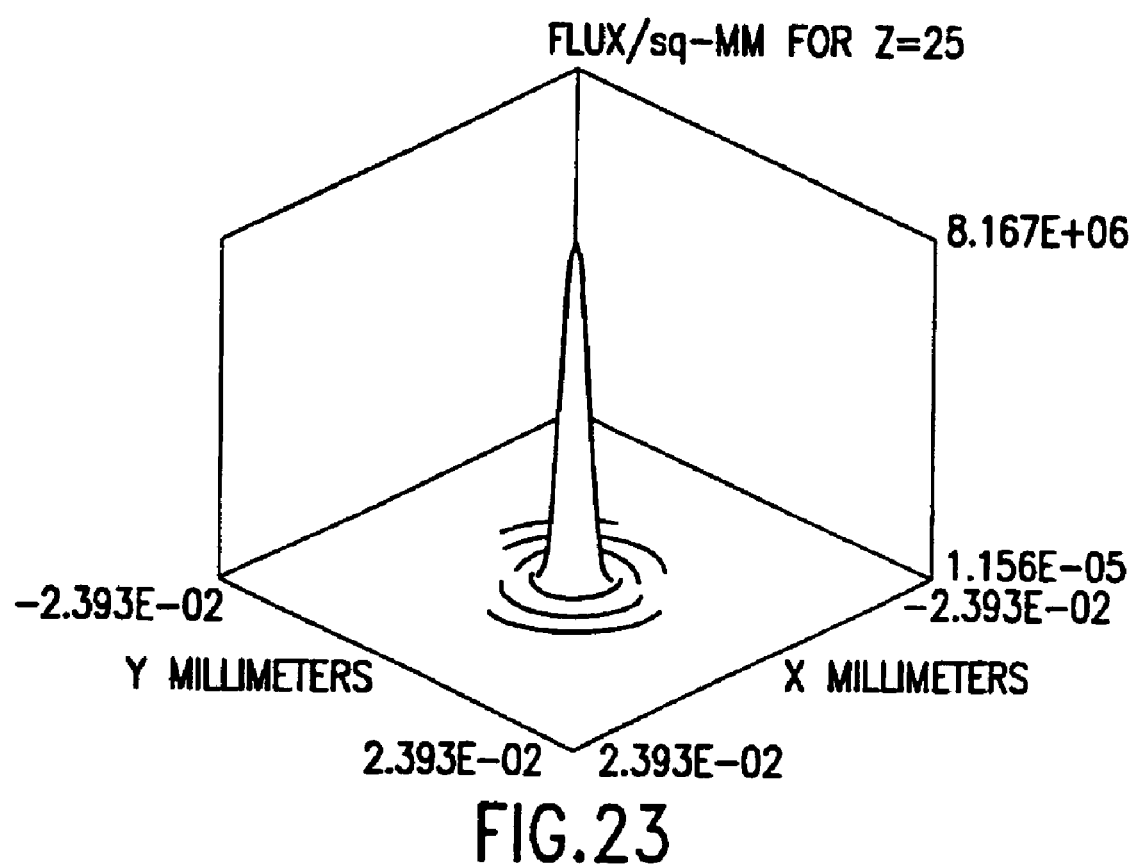

FIG. 23 presents an intensity distribution at the focal plane of the focusing lens according to the third embodiment for the wavelength of 1.5500 microns.

Figure 24:
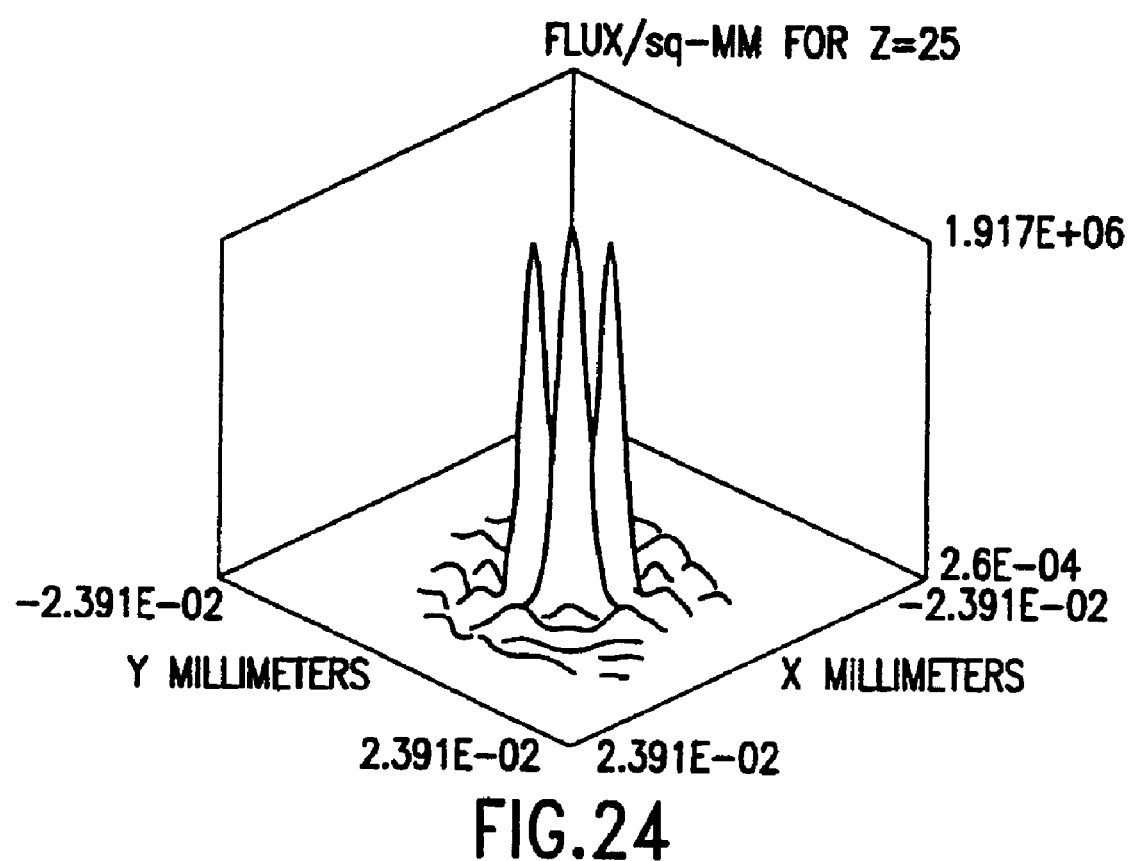

FIG. 24 presents an intensity distribution at the focal plane of the focusing lens according to the third embodiment for a DS having configuration 1 and for a wavelength of 1.54926 microns.

Figure 25:
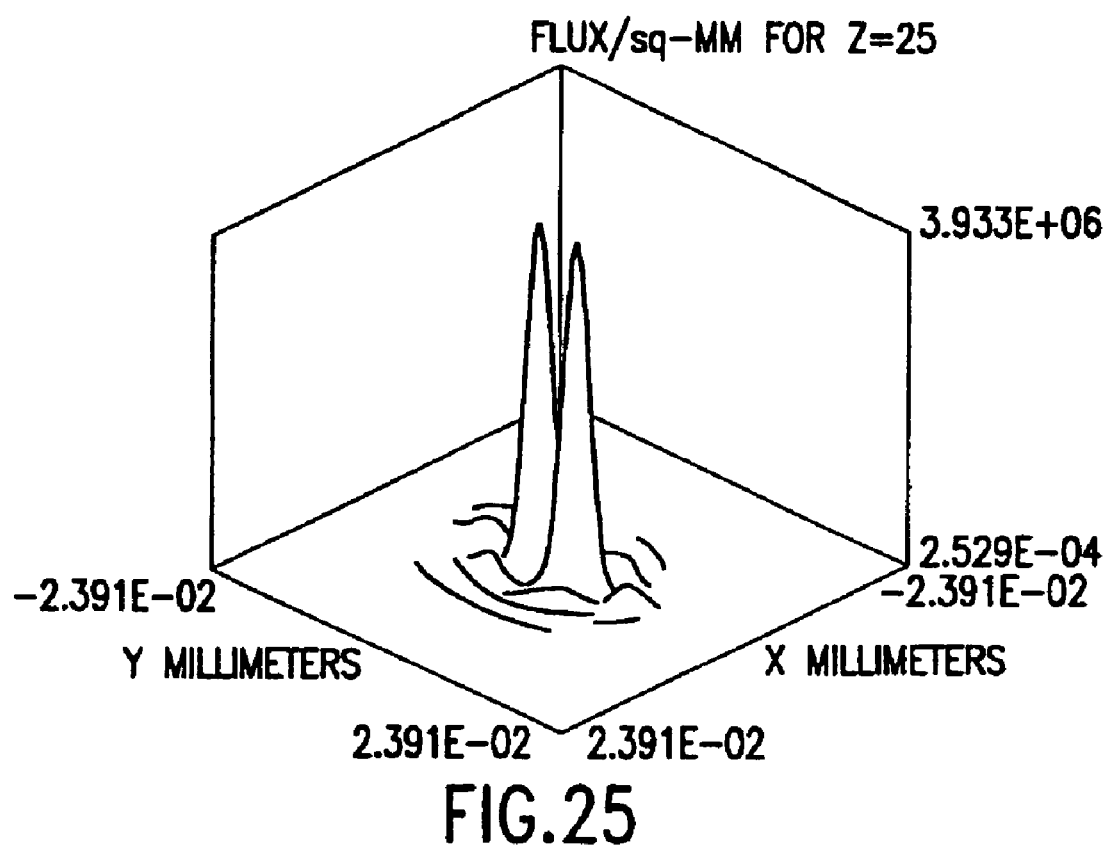

FIG. 25 presents an intensity distribution at the focal plane of the focusing lens according to the third embodiment for a DS having configuration 2 and for a wavelength of 1.54926 microns.

Figure 26:
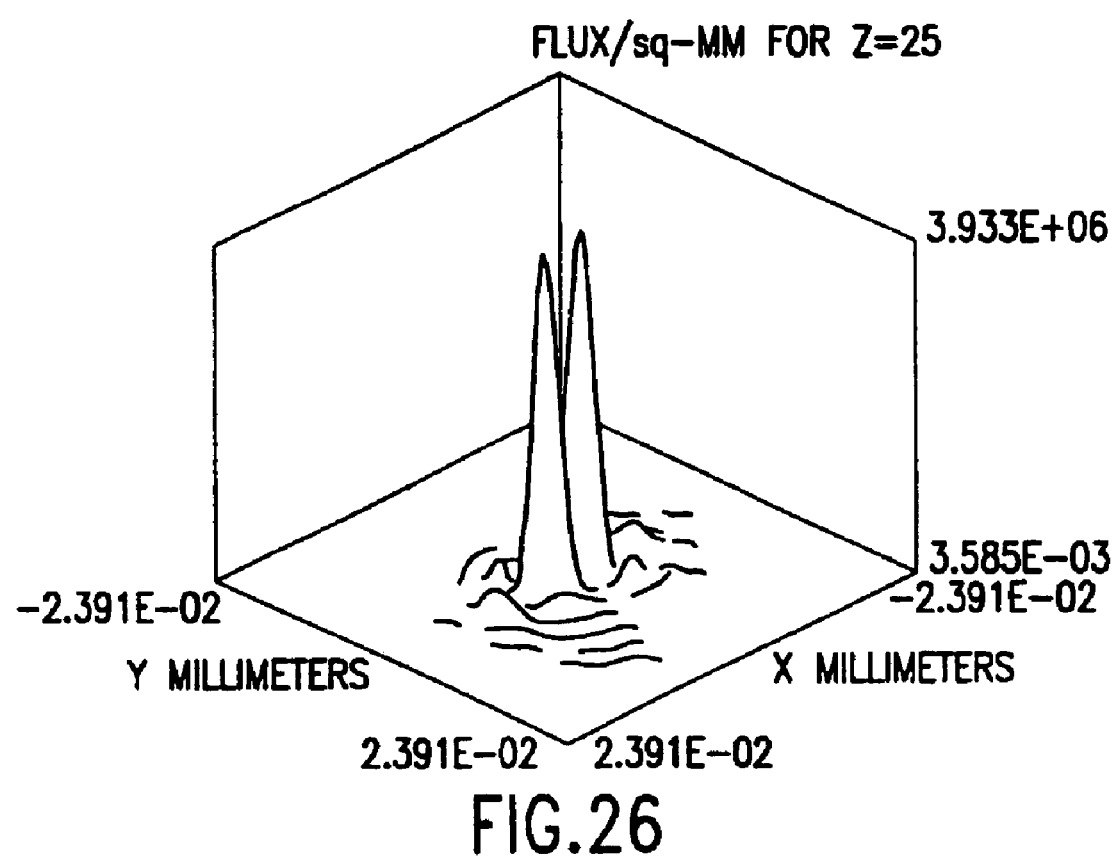

FIG. 26 presents an intensity distribution at the focal plane of the focusing lens according to the third embodiment for a DS having configuration 3 and for a wavelength of 1.54926 microns.

FIGS. 27A, 27B, 27C, 27D, 27E, 27F, 27G, 27H, and 27I present three-dimensional intensity distributions at the focal plane of the focusing lens according to the third embodiment for a DS having the configuration shown in FIG. 3A for the wavelengths listed in Table 10.

FIGS. 28A, 28B, 28C, 28D, 28E, 28F, 28G, 28H, and 28I present three-dimensional intensity distributions at the focal plane of the focusing lens according to the third embodiment for a DS having the configuration shown in FIG. 3B for the wavelengths listed in Table 10.

FIGS. 29A, 29B, 29C, 29D, 29E, 29F, 29G, 29H, and 29I present three-dimensional intensity distributions at the focal plane of the focusing lens according to the third embodiment for a DS having the configuration shown in FIG. 3C for the wavelengths listed in Table 10.

Figure 30:
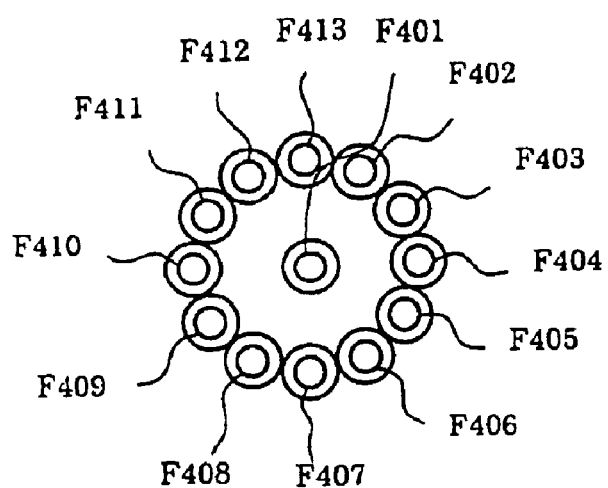

FIG. 30 presents a fiber array configuration for use with a fourth embodiment of the present invention.

Figure 31A:
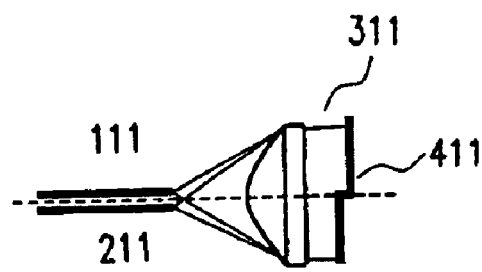
Figure 31B:
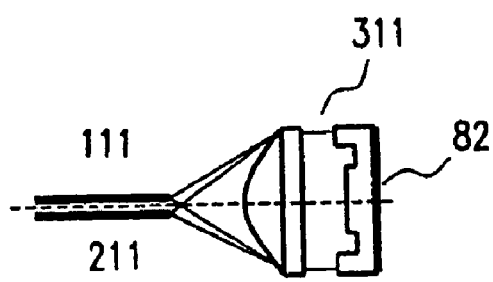

FIGS. 31A and 31B show reflective type MRDDs that employ reflective DSs.

Figure 32A:
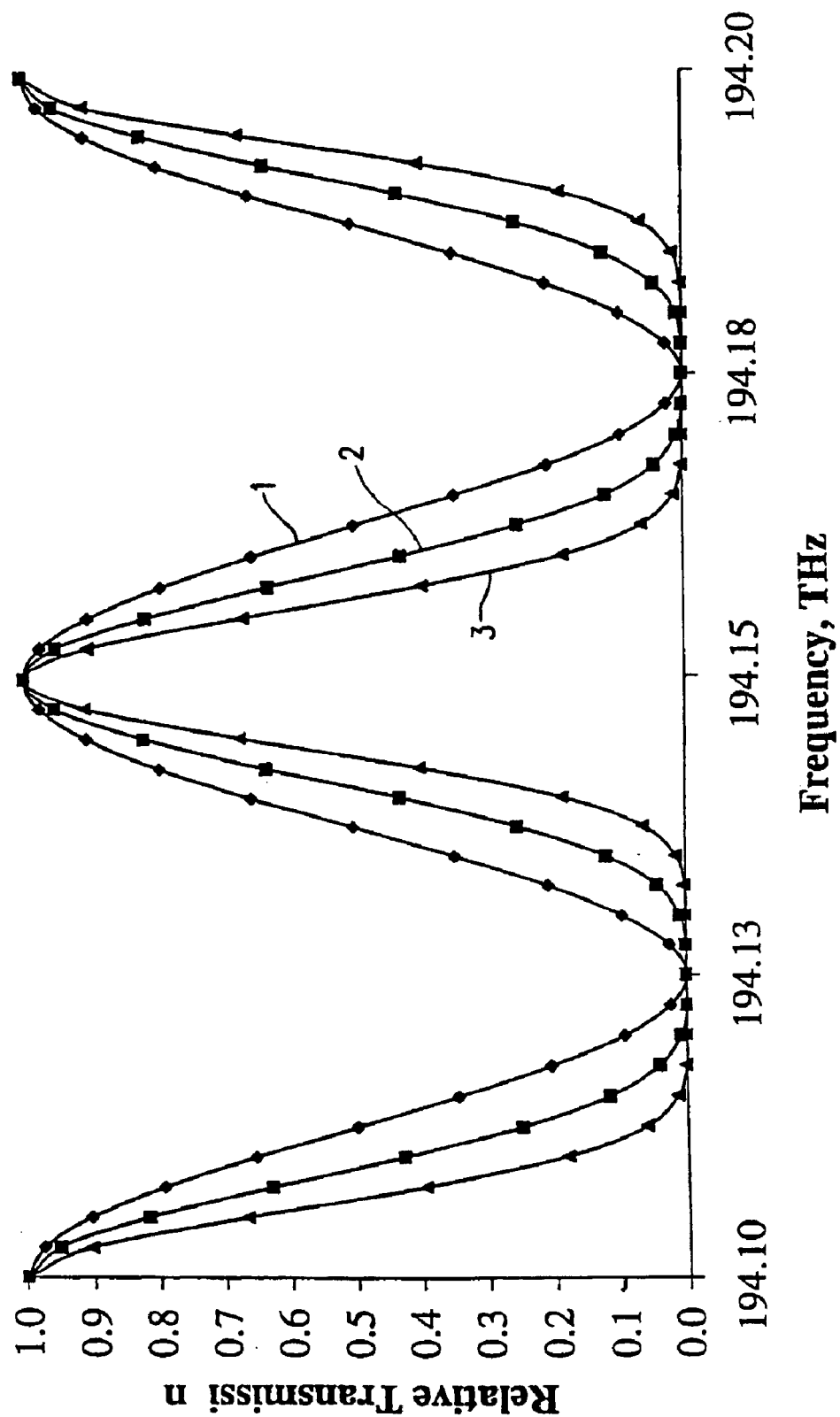
Figure 32B:
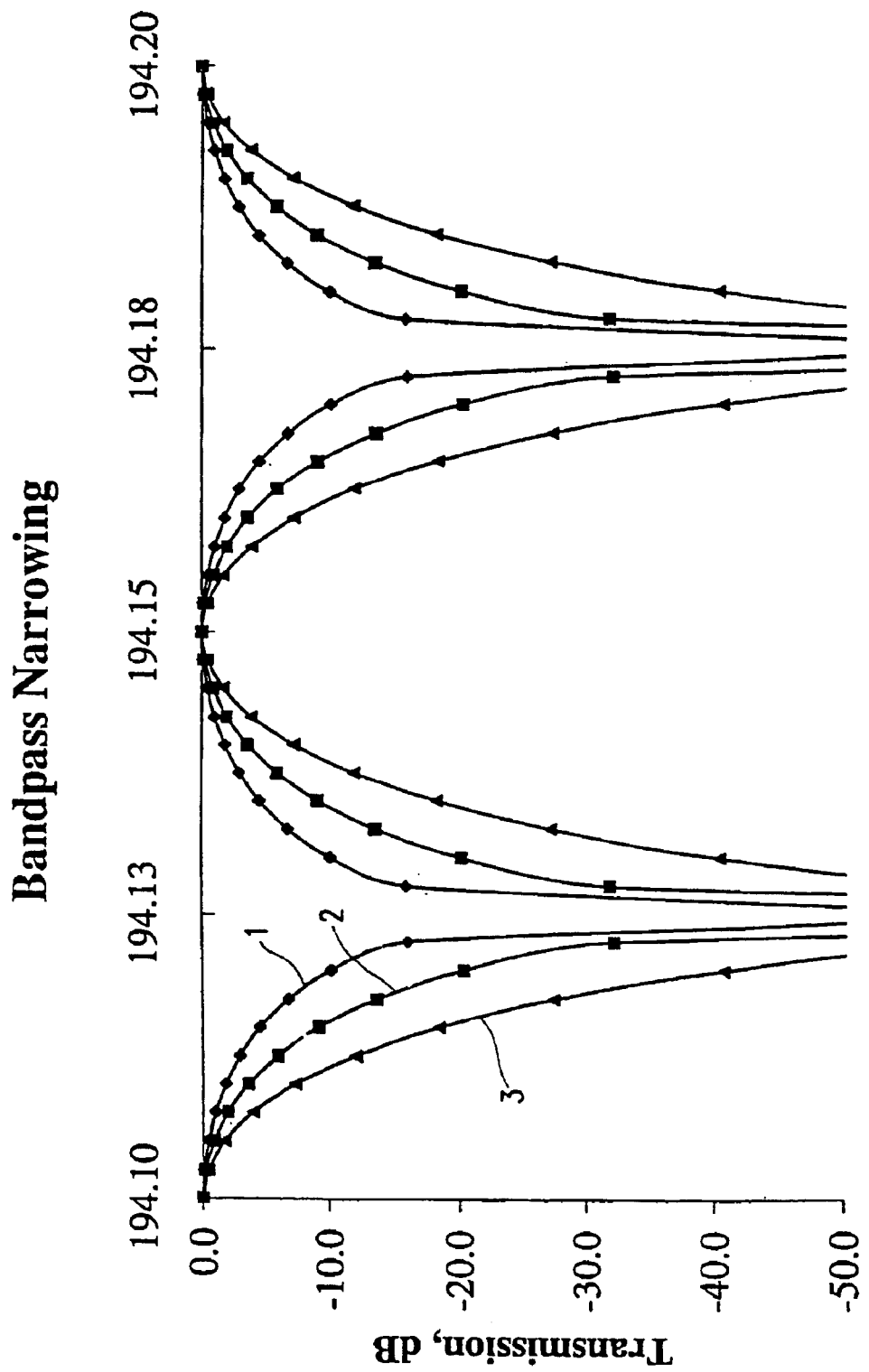

FIGS. 32A and 32B show relative spectral transmission characteristics of single-stage and multi-stage MRDDs used as band-pass filters.

Figure 33A:
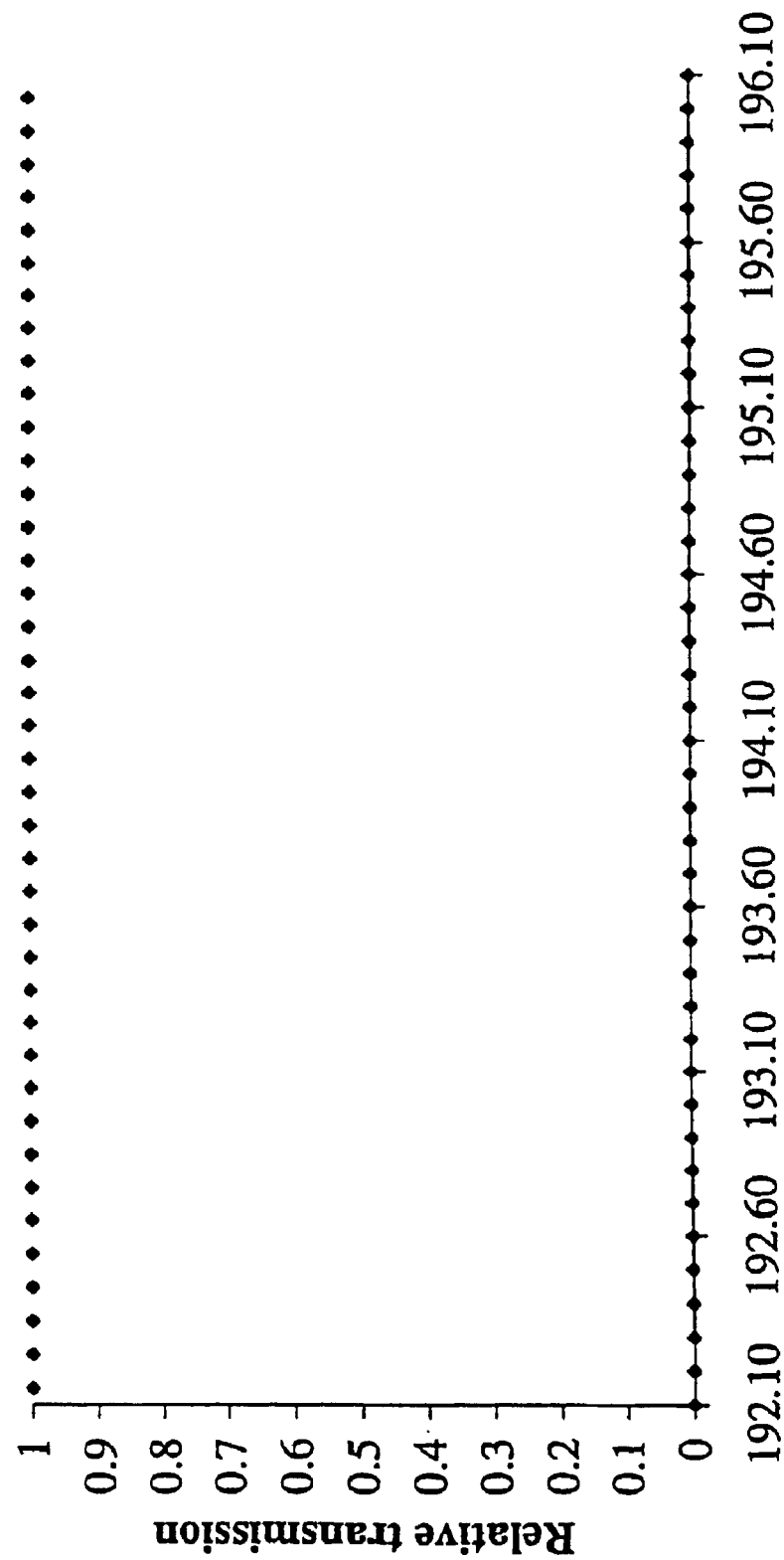

FIGS. 33A and 33B show spectral selectivity of a single-stage reflective MRDD employing a DS made from fused silica with a step height of 1.0249 mm.

Figure 34B:
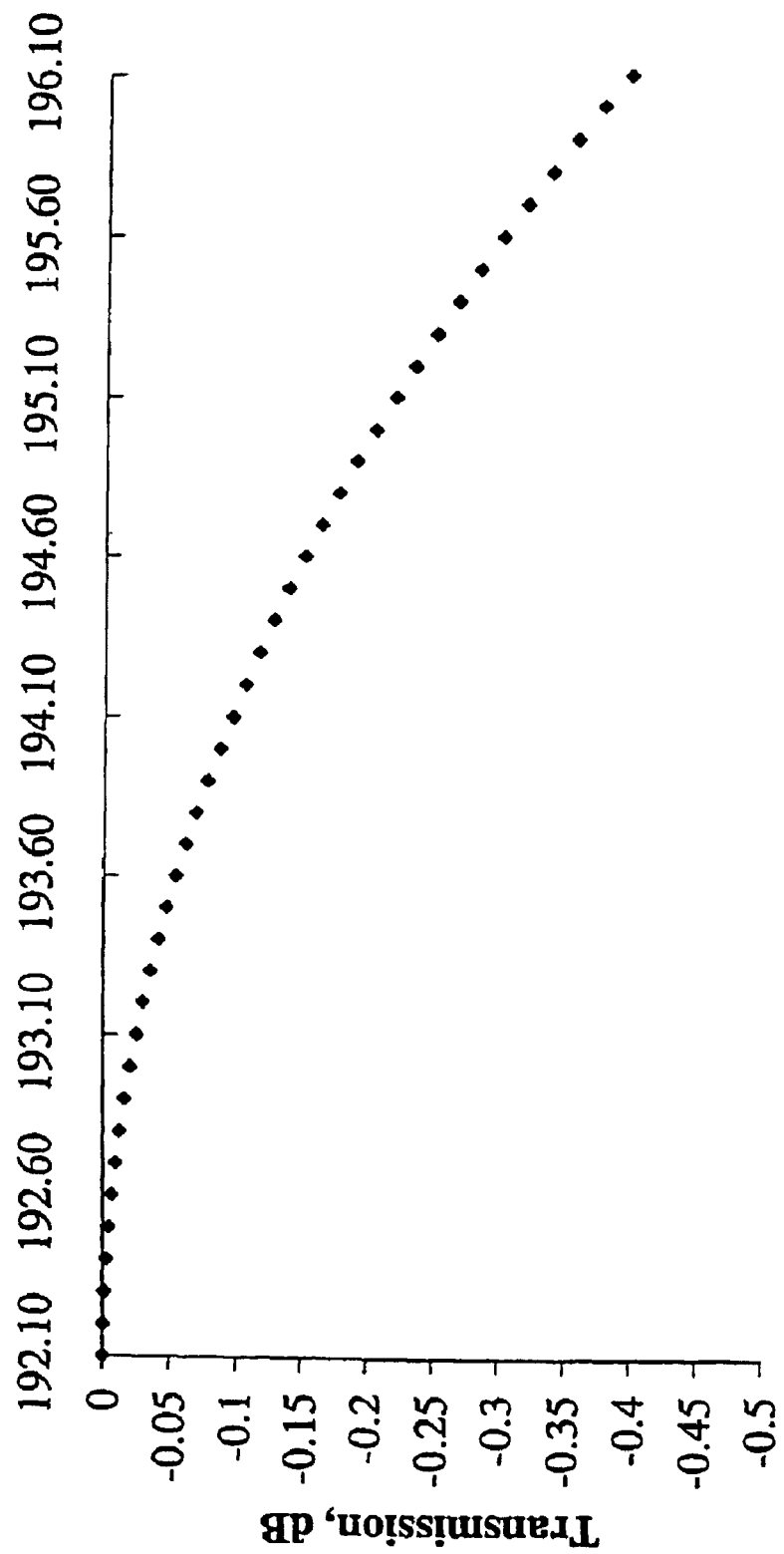

FIGS. 34A and 34B show spectral selectivity of a single-stage reflective MRDD employing a DS made from fused silica with a step height of 1.0225 mm.

Figure 35A:
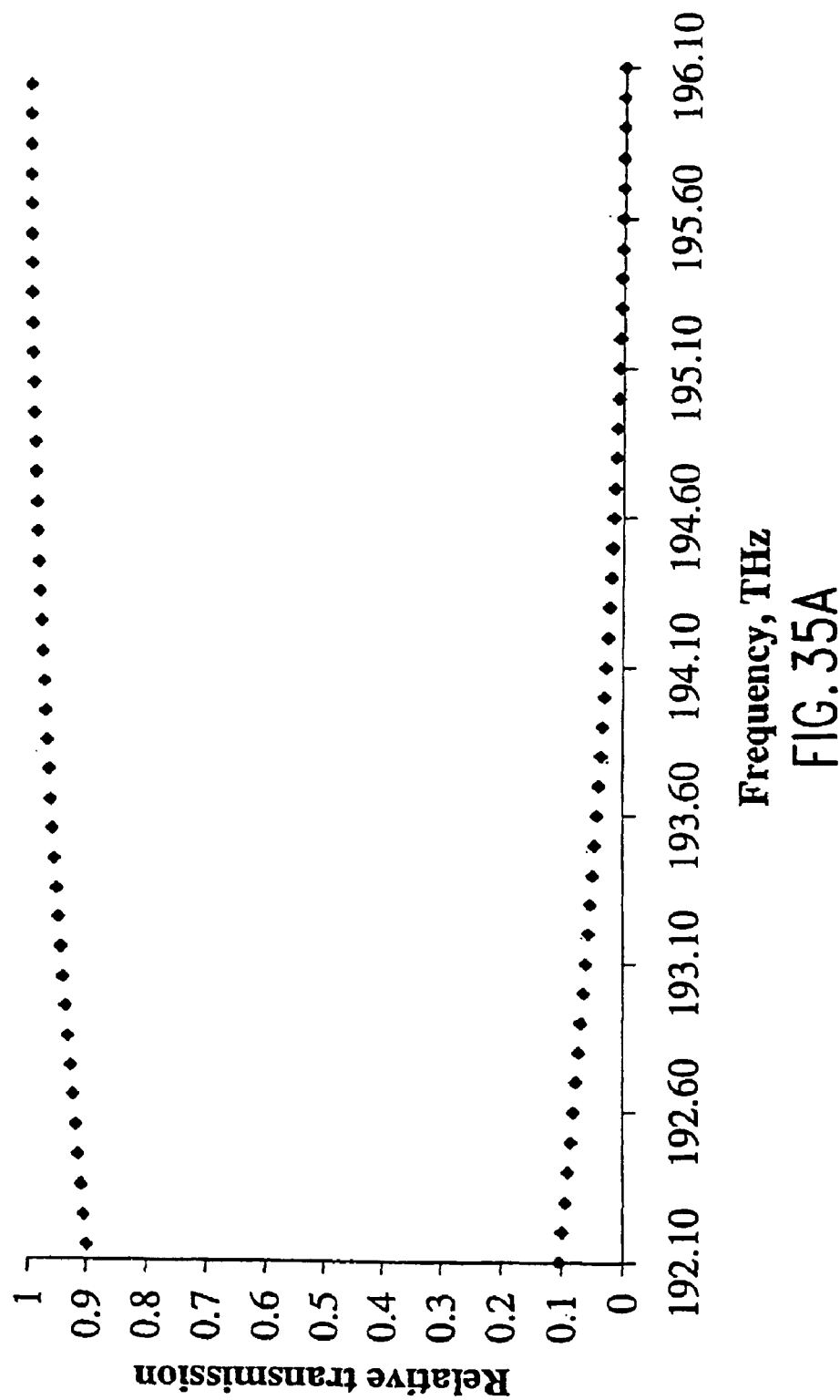
Figure 35B:
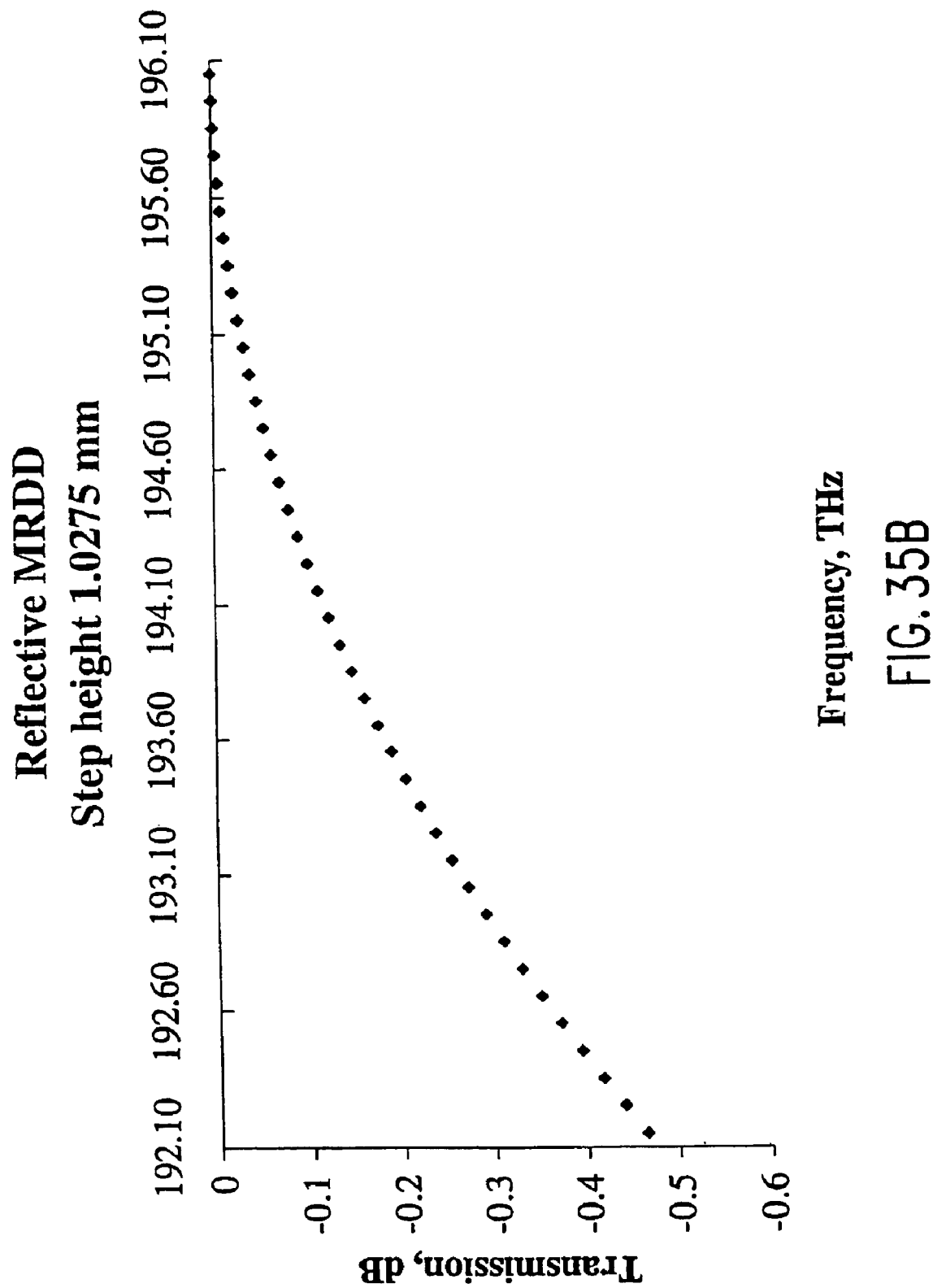

FIGS. 35A and 35B show spectral selectivity of a single-stage reflective MRDD employing a DS made from fused silica with a step height of 1.0275 mm.

Figure 36A:
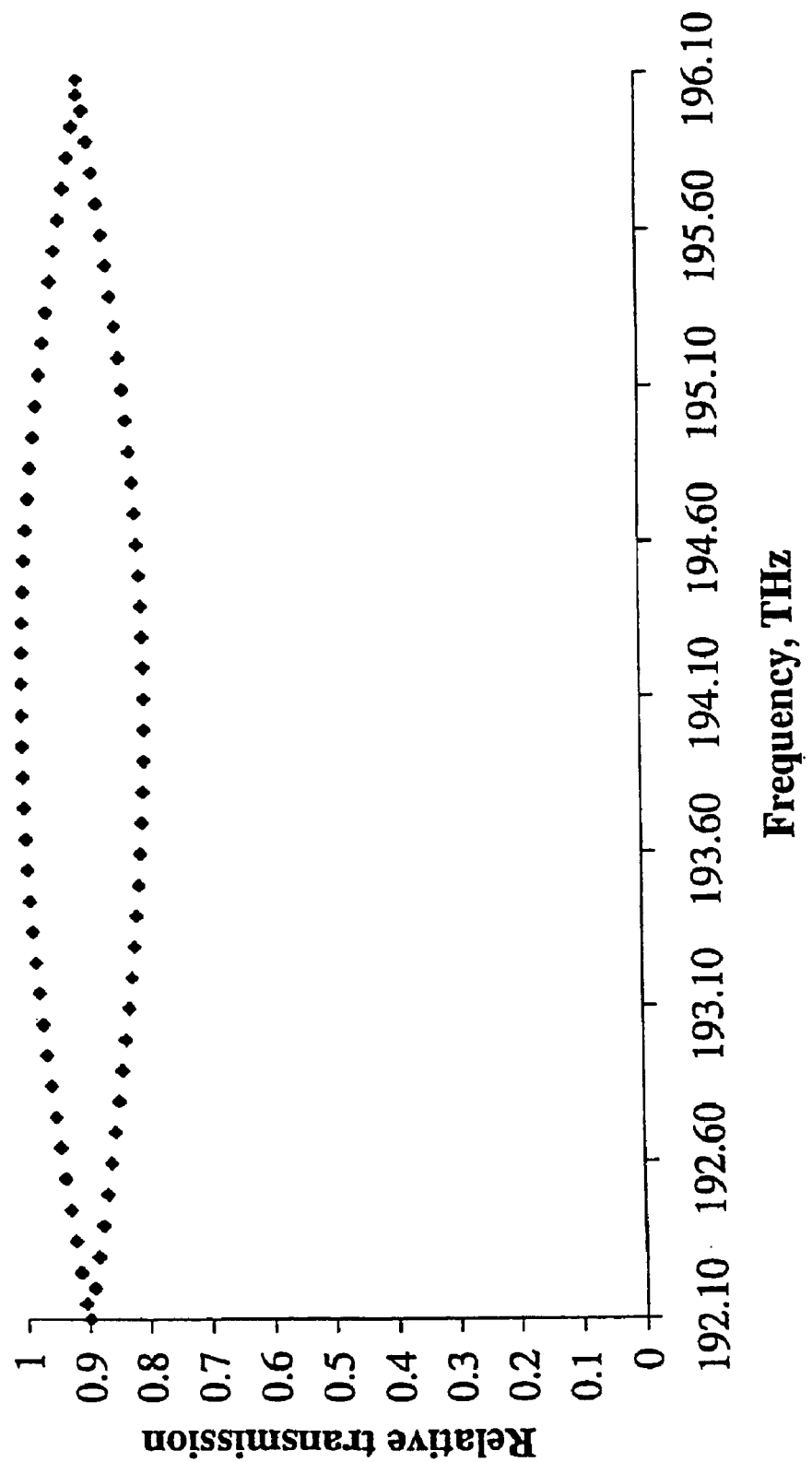
Figure 36B:
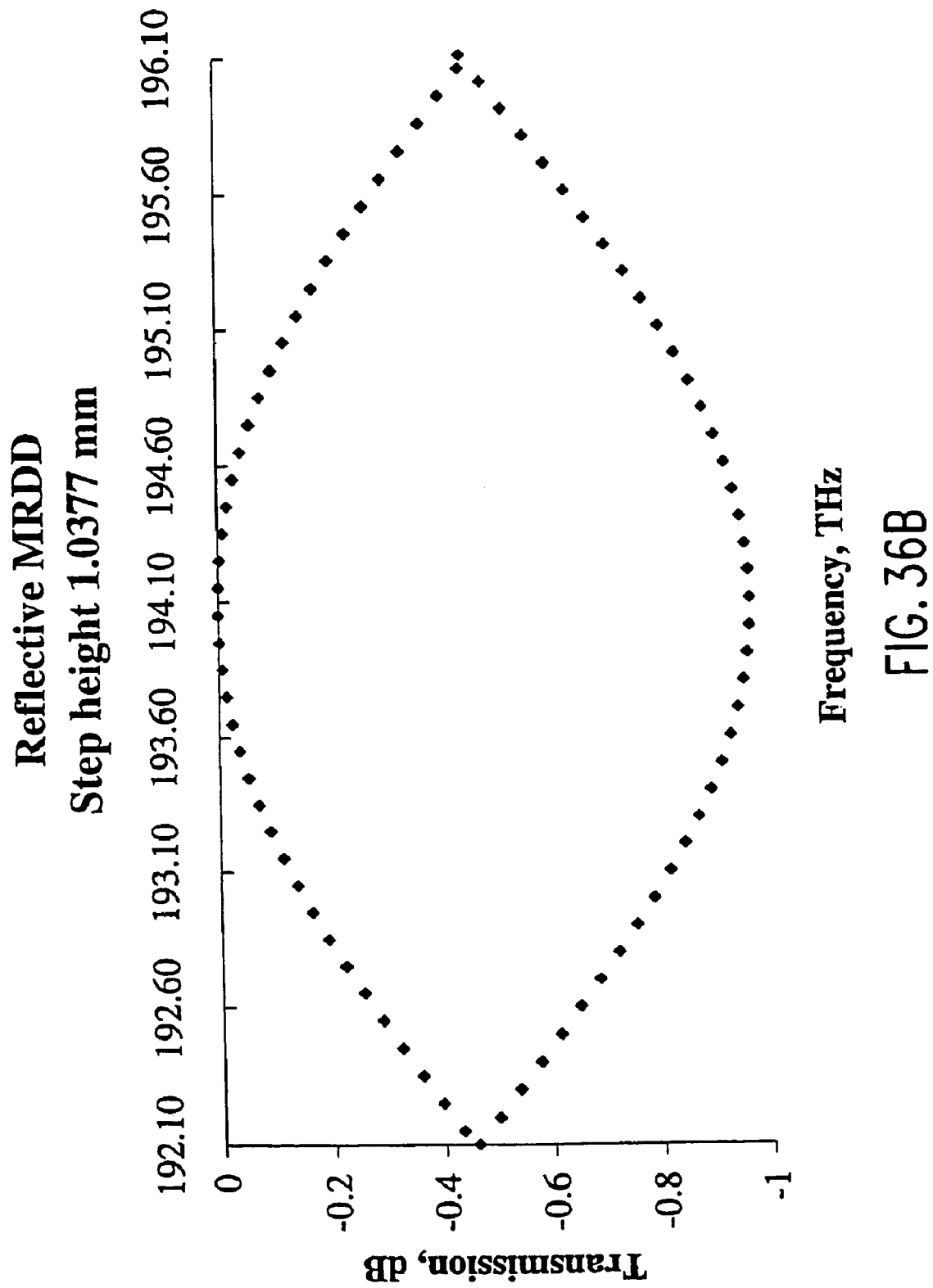

FIGS. 36A and 36B show spectral selectivity of a single-stage reflective MRDD employing a DS made from fused silica with a step height of 1.0377 mm.

Figure 37A:
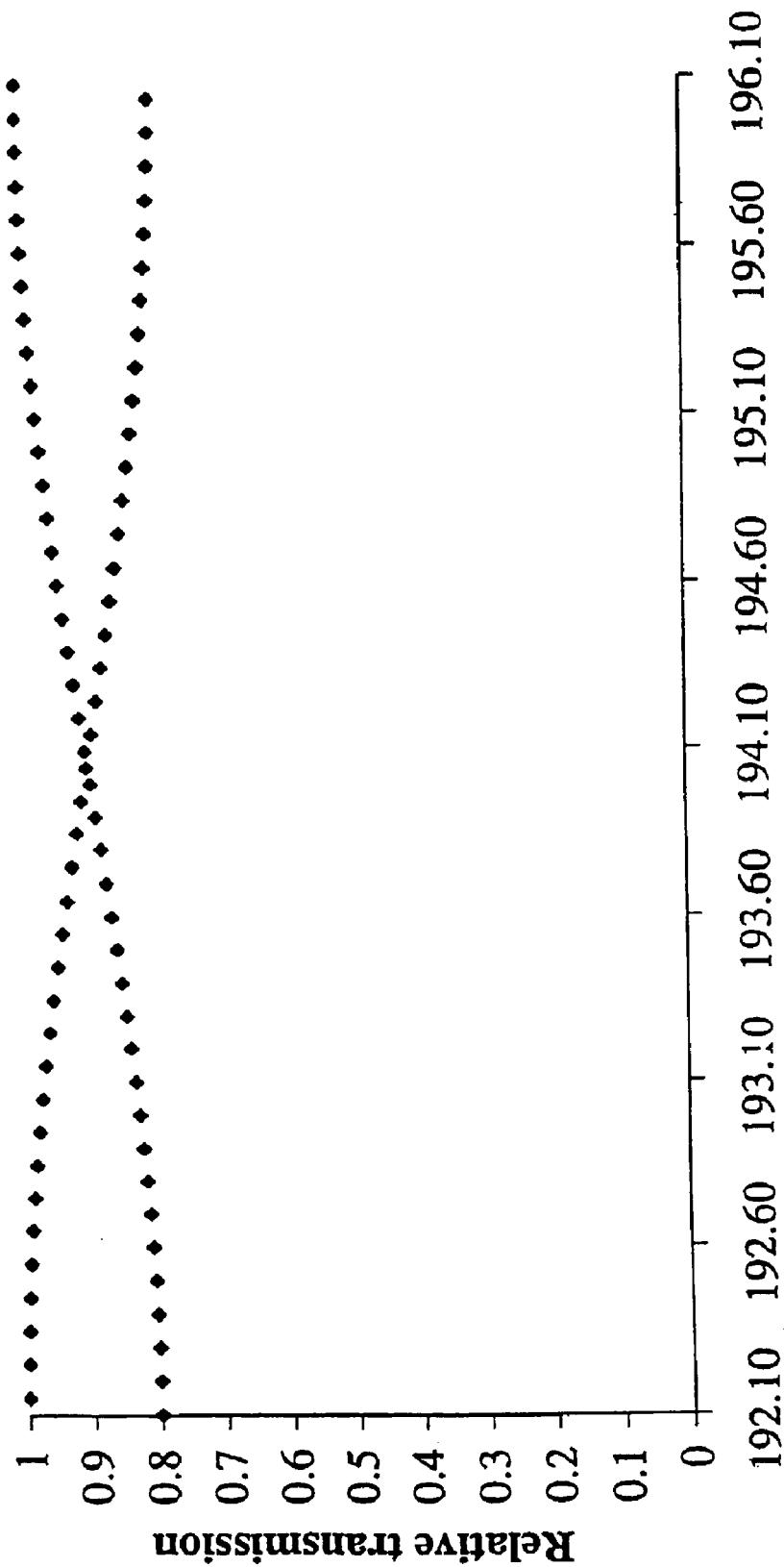
Figure 37B:
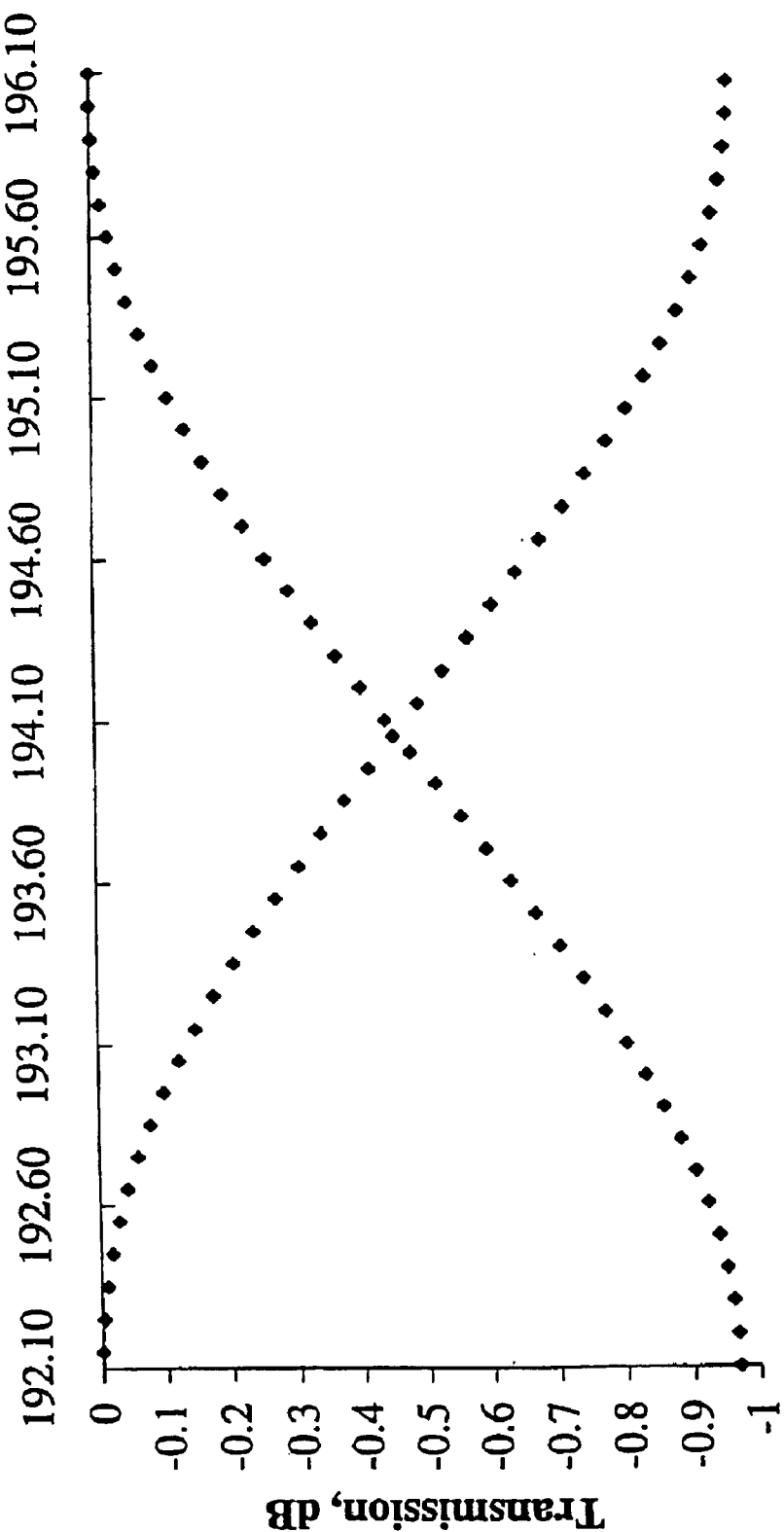

FIGS. 37A and 37B show spectral selectivity of a single-stage reflective MRDD employing a DS made from fused silica with a step height of 1.0379 mm.

Figure 38A:
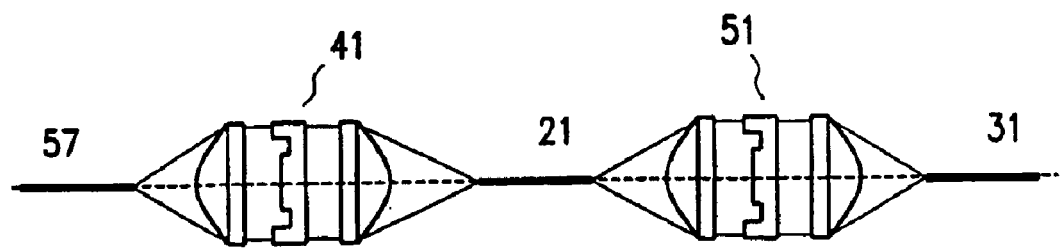
Figure 38B:
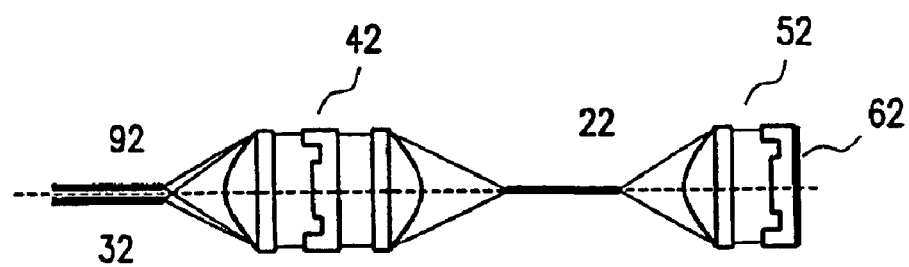
Figure 38C:
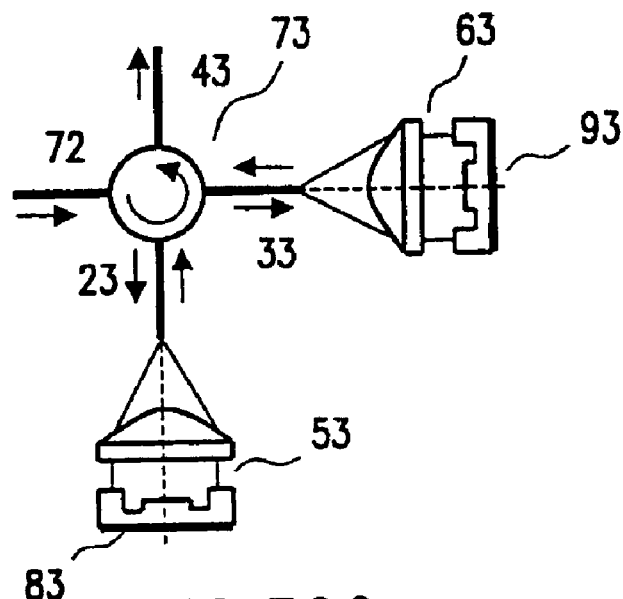

FIGS. 38A, 38B, and 38C show two-stage MRDD configurations.

Figure 39:
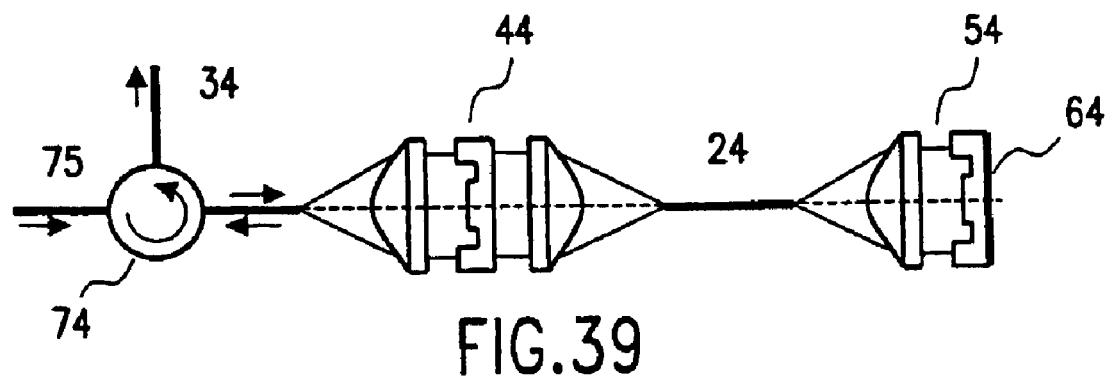

FIG. 39 shows a two-stage MRDD configuration employing a three-port coupler.

Figure 40B:
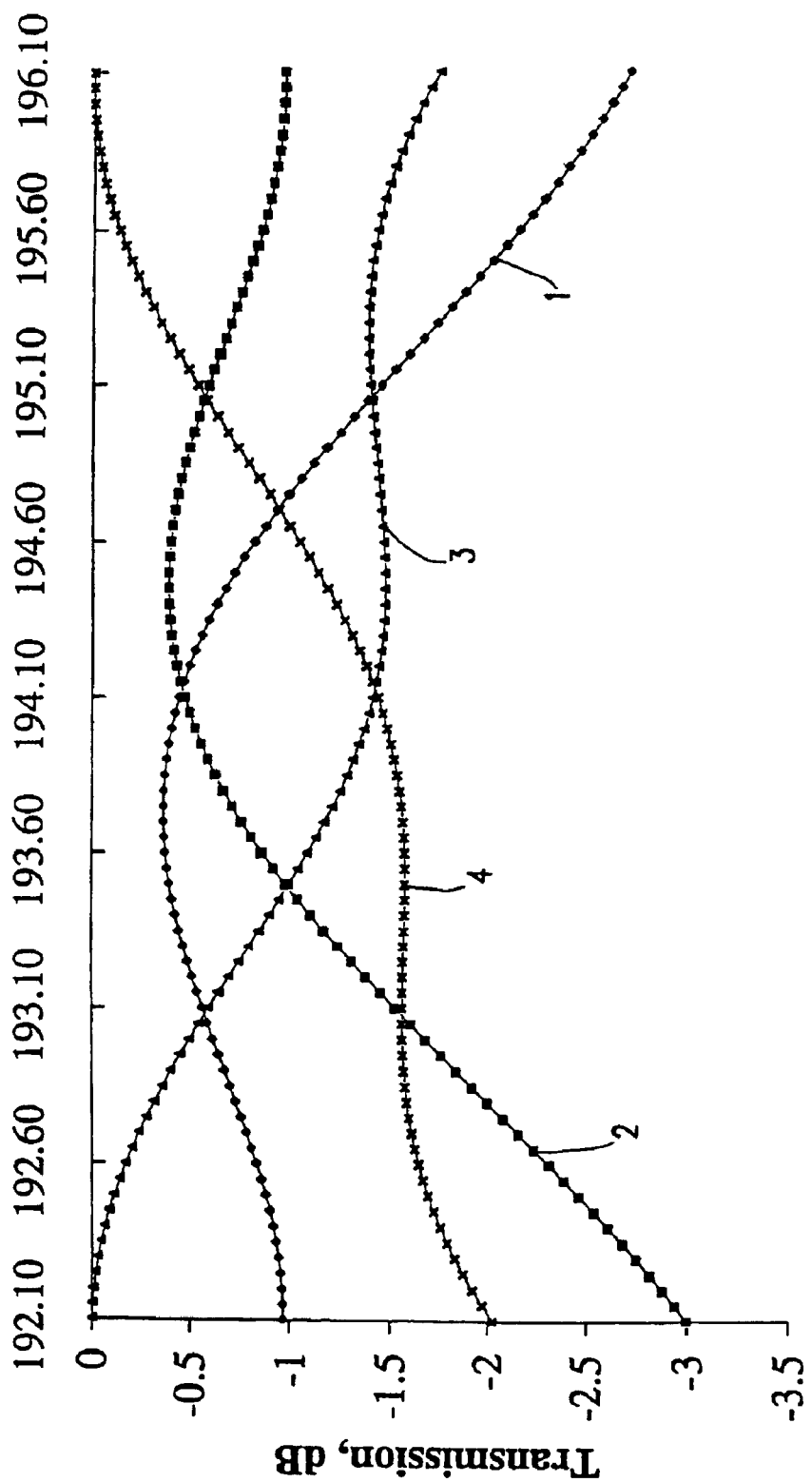

FIGS. 40A and 40B show spectral selectivity of two-stage transmissive MRDD configurations.

FIGS. 41A, 41B, 41C and 41D show add/drop configurations employing MRDDs.

FIGS. 42A, 42B, 42C, 42D, and 42E show 1 by N add/drop switches employing MRDDs.

Figure 43A:
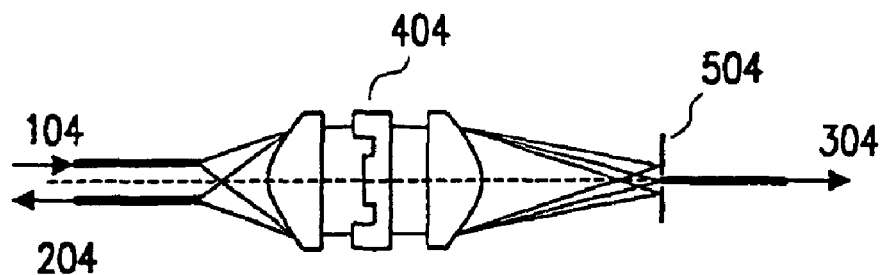
Figure 43B:
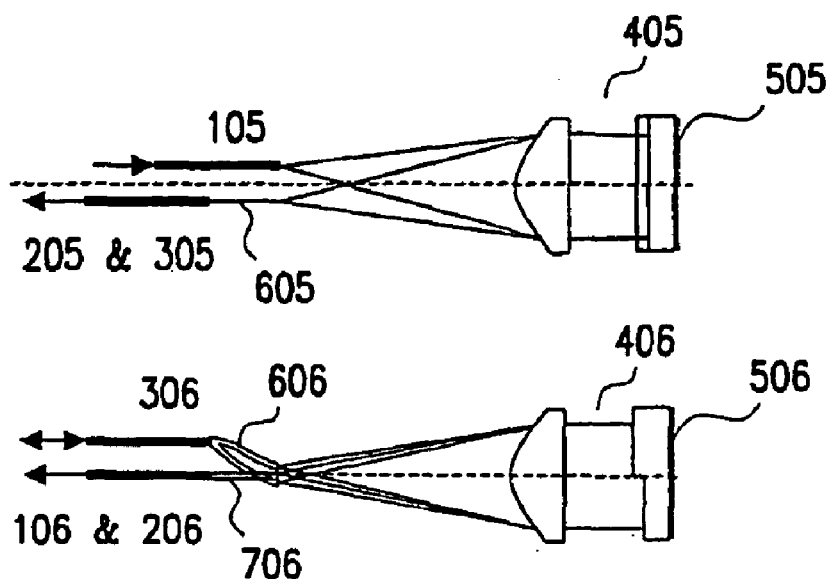
Figure 43C:
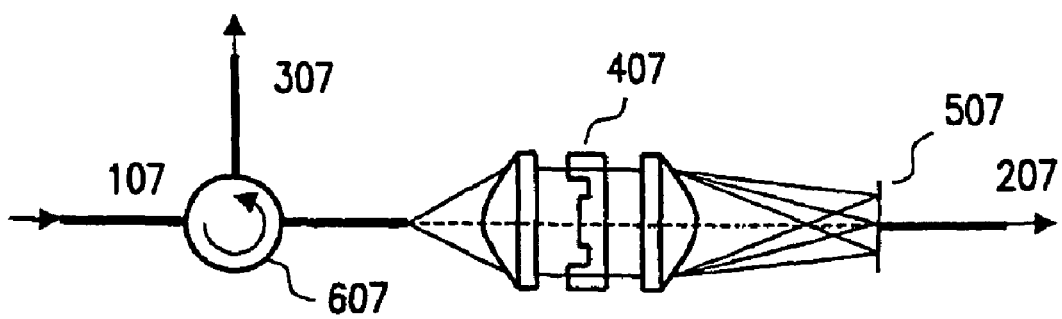

FIGS. 43A, 43B, and 43C show spectrally selective switches employing MRDDs.

Figure 44:
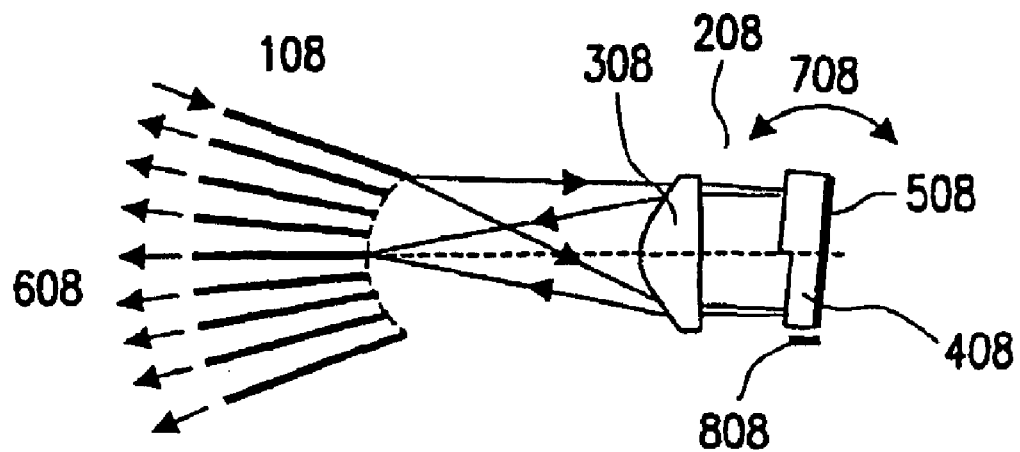

FIG. 44 shows a 1 by N spectrally selective switch/attenuator employing a MRDD.

Figure 45:
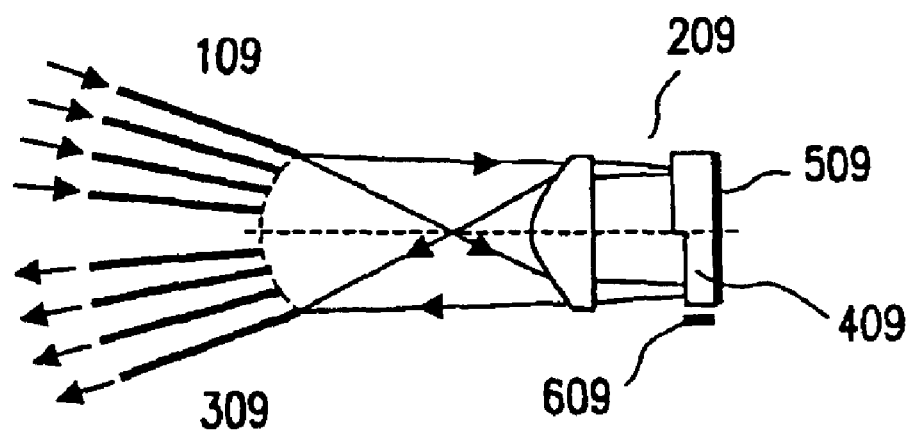

FIG. 45 shows an N by N spectrally selective switch and signal equalizer employing a MRDD.

Figure 46:
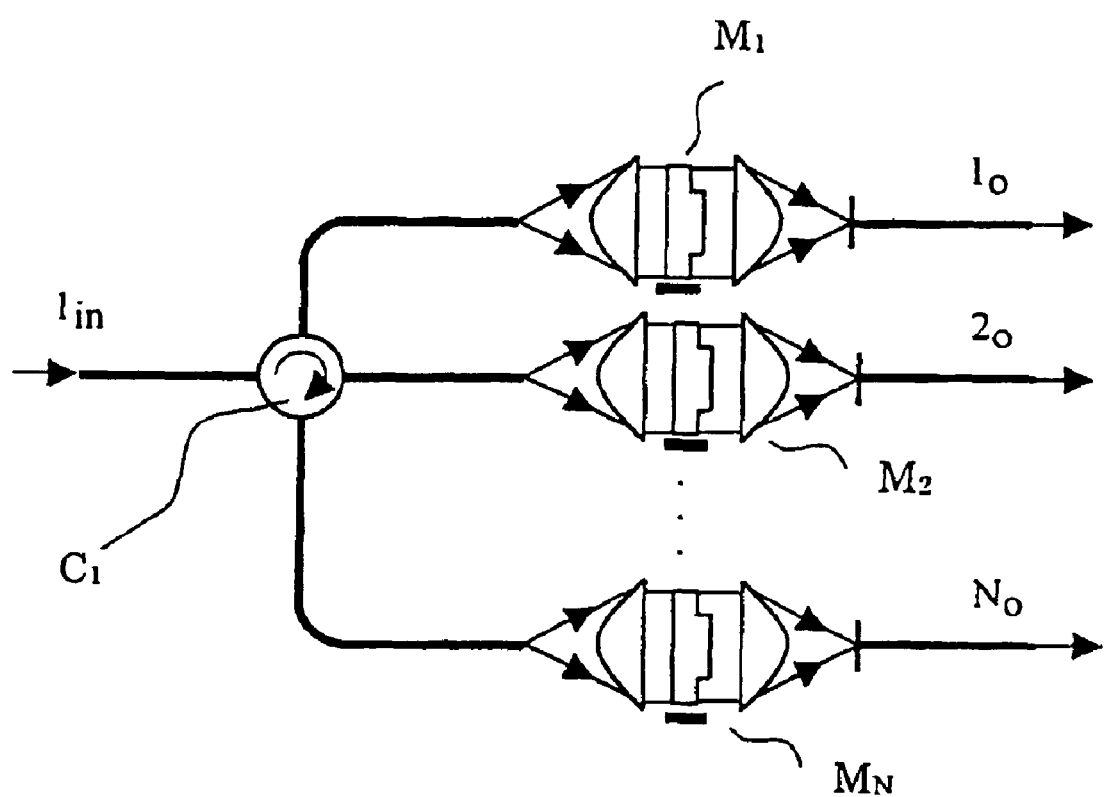

FIG. 46 shows a spectrally selective 1 by N switch, coupler and signal equalizer employing MRDDs.

Figure 47:
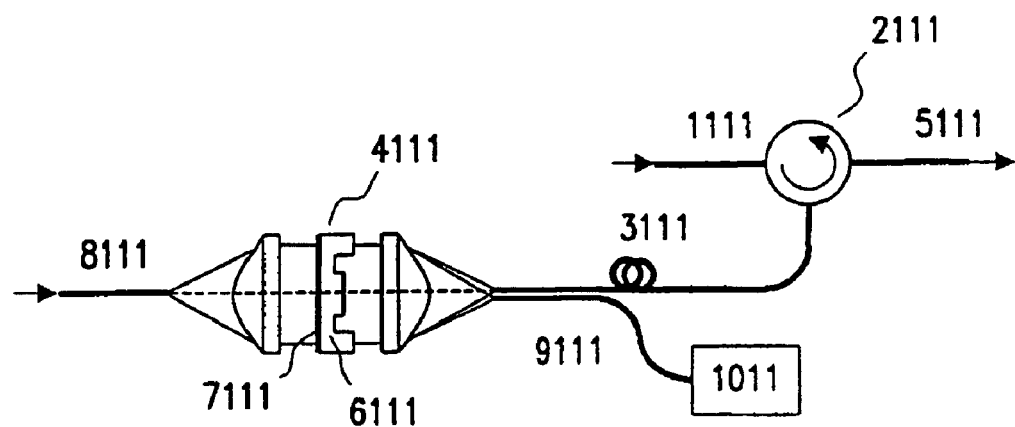

FIG. 47 shows a comb filter and signal equalizer for EDFAs employing a MRDD.

Figure 48:
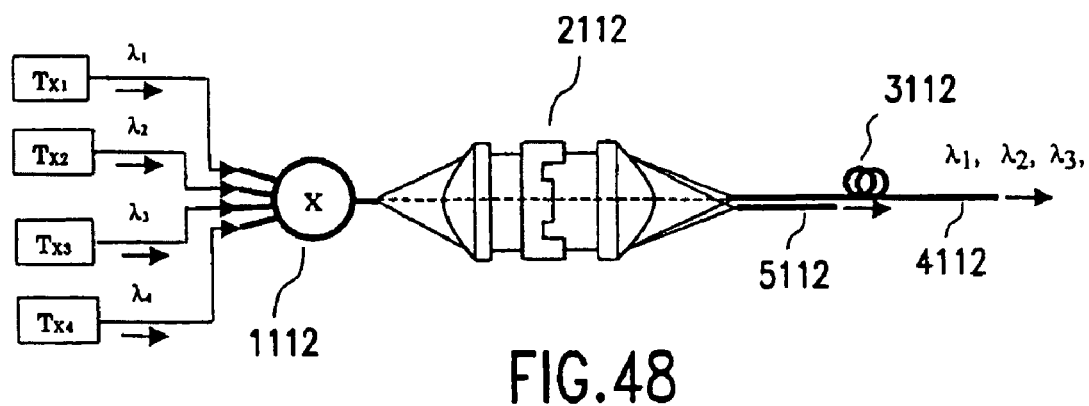

FIG. 48 shows a wavelength selective coupler, filter and signal equalizer with performance monitoring means employing a MRDD.

Figure 49A:
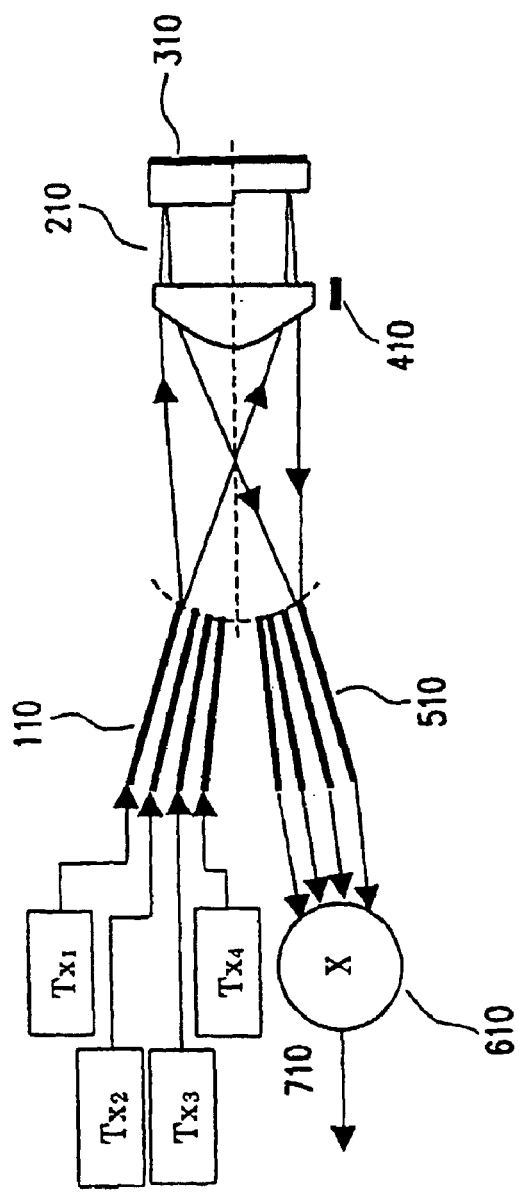
Figure 49B:
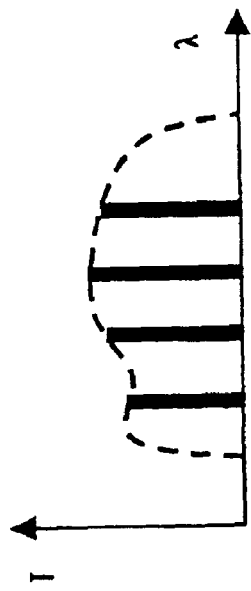

FIGS. 49A and 49B show a-MRDD used for spectral slicing of broadband sources.

Figure 50:
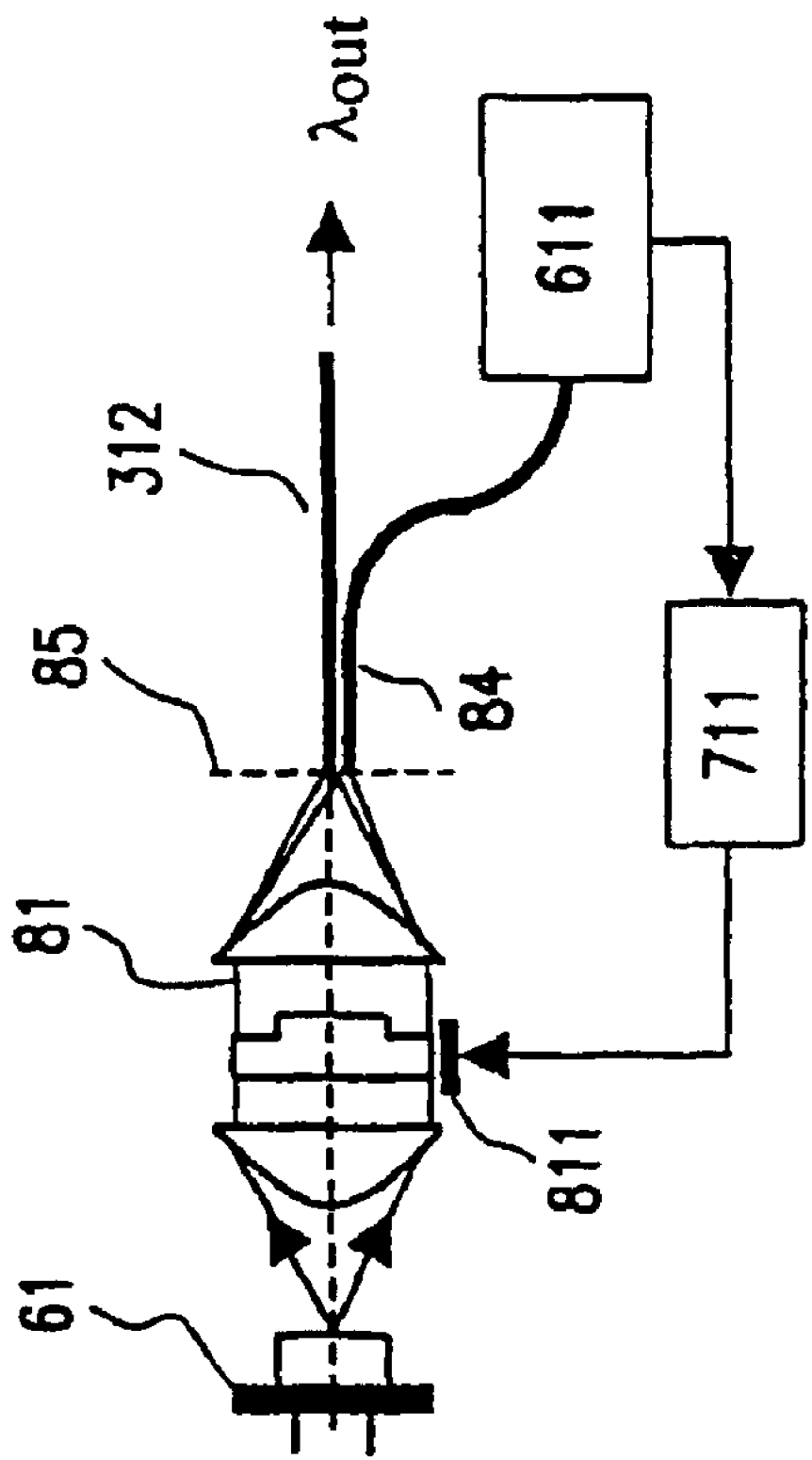

FIG. 50 shows laser diode coupling with active wavelength control employing a MRDD.

The three-dimensional intensity distributions at the focal plane of the focusing lens presented in the above figures were obtained using scalar diffraction calculations. More specifically, Gaussian beam decomposition techniques provided by the commercially available optical design computer program sold by Breault Research Organization, Inc., Tucson, Ariz., under the trademark ASAP, were used in the examples to compute the intensity distributions at the focal plane of the focusing lens of the device according to the present invention.

The foregoing drawings, which are incorporated in and constitute part of the specification, illustrate various embodiments of the invention, and together with the description, serve to explain the principles of the invention. It is to be understood, of course, that both the drawings and the description are explanatory only and are not restrictive of the invention.

V. DESCRIPTION OF THE PREFERRED EMBODIMENTS

1. Principles of Operation.

Diffraction by a lens aperture is a well known phenomenon that imposes a fundamental limitation on the point spread function of a lens with well-corrected aberrations. Propagation of a planar wavefront through a lens corrected for aberrations results in a spot size at the focal plane of the lens of a finite size. The wavelength of the propagating light and the working (f/#) of a lens determines the size of the diffraction pattern in the focal plane. Lenses with the same (f/#) exhibit in their focal planes diffraction patterns of identical size, while the peak intensity increases proportionally to the flux propagating through the lens.

For a lens with a circular aperture the diffraction pattern in the focal plane consists of a bright central spot (Airy disk) and several concentric rings with decreasing intensity. The Airy disk radius is defined as (W. J. Smith, Modern Optical Engineering, McGraw-Hill, Inc., 1990, p. 152):

$$D = 2.44 \lambda (f/\#) \tag{1}$$

where $\lambda$ is the wavelength of light and (f/#) is the working f-number of the lens. The working (f/#, of a lens is a function of the marginal ray angle $\alpha$ and the refractive index of the medium n surrounding the lens, and is calculated as:

$$f/\# = \frac{1}{2n\sin(\alpha)} \tag{2}$$

As an example, the Airy disk diameter for lenses with an (f/#) of 1.32 at the wavelength of 1.55 microns is calculated to be 4.99 microns.

For a given focal length the size of the diffractive pattern in the focal plane of the lens is dependent on the lens aperture. FIGS. 6A through 6C present the intensity distributions at the focal plane of lenses with a focal length of 20 mm and aperture sizes of 2.565 mm, 5.575 mm and 17.72 mm, respectively. This corresponds to lens (f/#)'s respectively of 4.0, 2.0 and 1.0 and Airy disk diameters calculated to be respectively 15.13 µm, 7.57 µm and 3.78 µm. As can be seen, the increase in (f/#) broadens the diffractive pattern in the focal plane of the lens.

Figure 1:
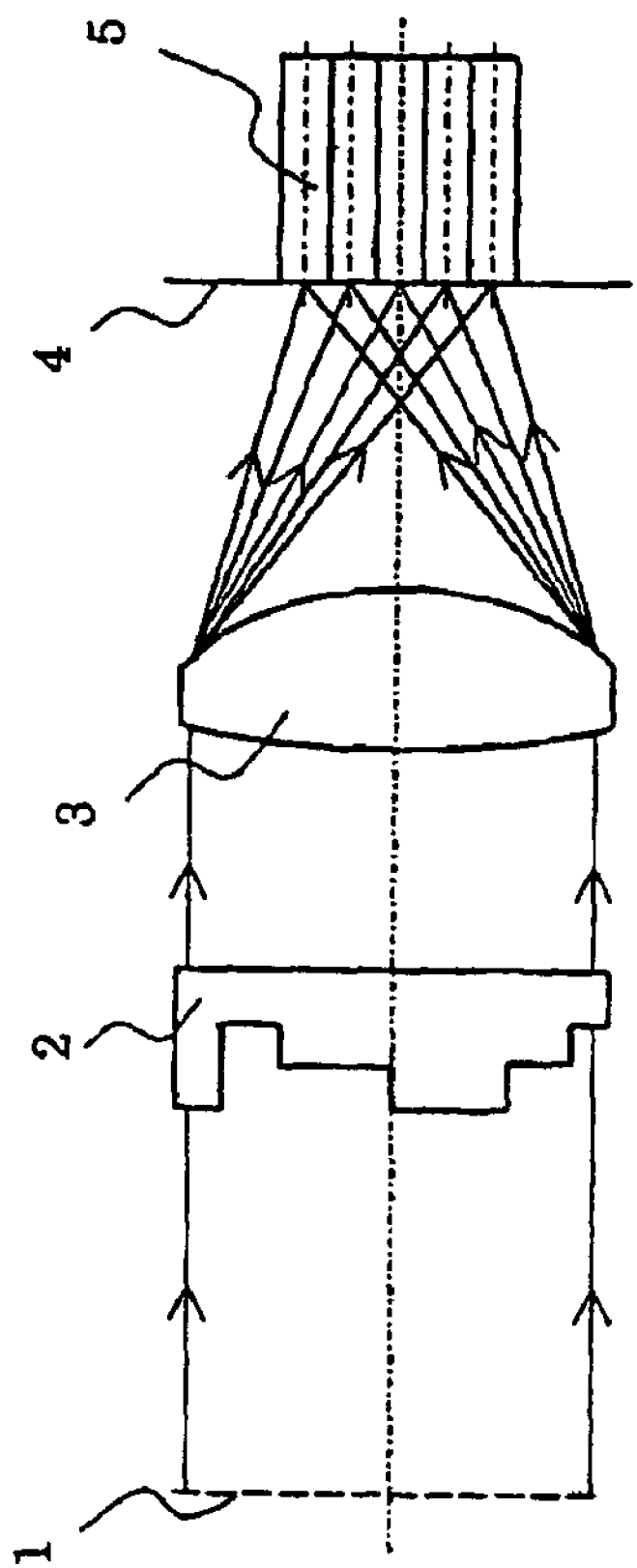
FIG. 1 illustrates a general optical layout of a device according to the present invention.

In an optical information processing device according to the present invention, the DS is placed in a collimated beam before a focusing lens, as indicated in FIG. 1. Diffraction of a plane wavefront by the DS transforms the wavefront into an intensity distribution at the focal plane of the lens where a fiber array or detector array is placed. The aperture of the DS can be equal to or different from the lens' aperture. In the following analysis we will assume that the aperture size of the diffractive structure matches the aperture size of the lens. In the case where the apertures do not match each other the distribution at the focal plane of the lens can differ from that disclosed below and the actual aperture sizes need to be included when computing the light distributions at the focal plane of the focusing lens.

Although in the examples below the components of the device according to the invention have axial or planar symmetry, the invention is not so limited. Rather, the DS can be axially asymmetric or the focusing optics can be of the off-axis type.

When the planar wavefront propagates through the diffractive structure, the components of the structure introduce Optical Path Differences (OPDs) to the portions of the wavefront propagating through the individual components of the structure. The OPD introduced by i-th and j-th components of the diffractive structure into their respective portions of the propagating wavefront is proportional to the axial offset $t_{ij}$ between i-th and j-th components of the DS and is calculated as:

$$OPD = t_i n_i - t_j n_j - (t_i - t_j) n_S \quad (3)$$

where $n_i$ and $N_j$ are respectively the refractive indices of the respective components and $n_S$ is the refractive index of the surrounding media; $t_i$ and $t_j$ are the axial lengths of the i-th and j-th components of the diffractive structure, that satisfy the inequality $t_i > t_j$.

When th components of the diffractive structure are made from the same material that has the refractive index $n_M$, equation (3) reduces to:

$$OPD = (t_i - t_j)(n_M - n_S) = t_{ij}(n_M - n_S) \quad (4)$$

where $t_{ij}$ is the value of the axial offset between the i-th and j-th components of the diffractive structure. The magnitude of the offset $t_{ij}$ between the individual components of the diffractive structure can be made as small as a fraction of the wavelength or several wavelengths, or as high as several thousands or millions of wavelengths, depending on the required device resolution, e.g., the spacing between wavelengths which are to be separated or routed. In some of the following embodiments of the present invention $t_{ij}$ was chosen such that its ratio to the smallest offset $t_{min}$ between components of the structure is an integer number m (m=1, 2 . . . ):

$$m = \frac{t_{ij}}{t_{min}} \quad (5)$$

In this case when the OPD introduced by the smallest offset $t_{min}$ is equal to an integer number of the working wavelength $\lambda_k$, i.e. when $$k = \frac{t_{min}(n_M - n_S)}{\lambda_k} \quad (6)$$

where k=1, 2, . . . , the DS has no effect on the shape and size of the light distribution in the focal plane of the focusing lens. When the ratio k defined by (6) is not equal to an integer, the distribution in the focal plane of the focusing lens will change in accordance with the teaching of the present invention.

2. Effects of Lens Axial Color.

When a diffraction-limited refractive singlet is used as a focusing lens in a device according to the present invention, the position of the focal plane will depend on the wavelength of light propagating through the system. This is due to the refractive index of the lens material being a function of the wavelength of light, causing axial chromatic aberration.

Consider the focusing lens to be a refractive singlet made from fused silica, having a focal length of 20 mm, (f/#) of 2.0 and corrected for spherical aberration at 1.5500 µm. The first surface of the singlet is planar and the second surface is an asphere with a radius of curvature of −8.8805 mm, conic constant of −2.085204 and an aperture radius of 5.575 mm, corresponding to an (f/#) of 2.0. Because the index of refraction of fused silica is a function of wavelength, the singlet has axial color, i.e., the position of the focal plane of the singlet is a function of the wavelength of light. To obtain a desired intensity distribution at the focal plane, the position of the registration plane should be adjusted for each individual wavelength. If the position of the focal plane for the wavelength 1.5500 µm is considered to be nominal, then for wavelengths of 1.5066 µm and 1.5959 µm the position of the plane of registration needs to be adjusted by displacing it from the nominal position respectively by −26.5 µm and 28.5 µm. The intensity distributions for wavelengths of 1.5066 µm, 1.5500 µm and 1.5959 µm at the respective focal planes of the refractive singlet are presented respectively in FIGS. 7A through 7C.

Figure 7A:
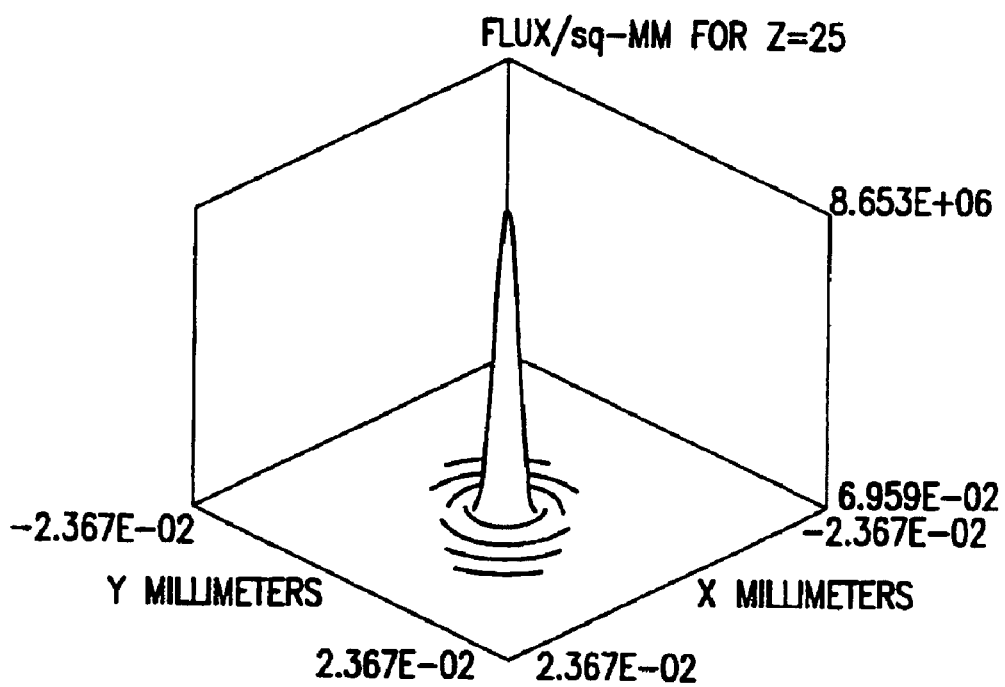
Figure 7B:
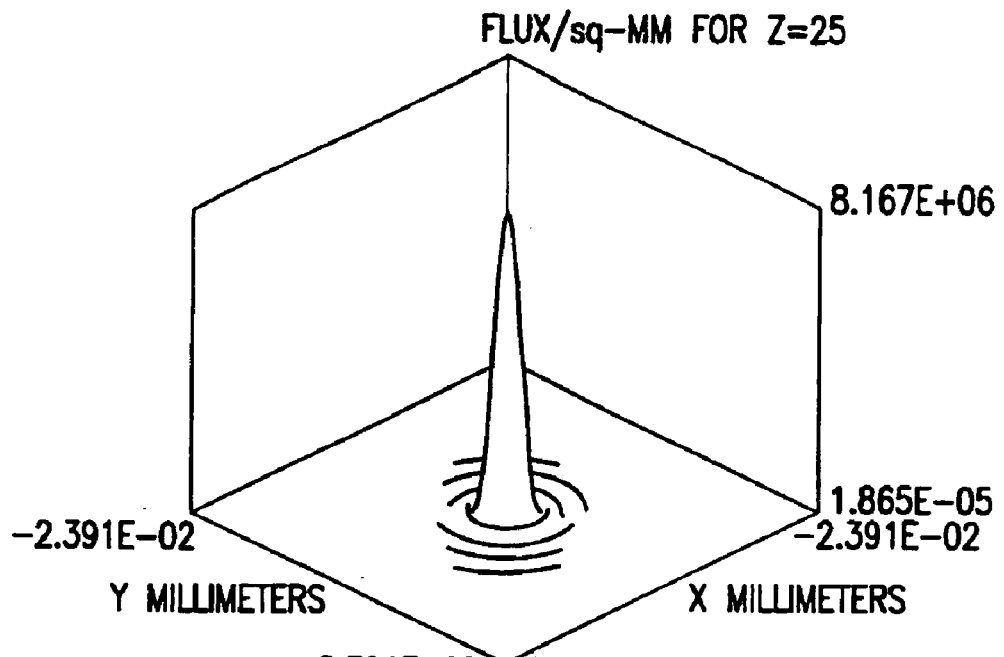
Figure 7C:
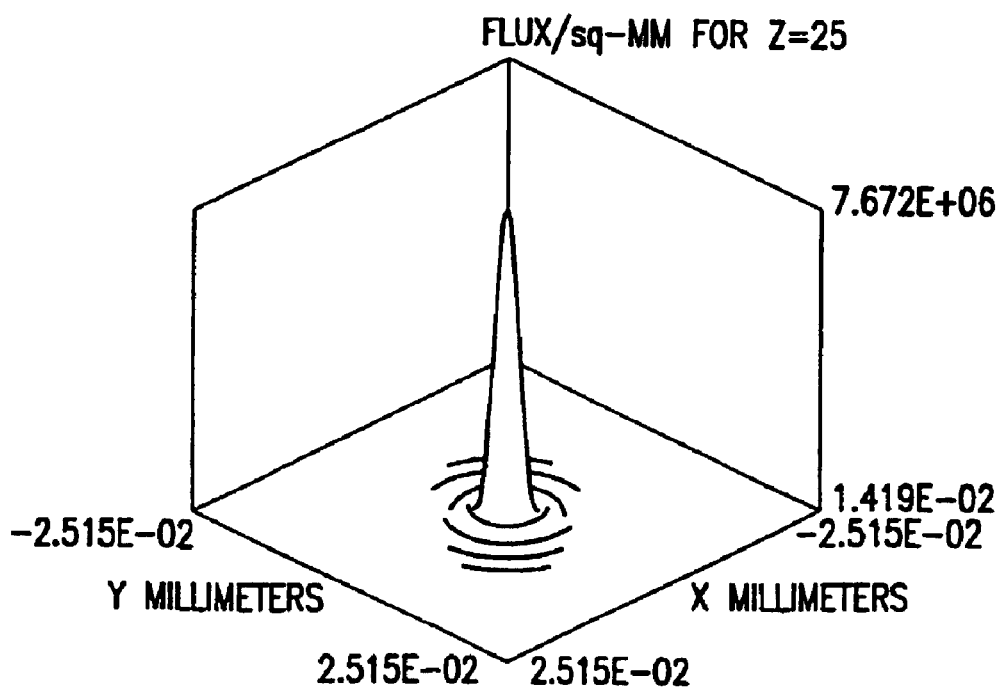
Figure 7D:
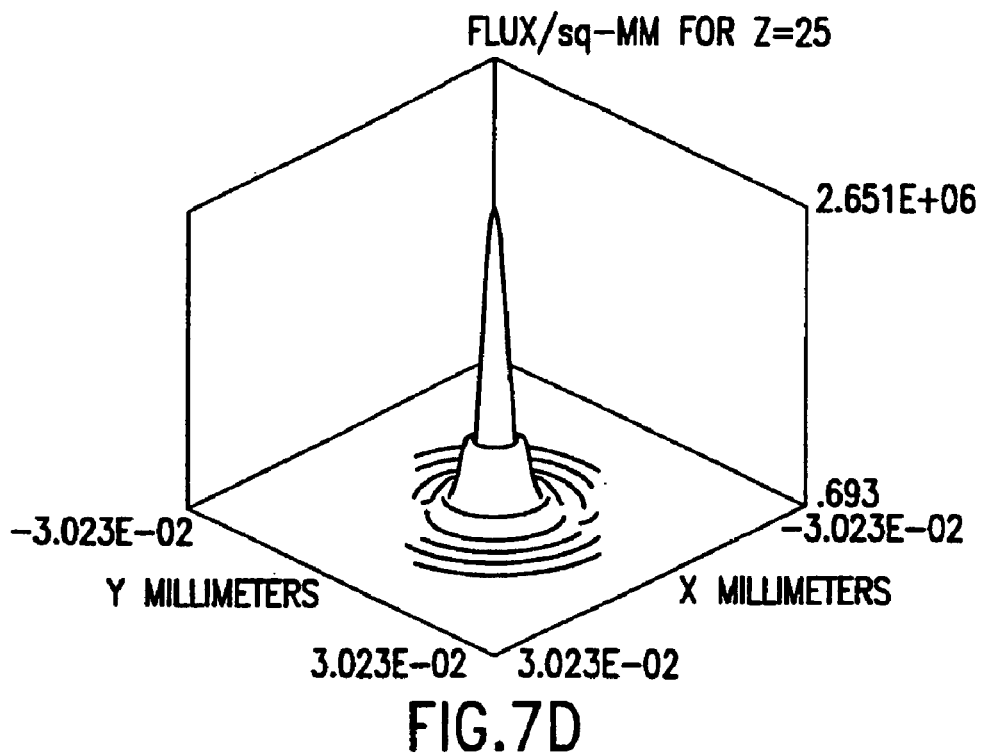
Figure 7E:
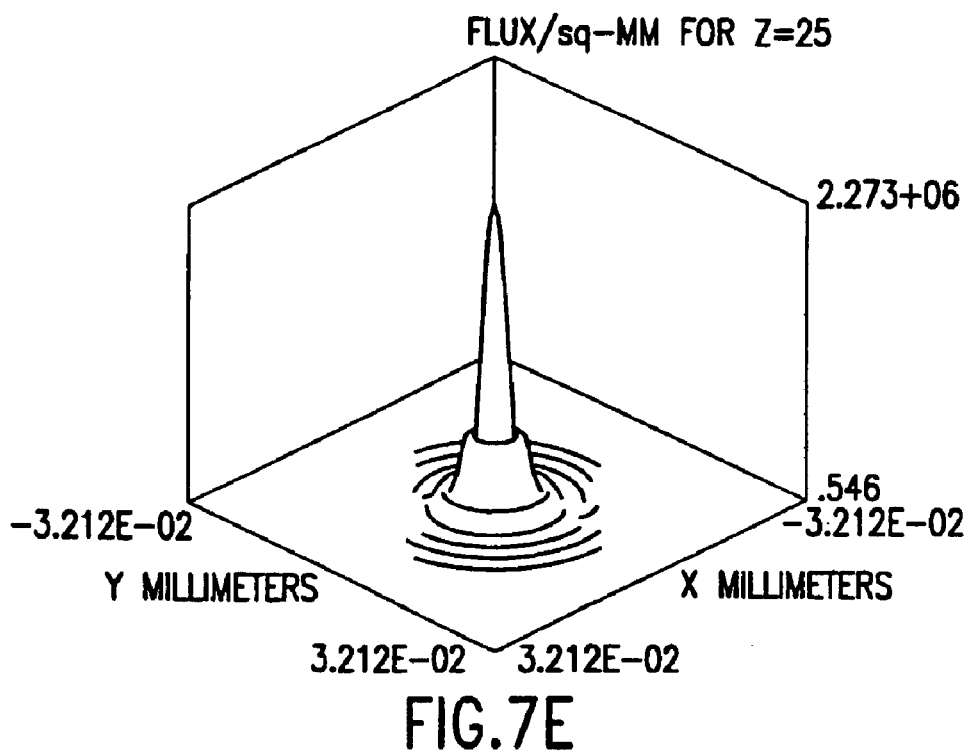

Although the adjustment in position of the registration plane based on the wavelength of light is possible, in many cases it is desirable to keep the relative position of the focusing lens and the plane of registration constant. When the registration plane for the above singlet is located at the nominal location that corresponds to the focal plane position at 1.5500 µm, the light distribution pattern at that plane for other wavelengths is defocused. FIGS. 7D and 7E present the intensity distributions at wavelengths of 1.5066 µm and 1.5959 µm when the registration plane is not adjusted for the focal shift and is located at the nominal position corresponding to the focal plane position at the wavelength of 1.5500 µm. FIGS. 7D and 7E show substantial broadening of the diffraction pattern as well as reduction in the peak intensity. The Strehl ratio for FIGS. 7D and 7E was reduced respectively to 0.31 and 0.30 from 0.99 (for FIGS. 7A through 7C). When a fiber array is positioned at the nominal focal plane of the refractive singlet with axial chromatic aberration, substantial coupling losses and crosstalk can compromise the performance of the optical information-processing device according to the present invention. When a detector array is placed at the focal plane of a focusing system with axial chromatic aberrations, the broadening of the diffraction pattern will cause resolution reduction of the device.

To avoid the above problems, an achromatic lens is preferably employed as the focusing element in optical information-processing devices according to the invention. Achromatic lenses can be produced by, for example, using a doublet consisting of two different materials in a traditional crown-flint combination, or by using a hybrid refractive-diffractive singlet. In both cases, the primary axial color is corrected, reducing the amount of crosstalk and coupling losses for a finite spectral range. The residual axial color known as secondary spectrum is proportional to the spectral band of the light propagating through the system. The amount of secondary spectrum can be reduced, if necessary, by employing an apochromatic focusing lens. The design of apochromatic lenses is well established in optics, see for example, Handbook of Optics, Michael Bass, editor in chief, 2nd ed., V. 1, p. 32.15, McGraw-Hill, Inc., 1995. A reflective focusing system inherently does not have axial chromatic aberration and can also be used as a focusing element in devices according to the present invention.

Without intending to limit it in any manner, the present invention will be more fully described by the examples of the following embodiments.

Embodiment 1

The device according to the first embodiment is shown in FIG. 8A. It consists of a DS 11, focusing lens 12 and an array of fibers 13. The device is designed for use in the wavelength range of 1.500 $\mu$m through 1.600 $\mu$m with the nominal wavelength chosen to be 1.55 $\mu$m. The diffractive structure 11 is made from fused silica. The refractive index of fused silica at the wavelengths of 1.50 $\mu$m, 1.55 $\mu$m and 1.60 $\mu$m is equal respectively to 1.4446, 1.4440 and 1.4434 (the values used in calculating the intensity distributions set forth below were 1.44461766, 1.44402362 and 1.443419).

DS 11 comprises a cylindrical body with one end of the body being a planar surface and the other end being composed of two semi-circular sectors S1 and S2 axially offset by a distance t. The offset t was chosen to be 0.349 mm.

This embodiment employs a hybrid refractive-diffractive achromatic focusing singlet 12. The singlet 12 is made from fused silica, has a focal length of 20 mm, an aperture radius of 5.575 mm, an (f/#) of 2.0 and is corrected for both spherical aberration at 1.5500 $\mu$m and axial color within the operative wavelength range of 1.500 $\mu$m through 1.600 $\mu$m. The first surface of the singlet is a Stepped Diffractive Surface (SDS). SDSs are described in detail in commonly assigned U.S. patent application Ser. No. 09/384,746, entitled "Optical Systems Employing Stepped Diffractive Surfaces", filed in the name of Yakov G. Soskind, the contents of which are incorporated herein by reference. See also PCT Patent Publication No. WO 00/13048 which was published on Mar. 9, 2000. The SDS has a concave base surface with radius of curvature of −251.374 mm and a constant step height of 3.49 $\mu$m. The second surface is a refractive asphere with radius of curvature of −8.8805 mm and a conic constant of −2.0852. The hybrid singlet is corrected for axial color; i.e., the focal plane position within the operative wavelength range does not deviate substantially from the nominal focal plane position.

The fiber array 13 consists of three fibers 14, 15 and 16. As shown in FIG. 8 the fibers are oriented in a plane normal to the boundary between the semicircular sectors of DS 11. Fiber 15 is located on-axis, while fibers 14 and 16 are symmetrically displaced from the axis. The OPDs for different wavelengths propagating through the DS can be tuned by rotating the DS relative to an axis that is perpendicular to the optical axis as shown in FIG. 8B.

Mode 1: Coupling Mode of Operation

The OPD introduced by the offset t between the sectors of DS 11 can be expressed as a number of waves by using equation (4). At the nominal wavelength of 1.55 $\mu$m the offset t=0.349 mm corresponds to an OPD of 100 waves. There are other wavelengths within the working wavelength range of 1.500 $\mu$m through 1.600 $\mu$m that correspond to an OPD which is an integer number of waves, as shown in Table 1 below.

For the wavelengths listed in Table 1 the diffractive structure has no effect on the diffractive pattern in the focal plane of the lens, i.e., the light propagates through the device as if there was no DS in the path. The wavelength spacing varies from 14.2 nm to 15.6 nm. The light is focused into the axial fiber 15. The Airy disk size is defined only by the lens' f/# and the wavelength of light propagating through the system. The coupling efficiency into fiber 15 depends on the fiber core size and the size of the diffractive pattern.

FIG. 9 presents a three-dimensional light distribution at the focal plane of the achromatic refractive-diffractive singlet for the wavelength 1.5353 $\mu$m listed in Table 1. Light distributions for the other wavelengths listed in Table 1 are similar, differing slightly in Strehl ratios. The Strehl ratio for the respective wavelengths is listed in the third row of Table 1, indicating almost perfect focusing. The regime of this table corresponds to a coupling mode of operation, where most of the light at the wavelengths listed is directed into optical fiber 15 of fiber array 13.

Mode 2: Operation as a Splitter/Divider

Given the same offset t=0.349 mm between the segments of DS 11, there are certain wavelengths within the operative wavelength range that have a remainder of the OPD equal to half a wave. These wavelengths, as well as the respective OPDs, are listed in Table 2.

The wavelength spacing varies from 14.3 nm to 15.5 nm. FIG. 10 presents a three-dimensional light distribution at the focal plane of the focusing lens 12 for the wavelength 1.5426 ;$\mu$m. The other wavelengths in Table 2 yield similar distributions. As shown in FIG. 10, the propagating wavefront is split at the focal plane of the lens 12 into two equal beams laterally offset in the direction normal to the boundary of the semi-circular sectors of DS 11. This regime corresponds to a splitting mode of operation, where most of the light at the wavelengths listed in Table 2 is equally split between two optical fibers 14 and 16 from the fiber array 13. At the same time there is almost no light propagating on-axis, so the wavelengths shown in Table 2 would be effectively isolated from the fiber 15 located on-axis.

For any wavelength within the working range that is not listed in Tables 1 and 2, the input wavefront is split at the focal plane of the focusing lens into two unequal beams. Table 3 presents a progression of wavelengths from 1.550 $\mu$m through 1.565 $\mu$m, as well as respective OPDs associated with these wavelengths.

FIGS. 11A through 11G show three-dimensional light distributions at the focal plane of the focusing lens 12 for the wavelengths listed in Table 3 in ascending order.

Figure 11A:
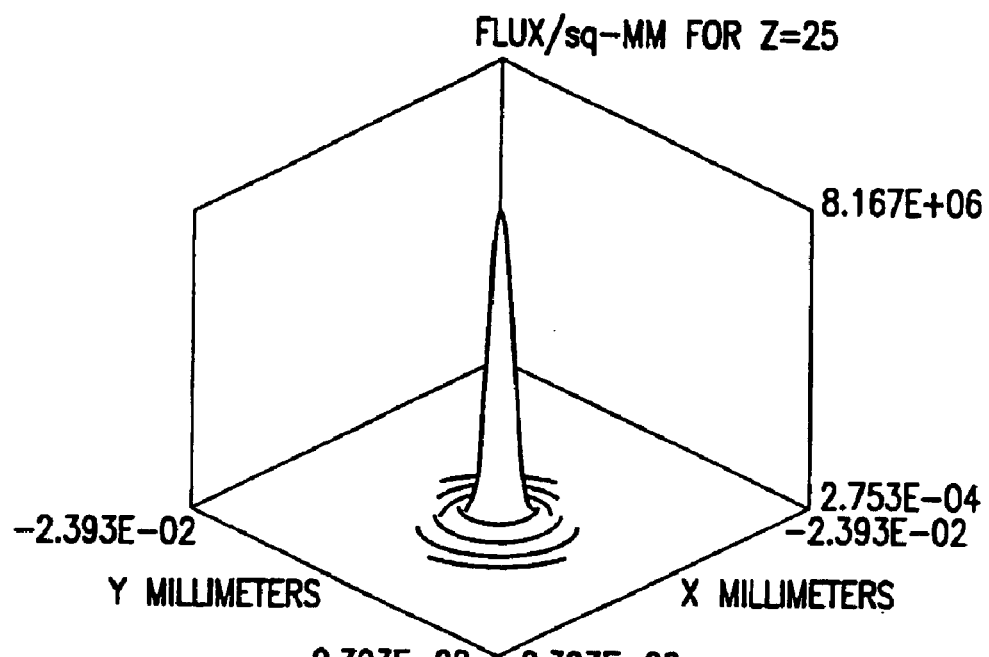
Figure 11B:
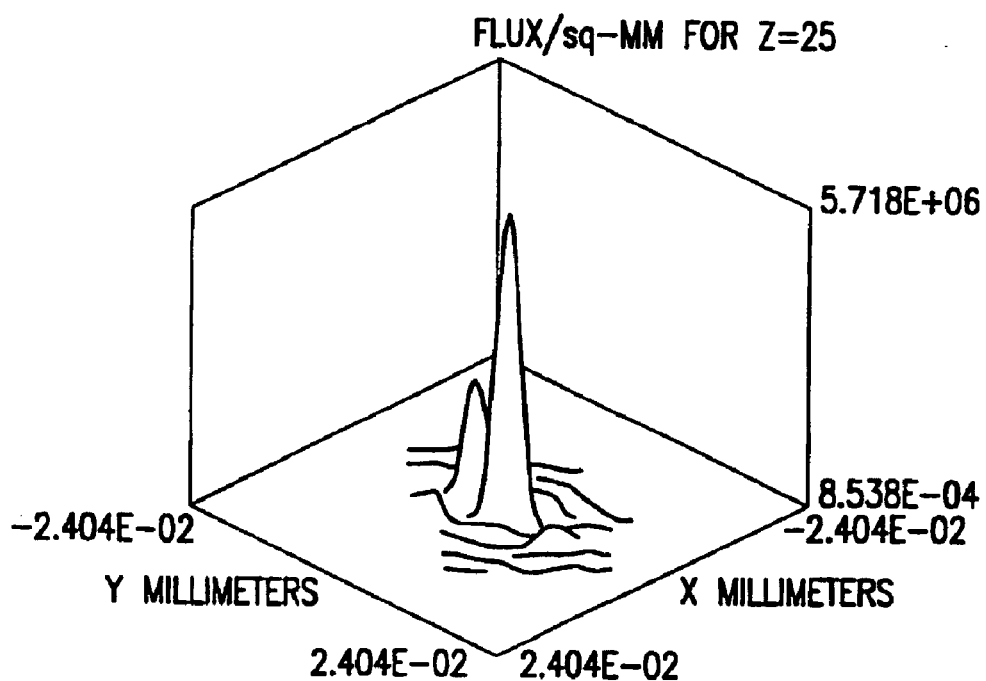
Figure 11C:
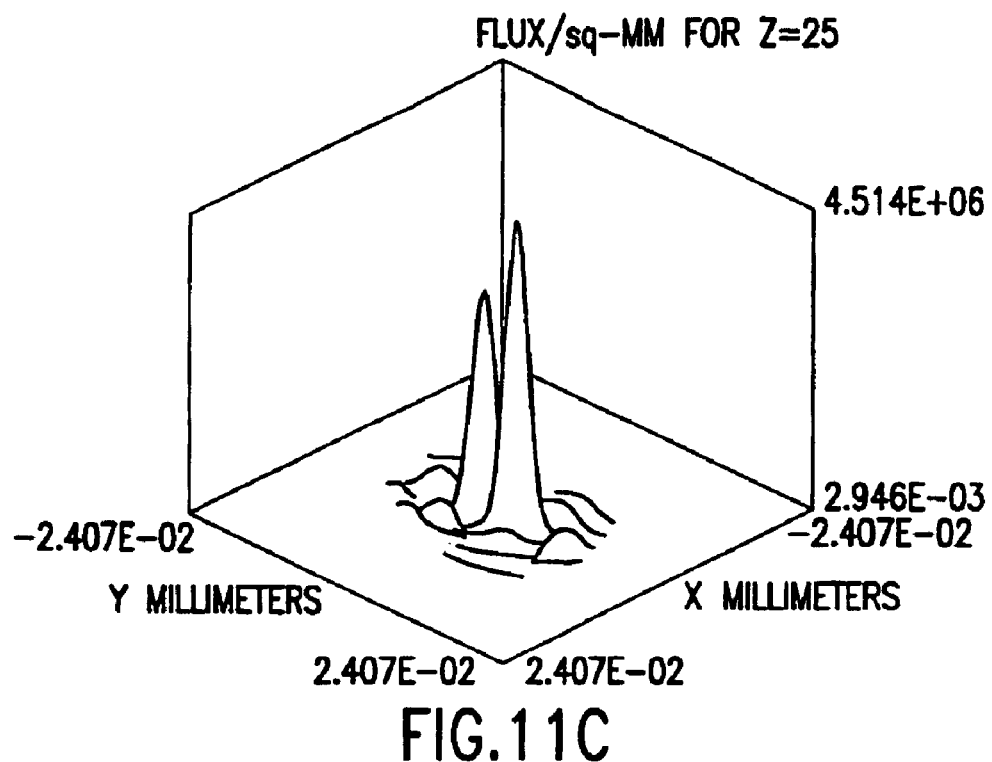
Figure 11D:
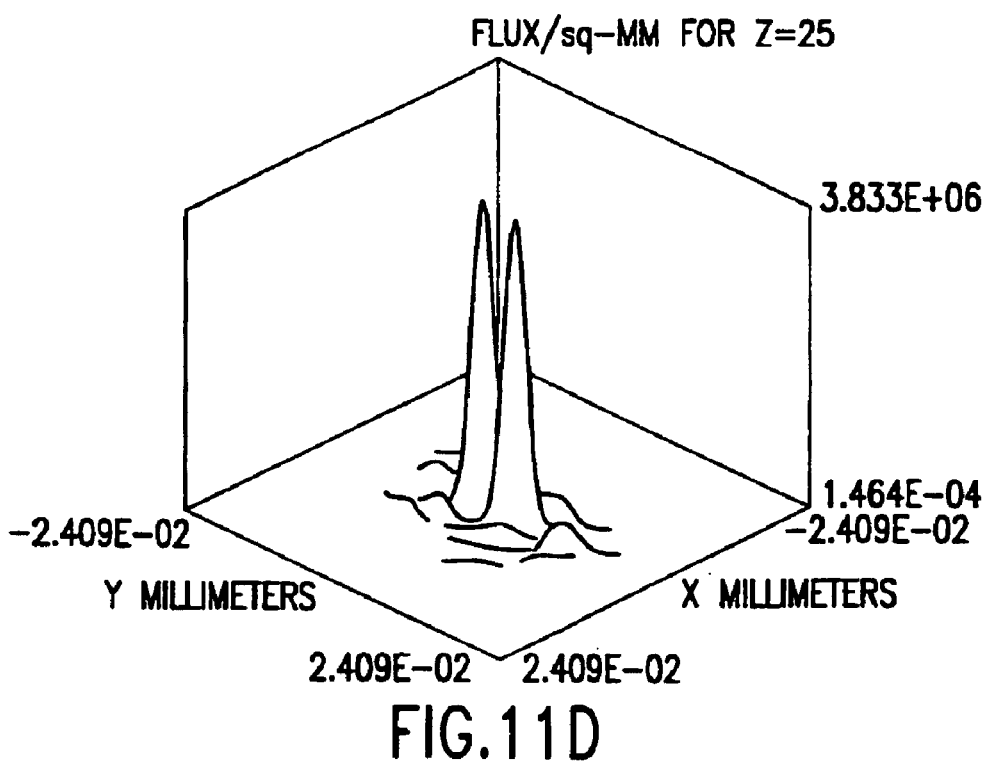
Figure 11E:
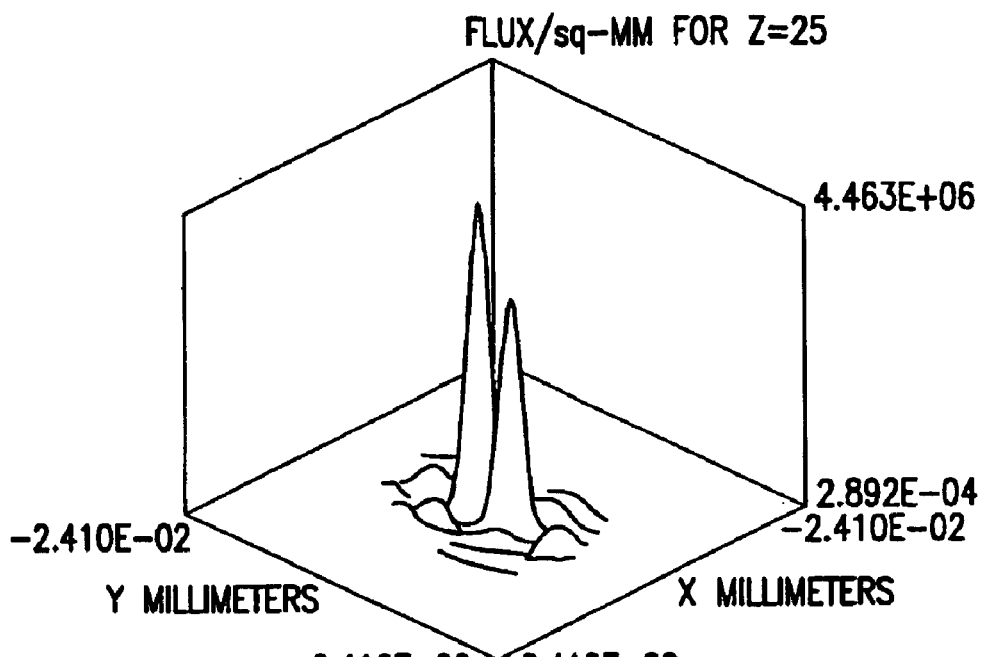
Figure 11F:
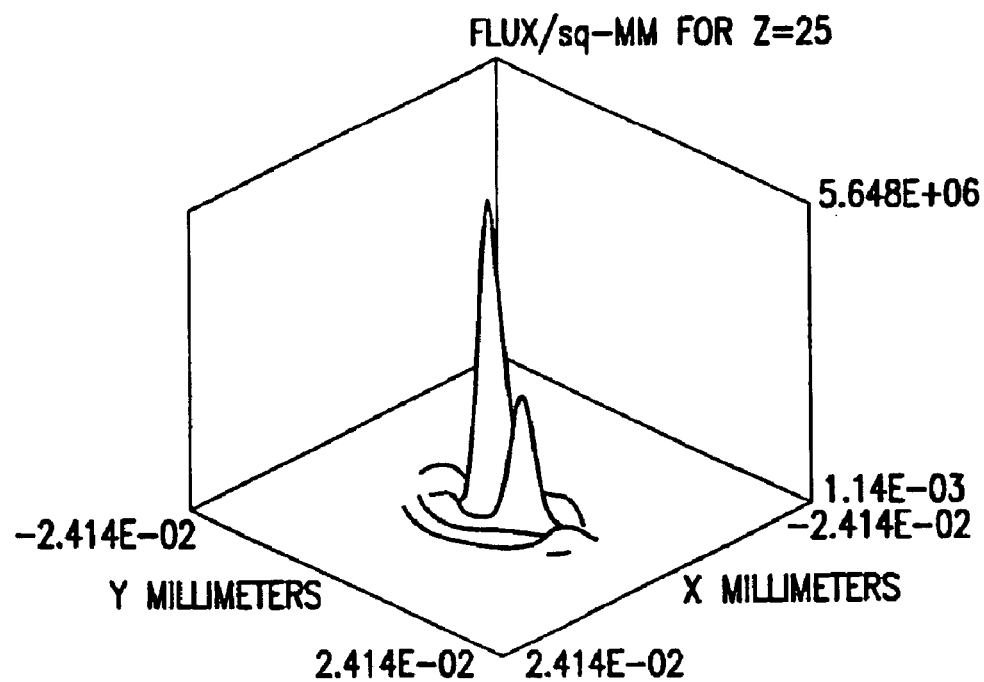
Figure 11G:
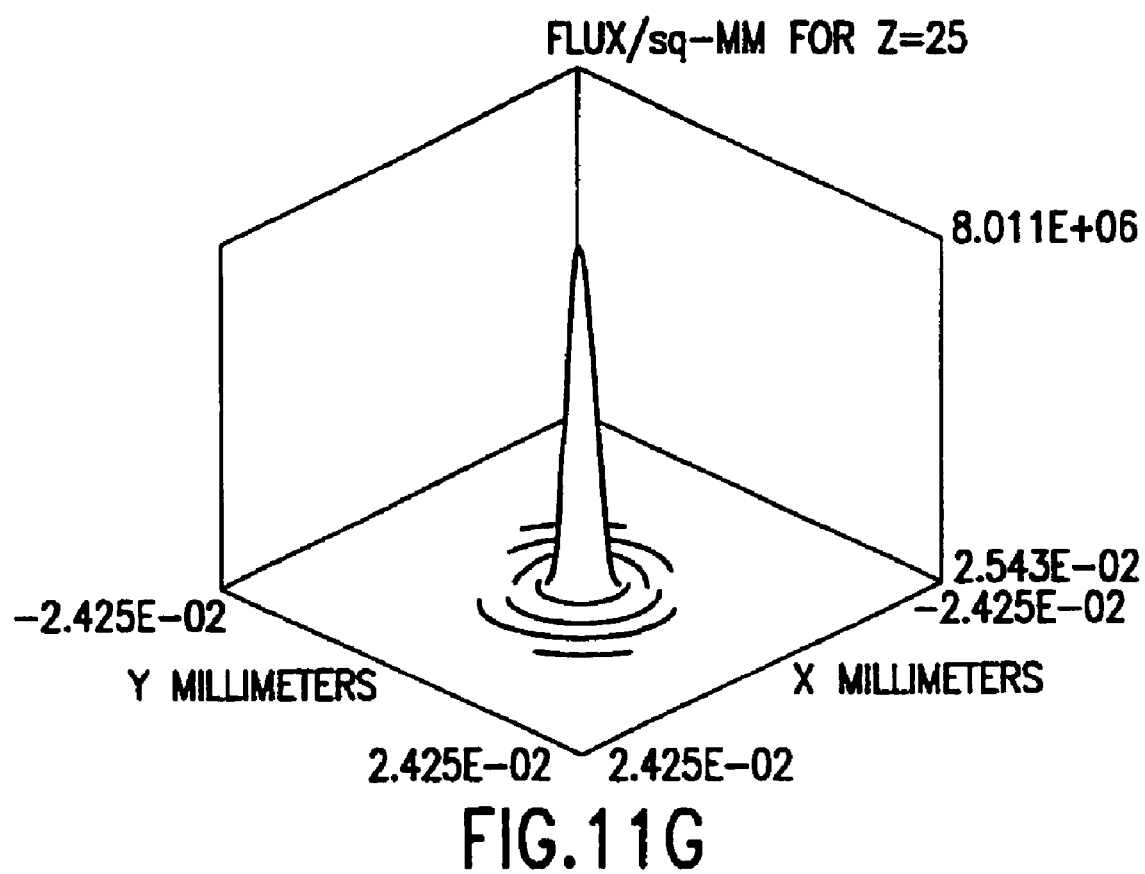

As shown in FIGS. 11B and 11C, when the OPD remainder exceeds 0.5 waves, the beam that is opposite to sector S2 of the DS has higher flux than the beam that is opposite sector S1. When the OPD remainder is less than 0.5 waves, the beam that is opposite to sector S1 of the DS has higher flux than the beam that is opposite sector S2. This is illustrated in FIGS. 11E and 11F.

Mode 3: Optical Switch

In the switching mode only a single fiber from the fiber array 13 is considered. The fiber can be placed on-axis or off-axis. The diffractive structure (DS) of this embodiment is made from an optical material that allows control of the OPD introduced by the axial offset between the sectors (components) of the structure. Different physical principles can be used to achieve this control e.g., the physical length of the step t, the refractive index of the DS material and/or the surrounding medium, or both the step length and the indices can be controlled. Controlled change of the temperature, pressure, electric or magnetic field at the DS can be used to tune the output of the device according to the present invention. Active refractive index-changing mechanisms are described for example in the Handbook of Optics, Michael Bass, editor in chief, 2nd edition, Vol. 2, McGraw-Hill, Inc., 1995, pp. 6.8–6.12.

The tunable properties of the device will now be demonstrated for a few wavelengths from the working wavelength range. It is to be understood that analogous behavior is observed for other wavelengths.

For the wavelengths listed in Table 1 high coupling efficiency into fiber 15 located on-axis is achieved. Similarly, for the wavelengths listed in Table 2, high coupling efficiency into off-axis fibers 14 and 16 is achieved. If the OPD for a given wavelength is changed by 0.5 waves, then the amount of light coupled into the on-axis or off-axis fibers, as the case may be, is minimized. For example, at the normal conditions the refractive index of fused silica at the wavelength of 1.55 μm is 1.4440, so that the OPD for the offset t=0.349 mm is 100 waves. As shown in mode 1, most of the incoming light propagates on-axis and is coupled into the fiber 15. That corresponds to the "on" position of the switch. If the OPD is changed by 0.5%, corresponding to an OPD change of 0.5 waves, the light is effectively split into two beams offset from the optical axis. No light is propagating on-axis, corresponding to the "off" position for light propagating through the fiber 15. Similar switching performance is observed for the other wavelengths in Table 1.

For the wavelength 1.5575 μm in Table 2 at the normal conditions the OPD for the offset t=0.349 mm is 99.5 waves and the light is evenly split between the two off-axis fibers 14 and 16 ("on" position). If the OPD is changed by 0.5 waves (by an appropriate change in the refractive index and/or the length of the DS), the light is effectively combined into one beam propagating on-axis. No light is propagating off-axis, corresponding to the "off" position for the fibers 14 and 16. Similar switching performance is observed for the other wavelengths in Table 2.

Mode 4: Adjustable Splitter/Attenuator

This mode of operation can be used to split the incoming flux at a given wavelength between two output beams in a desired proportion. This mode of operation allows using the device as a variable attenuator for signal conditioning. In this mode of operation, the incoming beam is divided between one or two beams with different amounts of light in each beam by controlling the OPD between the two sectors S1 and S2 of DS 11. Table 4 shows how the number of beams at the focal plane and their intensity ratio changes as a function of the OPD change.

FIGS. 12A through 12G illustrate the progression of three-dimensional intensity distributions in the focal plane of lens 12 when the OPD introduced by DS 11 at the nominal wavelength of 1.500 μm changes from 100 waves to 99 waves, as indicated in Table 4. Those OPD changes can be accomplished, for example, by respective changes in the refractive index of the DS medium.

Figure 12A:
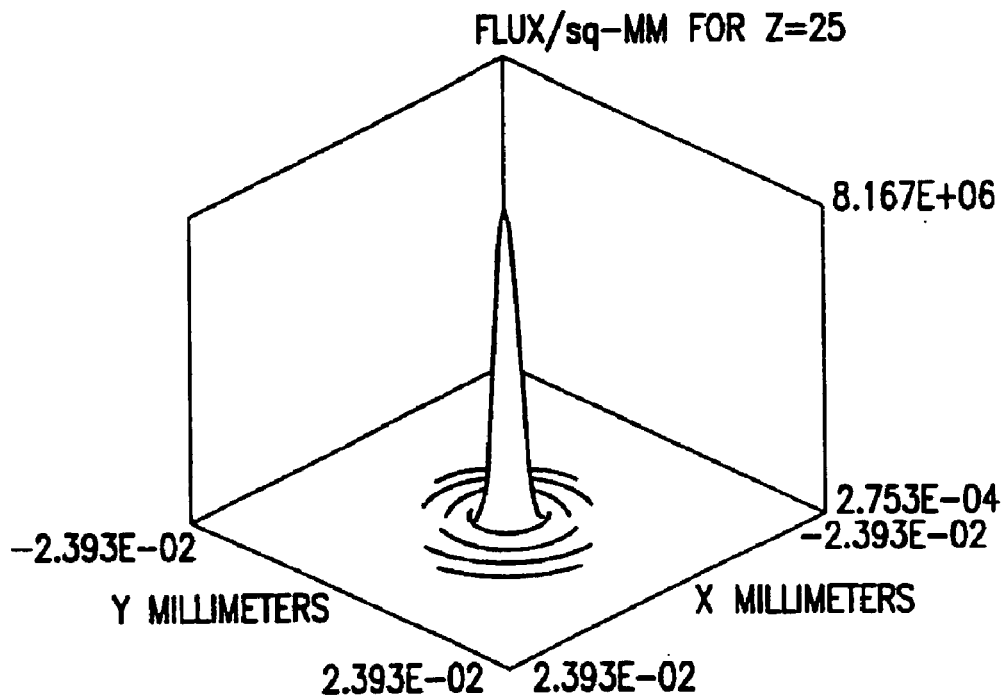
Figure 12B:
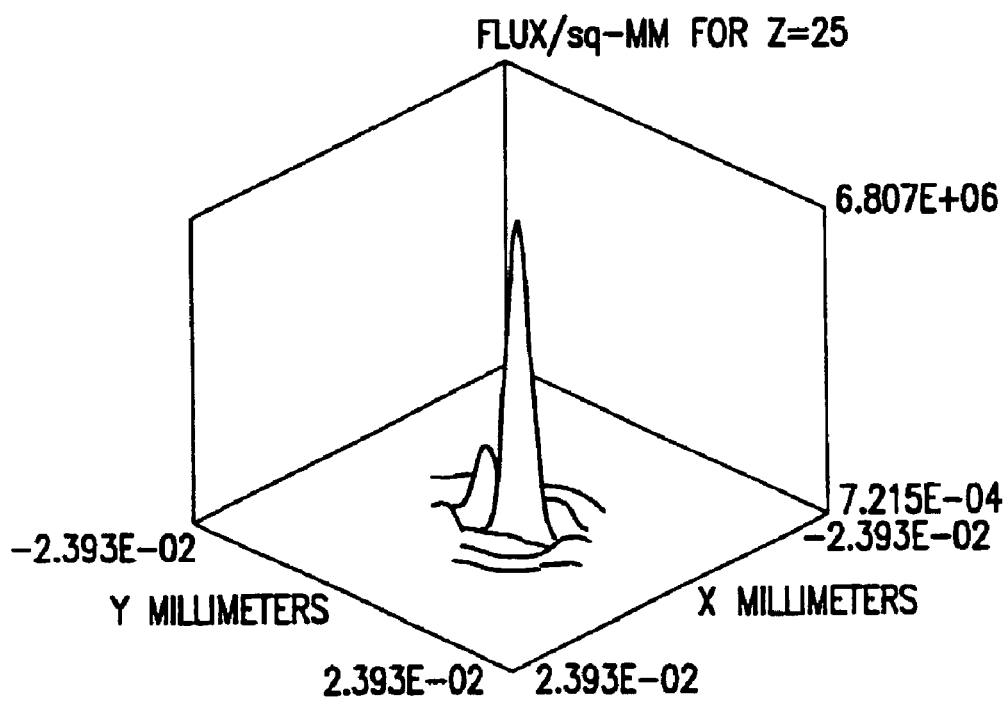
Figure 12C:
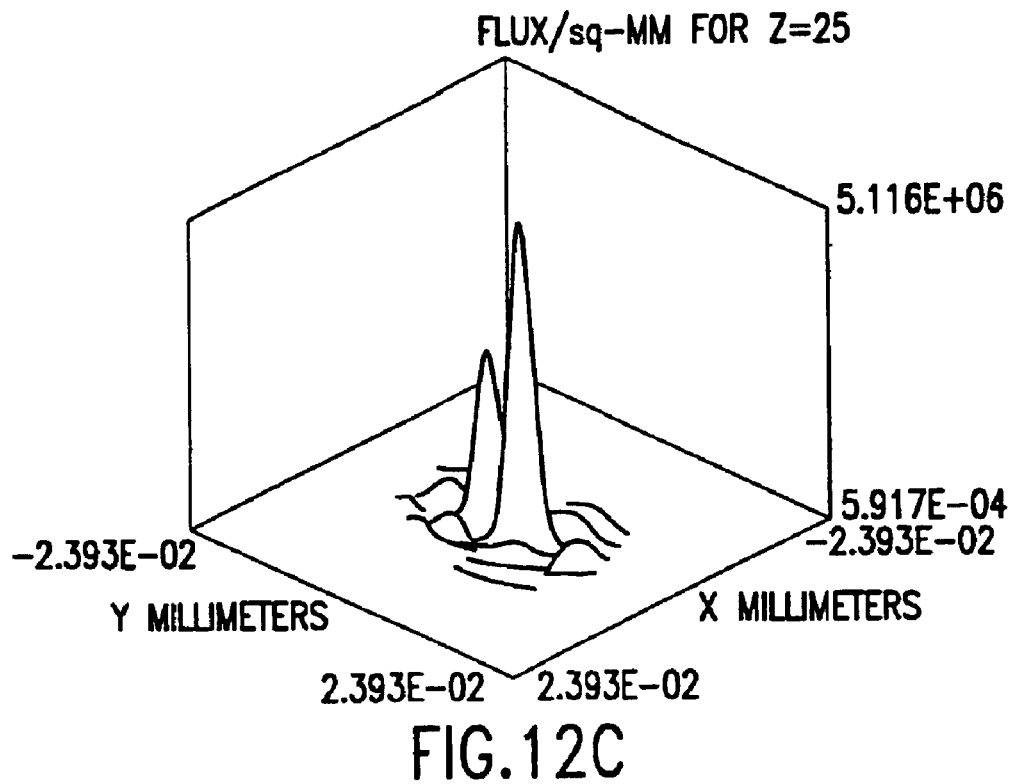
Figure 12D:
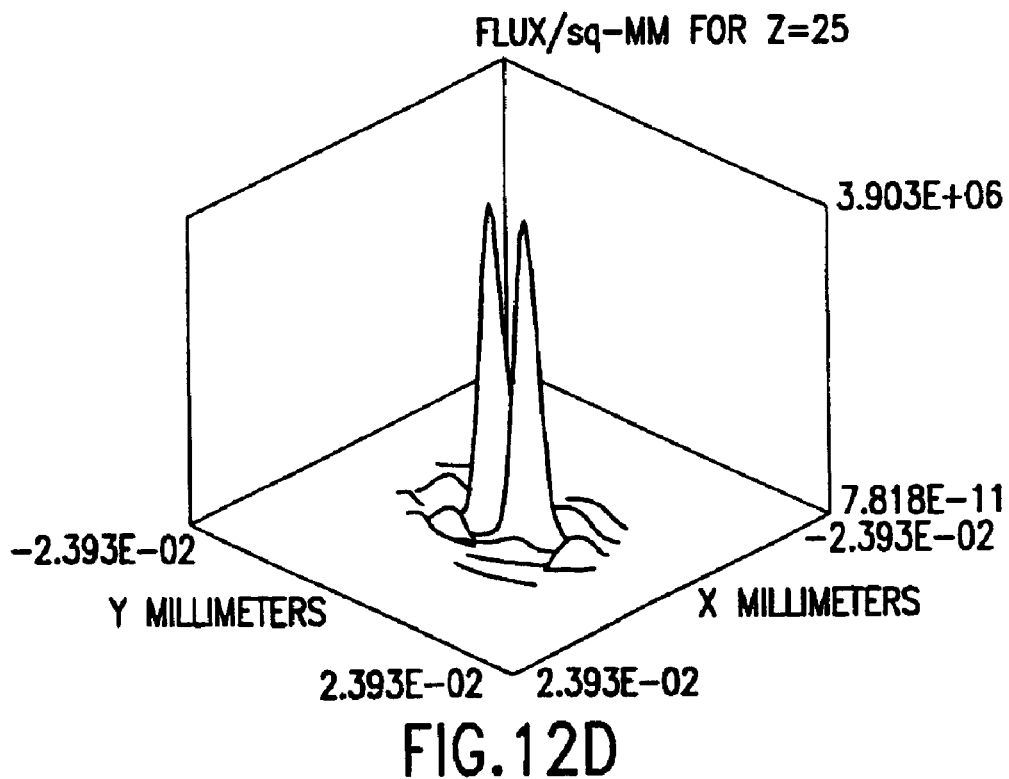
Figure 12E:
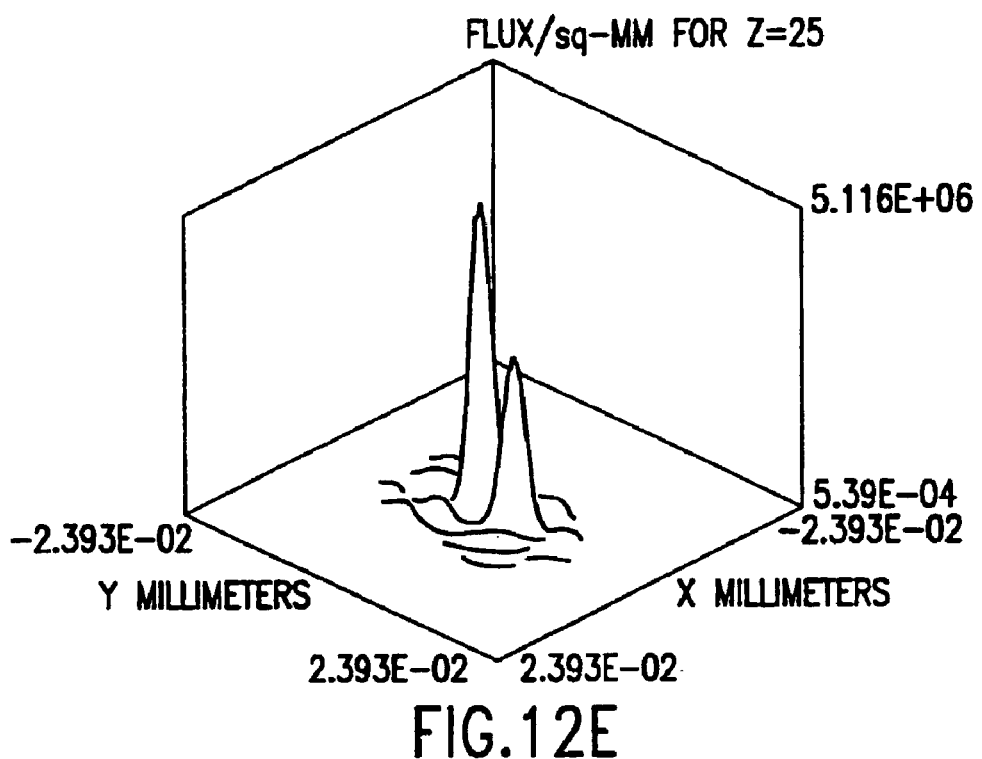
Figure 12F:
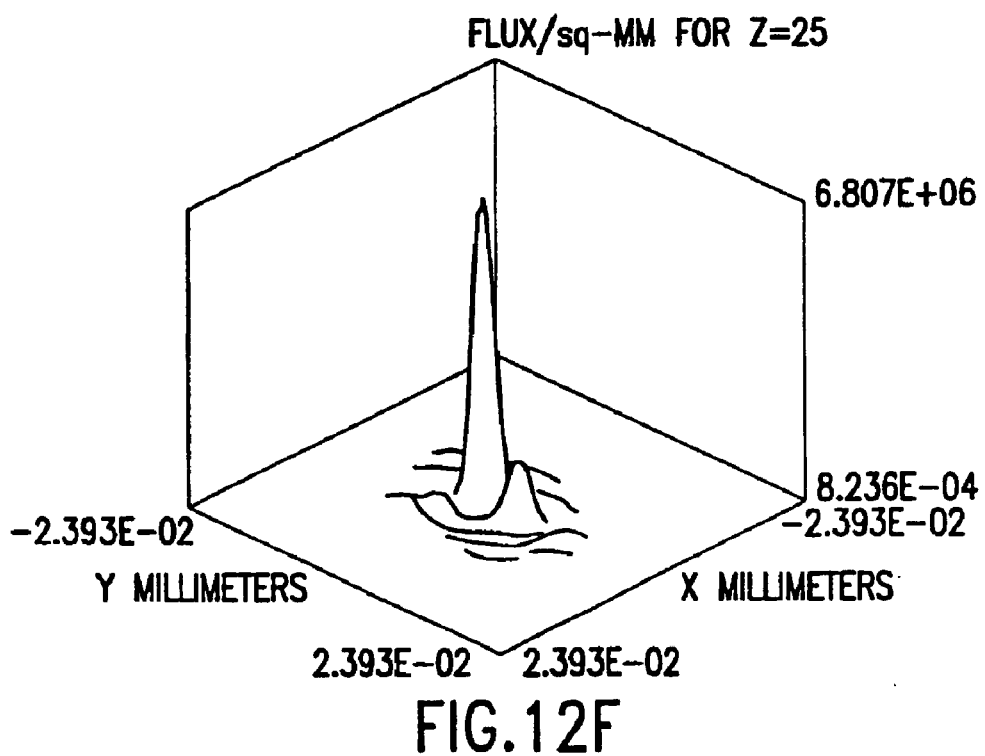
Figure 12G:
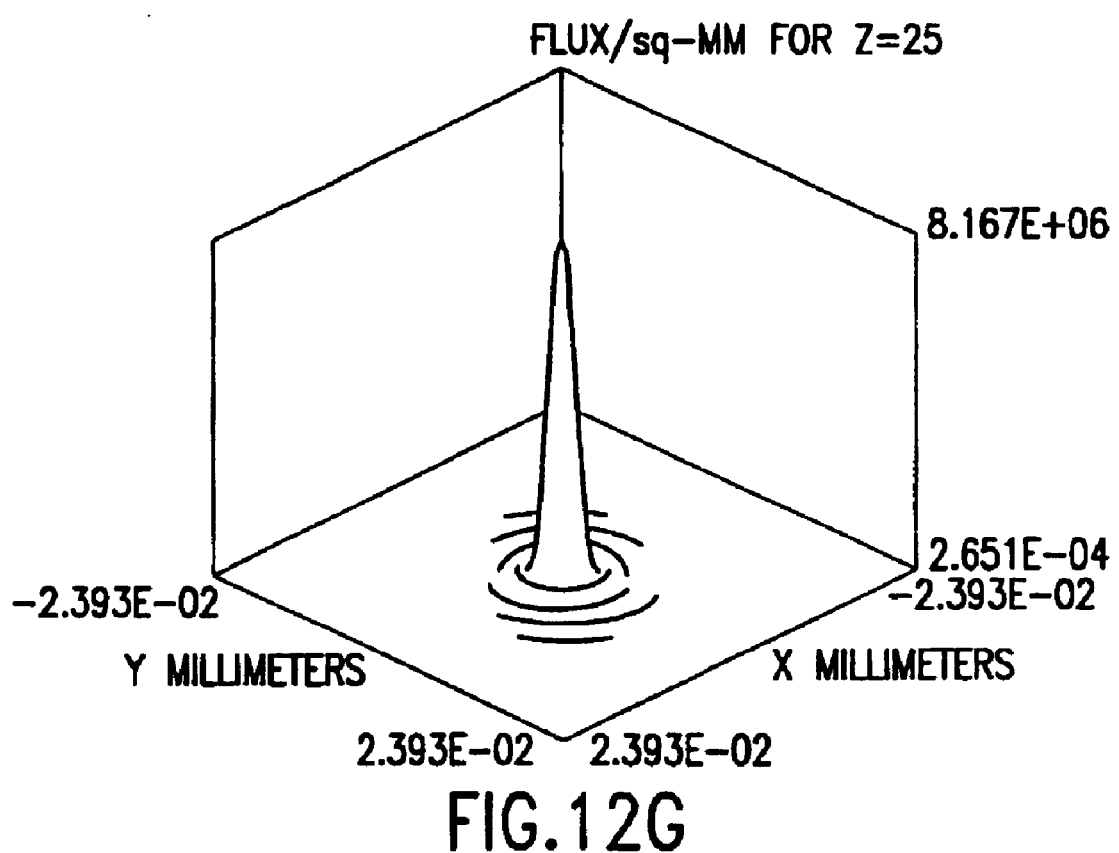

FIG. 12A corresponds to an OPD=100 waves and the output of the device consists of a single on-axis beam. FIG. 12D corresponds to an OPD=99.75 waves and the output is split into two beams of unequal energy. The peak of the beam with higher energy is shifted from the axis towards sector S2, while the beam with lower energy is shifted from the axis towards sector S1. FIG. 12C corresponds to an OPD=99.60 waves and the output is split into two beams of unequal energy. Compared to FIG. 12B, the amount of light in the stronger beam is reduced and at the same time more light is delivered into the weaker beam. When the OPD=99.5 waves, the incoming flux is split into two beams of equal energy symmetrically offset from the axis, as indicated in FIG. 12D. FIG. 12E shows the distribution in the focal plane when the OPD is reduced to 99.40 waves. The beams again contain unequal energy, but in this case the higher energy beam is shifted from the axis towards the sector S1, while the lower energy beam is shifted towards the sector S2. FIG. 12F shows the distribution in the focal plane when the OPD is reduced to 99.25 waves. The beams contain unequal energy and more energy is transferred from the beam containing lower energy into the higher energy beam. When the OPD reaches 99 waves, there is no splitting into two beams. A single beam is propagating on-axis as indicated in FIG. 12G.

As illustrated above, in this mode of operation relatively small changes in OPD result in substantial changes in output flux distribution. Efficient dynamic beam splitters and attenuators can be produced based on the principles of the device according to these aspects of the present invention.

As can be seen from the device properties illustrated by the above modes of operation, this embodiment represents a one-dimensional adjustable wavelength routing device. The routing direction is in the plane containing the optical axis and normal to the boundary of the DS sectors S1 and S2.

The device according to this embodiment is reconfigured by:
1. Rotation of the DS relative to an axis that is perpendicular to the optical axis of the device.
2. Changing the OPD between the components of the DS by adjusting the refractive index of the medium and/or the axial distance between the respective surfaces of the diffractive. Adjustments in the axial distance between the components of DS can be achieved during the fabrication stage. Alternatively, as representative examples, changes in the temperature, pressure, magnetic or electric field, etc., can be used to change the axial distance between the components of the DS and/or the refractive index of the medium of the DS or that surrounding the DS.

Embodiment 2

Diffractive structures according to a second embodiment of the invention consist of two identical diffractive structures of the type used in embodiment 1. The device according to this embodiment includes means for adjusting the relative axial orientation of the two diffractive structures.

FIGS. 13A through 13D show the diffractive structures in four relative positions. The rest of the system is identical to the one shown in FIG. 8A, except for the fiber array. The first DS1 contains two semicircular sectors S11 and S12 axially offset a distance $t_1$ along the optical axis. The second diffractive structure DS2 contains two semicircular sectors S21 and S22 axially offset a distance $t_2$ along the optical axis. In general, the media of DS1 and DS2 can differ from each other, as can the offset distances $t_1$ and $t_2$. In the preferred embodiment, the diffractive structures DS1 and DS2 are made from the same material and the offsets are made equal, so that $t_1=t_2=$. The OPD introduced by the first pair of sectors S11 and S12 is equal to the OPD introduced by the second pair of sectors S21 and S22.

The relative axial rotation of DS1 and DS2 allows reconfiguration of the device according to the present invention based on operational requirements. Changing the relative angular orientation of DS1 and DS2 will have different effects on different propagating wavelengths. There is an infinite number of relative angular positions based on relative rotation angles, each corresponding to different distributions of light in the focal plane of the focusing lens. In the following analysis we will show the light distributions at four relative positions of DS1 and DS2 that correspond to incremental rotations of DS2 relative to DS1 by 90 degrees.

Figure 13A:
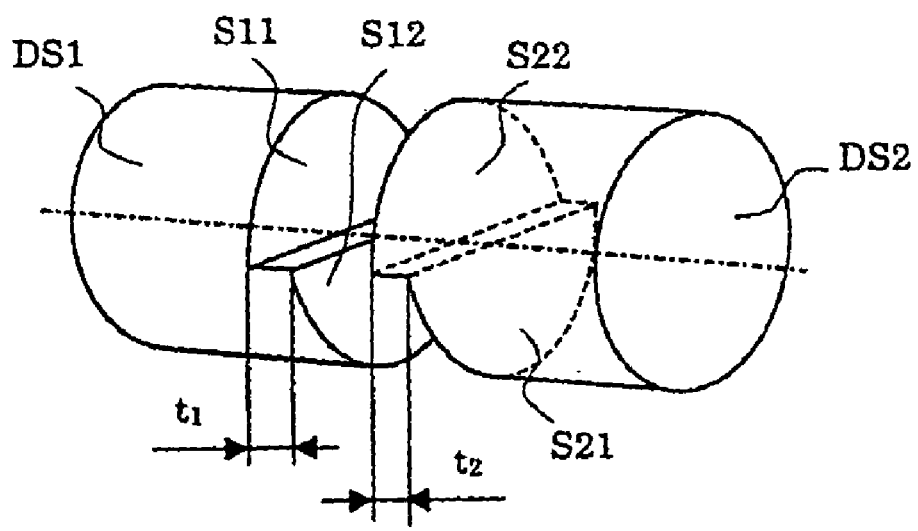

FIG. 13A represents the case when the sectors S11, S12, S21 and S22 are oriented in such a way that the OPD introduced by S12 and S21 to one portion of the propagating wavefront (lower portion of the wavefront according to FIG. 13A) is equal to the OPD introduced by S11 and S22 to the other portion of the propagating wavefront (upper portion of the wavefront according to FIG. 13A). This relative orientation will be referred to as the reference position that corresponds to a zero relative rotation angle, or position #1. For that relative orientation, the diffractive structure has no effect on the light propagating through the system.

Figure 13B:
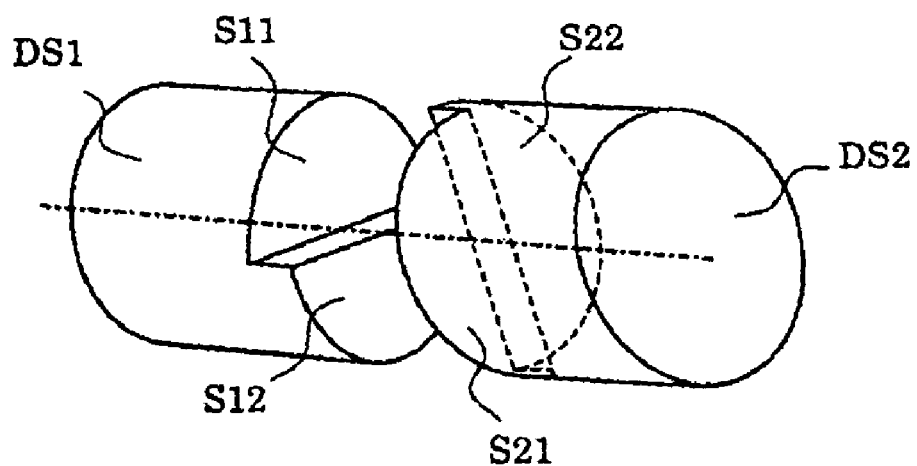

FIG. 13B represents the case when DS2 has a rotation of 90 degrees clockwise relative to DS1 from the reference position. This relative orientation will be referred to below as position #2.

Figure 13C:
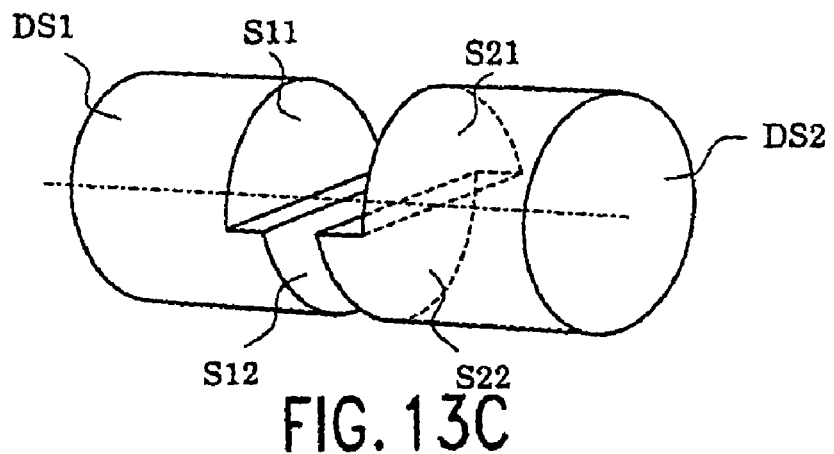

FIG. 13C represents the case when the sectors S11, S12, S21 and S22 are oriented in such a way that the OPD between the halves of the wavefront introduced by S11 and S12 is combined with the OPD introduced by S21 and S22 for the same portion of the wavefront. This relative orientation corresponds to 180 degrees relative rotation angle from the reference. In this relative orientation the device performs similar to the device of the first embodiment. This relative orientation will be referred to below as position #3.

Figure 13D:
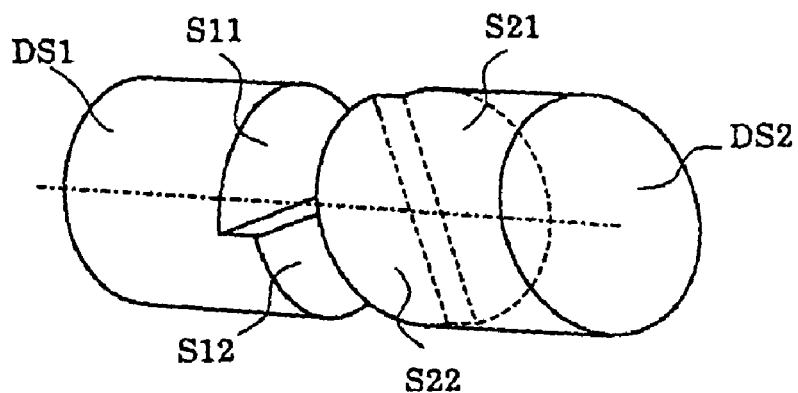

FIG. 13D represents the case when DS2 has a rotation of 270 degrees clockwise relative to DS1 from the reference position. This relative orientation will be referred to below as position #4.

The fiber array that can be used with the present embodiment consists of nine fibers and is shown in FIG. 14. The fibers are designated based on their row and column position. Each fiber is shown as two concentric circles defining the core and the cladding of the fiber.

EXAMPLE 1

The diffractive structure is made from fused silica and the offset t is equal to 0.1745 mm for both of the components DS1 and DS2 of the diffractive structure. In this case the system's performance for a relative rotation of 180 degrees (FIG. 13C) is identical to that for embodiment 1.

The results of the light distribution at the focal plane for four angular positions of DS2 relative to DS1 as a function of wavelength are summarized in the Table 5 below. The angular positions are counted clockwise.

FIG. 15 presents the three-dimensional intensity distribution at the focal plane of the lens 12 for the wavelength of 1.5500 microns and relative rotation angles of 0, 90 180 and 270 degrees, respectively. The light distribution consists of a single diffraction-limited beam and does not change with the change of relative angular orientation. The beam can be coupled into any fiber of the fiber array, for example fiber F22, by adjusting the position of the array relative to the optical axis.

Figure 16A:
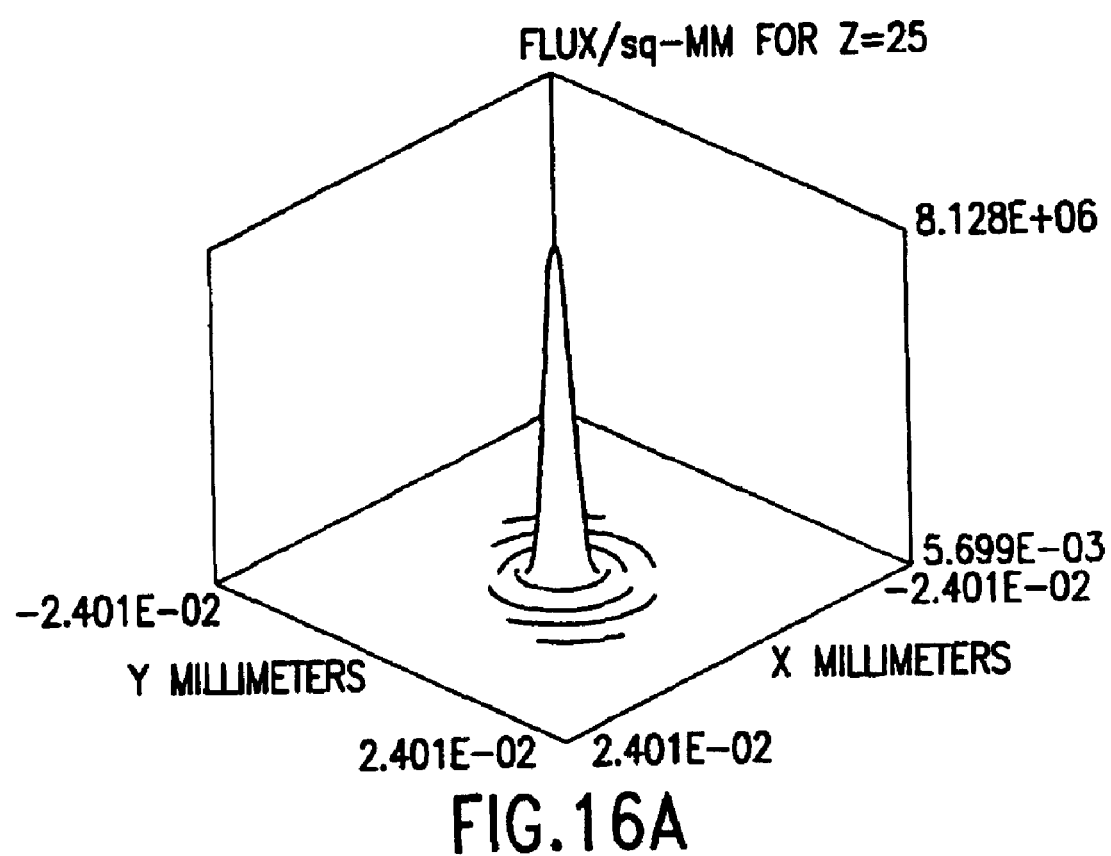
Figure 16B:
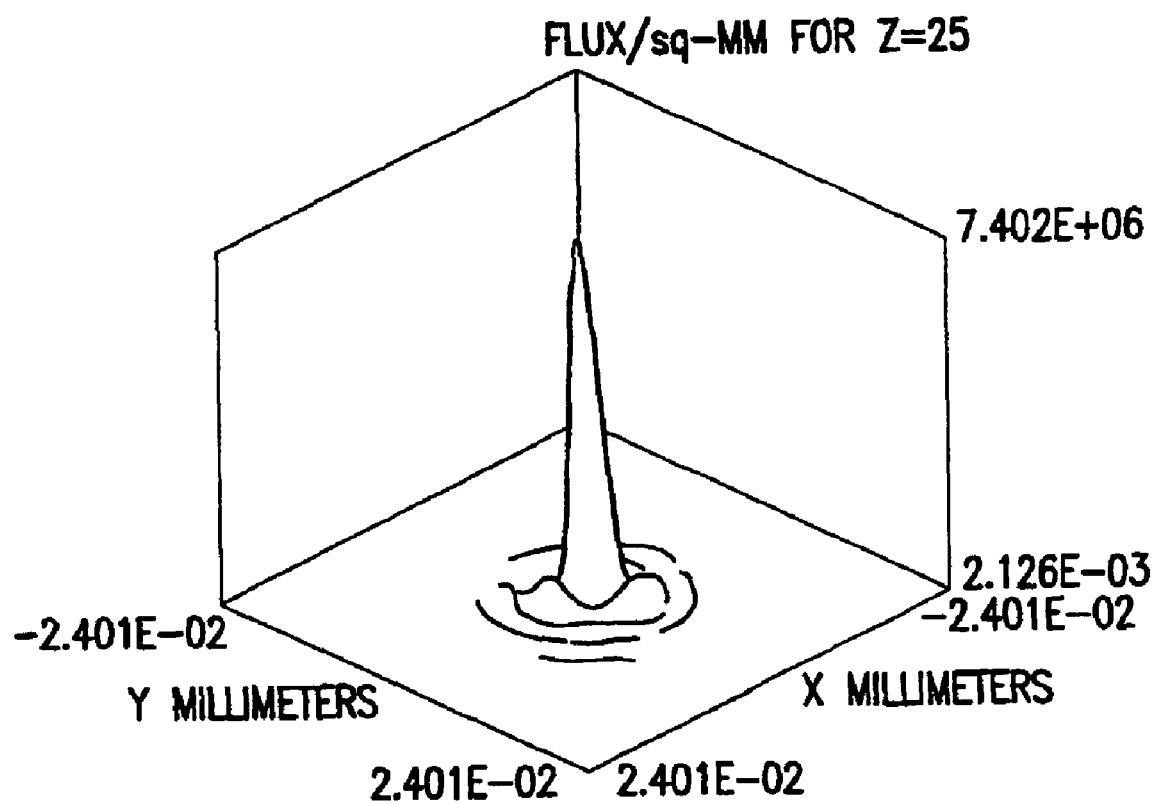
Figure 16C:
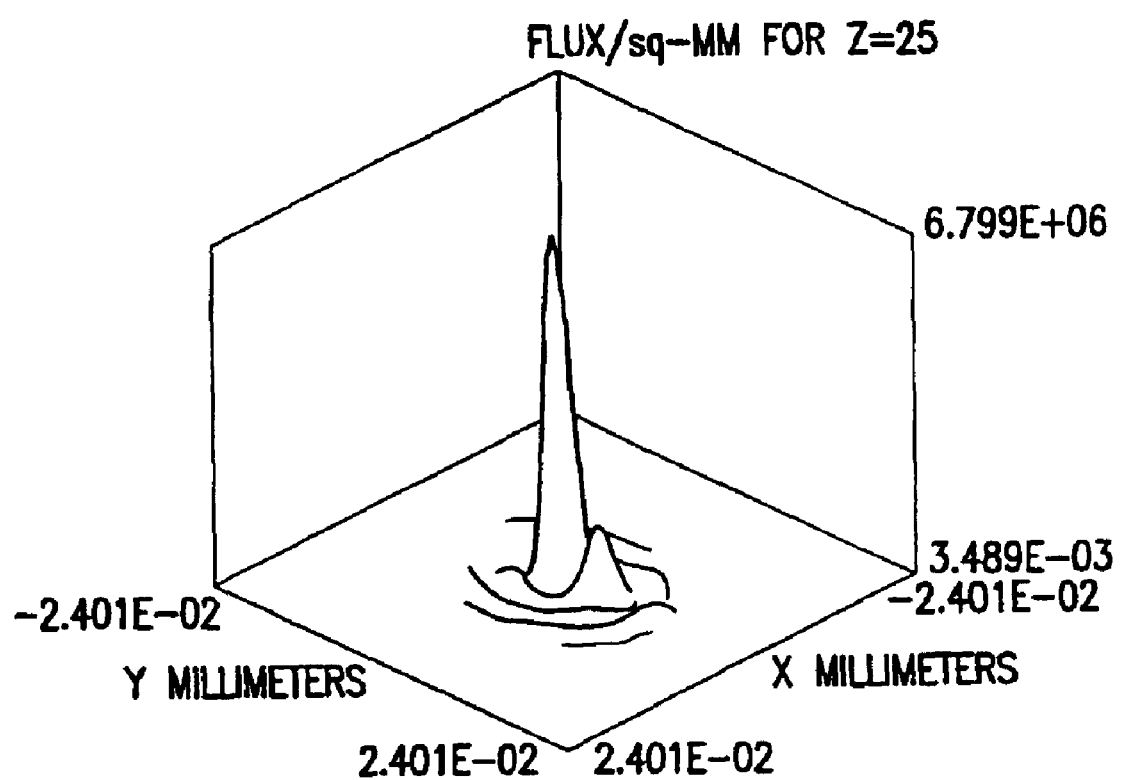
Figure 16D:
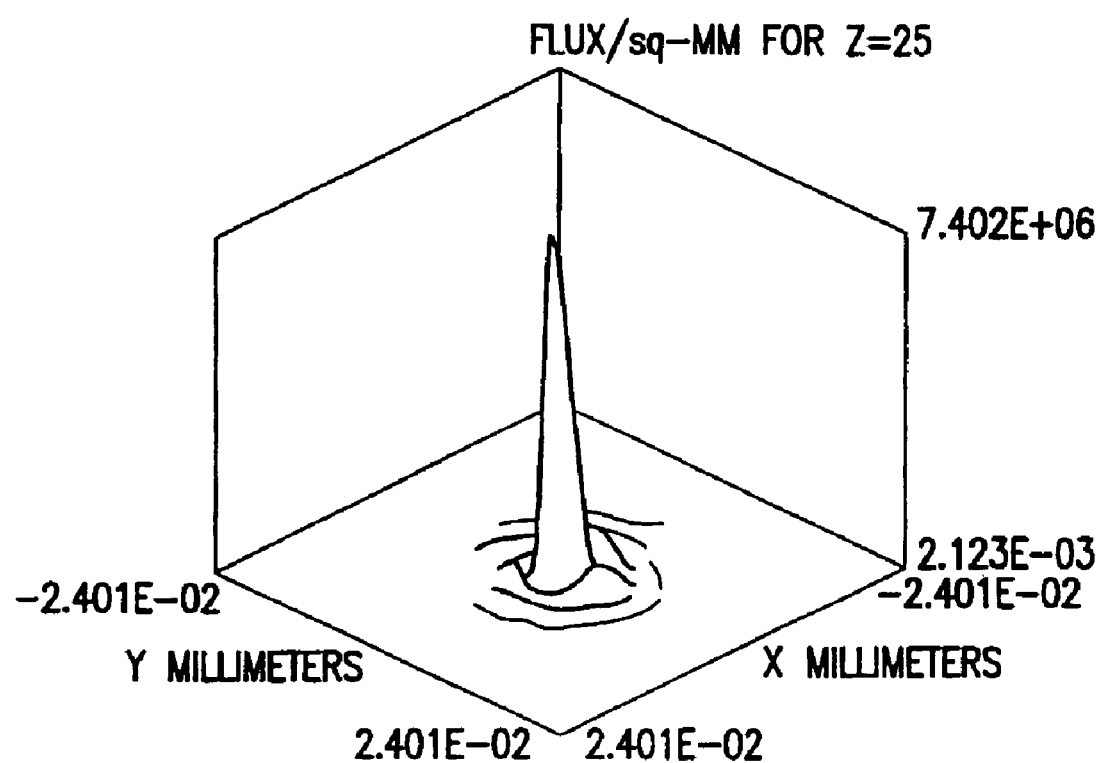

FIGS. 16A through 16D present three-dimensional intensity distributions at the focal plane of the lens 12 for the wavelength of 1.5537 microns and relative rotation angles of 0, 90, 180 and 270 degrees, respectively. In position #1 the light distribution consists of a single diffraction-limited beam, as shown in FIG. 16A. The light can be coupled into a single fiber, for example fiber F22 of the fiber array of FIG. 14. In position #2 the light distribution is split into three beams with intensity ratio of 1:10:1, as shown in FIG. 16B. The light can be coupled into three fibers, for example fibers F12, F22 and F23 of the fiber array of FIG. 14. In position #3 the light distribution is split into two beams with intensity ratio of 1:5, as shown in FIG. 16C. The light can be coupled into two fibers, for example, fibers F12 and F22 of the fiber array of FIG. 14. In position #4 the light distribution is split again into three beams with an intensity ratio of 1:10:1, as shown in FIG. 16D. The light can be coupled into three fibers, for example fibers F12, F21 and F22 of the fiber array of FIG. 14.

Figure 17A:
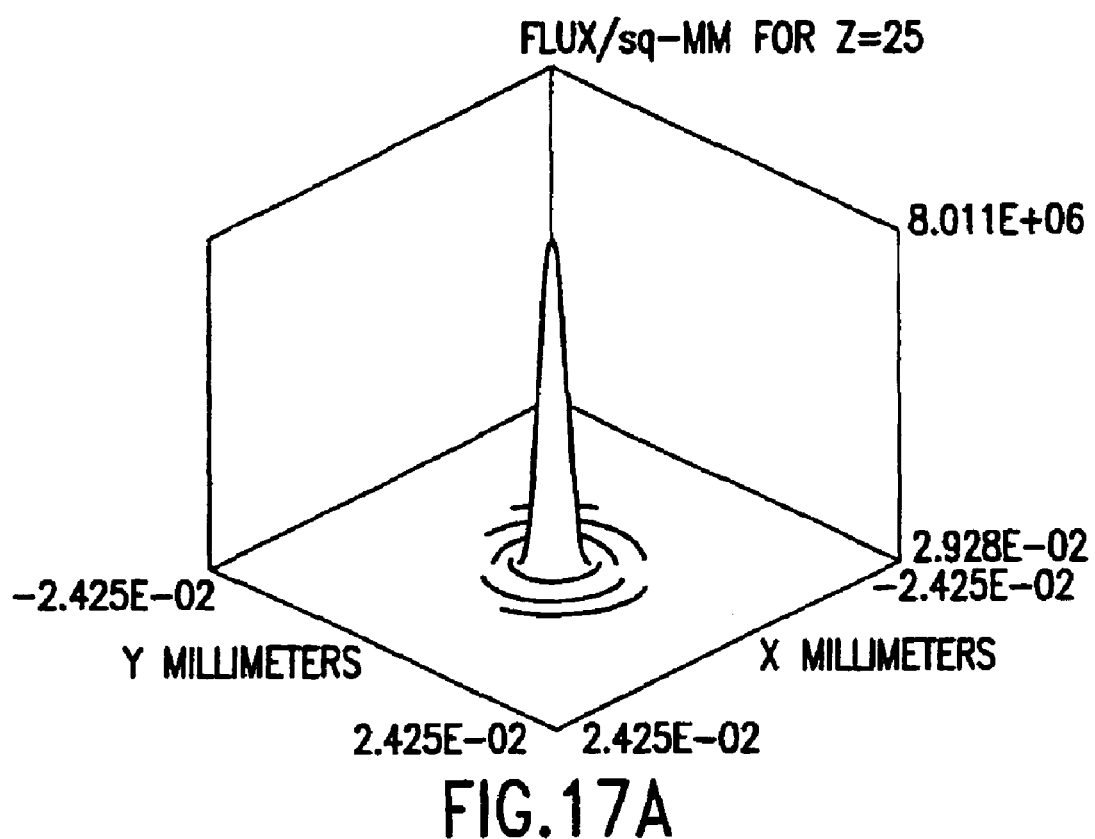
Figure 17B:
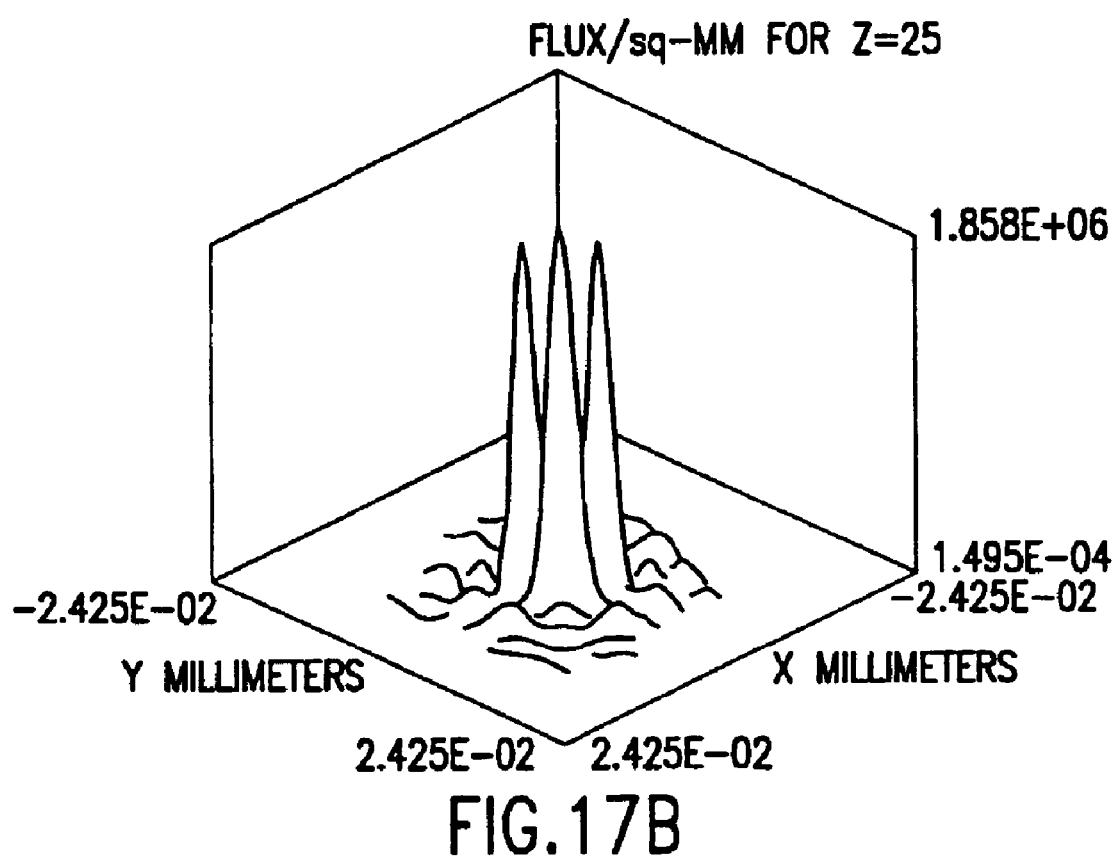
Figure 17C:
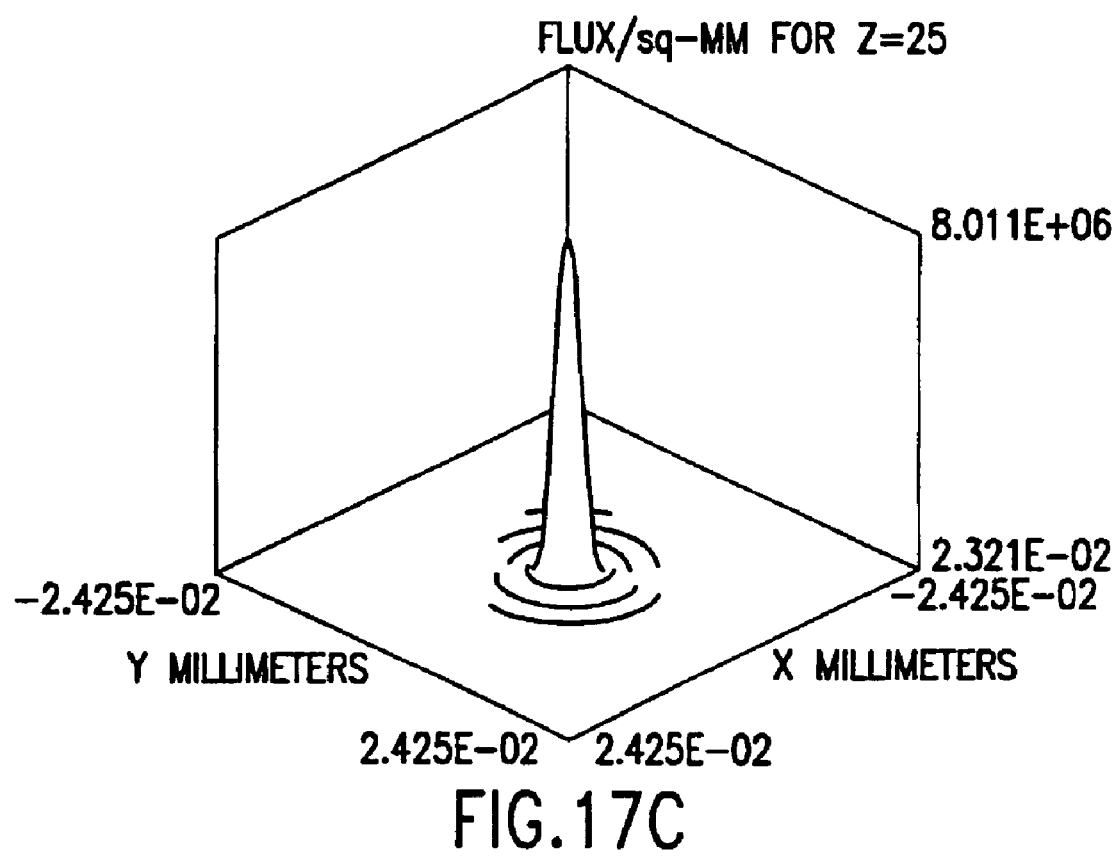
Figure 17D:
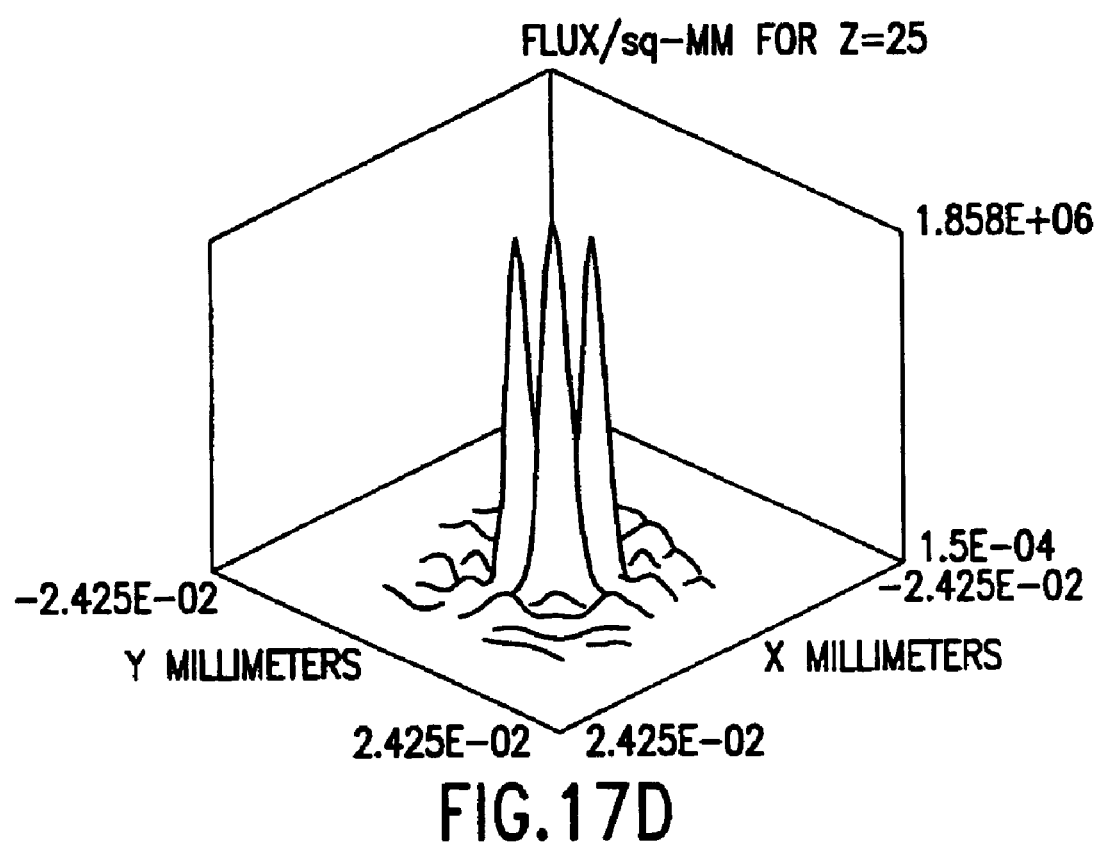

FIGS. 17A through 17D present three-dimensional intensity distributions at the focal plane of the lens 12 for the wavelength of 1.5650 microns and relative rotation angles of 0, 90, 180 and 270 degrees, respectively. In position #1 the light distribution consists of a single diffraction-limited beam, as shown in FIG. 17A. The light can be coupled into a single fiber, for example fiber F22 of the fiber array of FIG. 14. In position #2 the light distribution is split into four equal beams with intensity ratio of 1:1:1:1, as shown in FIG. 17B. The light can be coupled into four fibers, for example fibers F11, F13, F31 and F33 of the fiber array of FIG. 14. In position #3 the light distribution consists of a single diffraction-limited beam, as shown in FIG. 17C. The light can be coupled into a single fiber, for example fiber F22 of the fiber array of FIG. 14. In position #4 the light distribution is split again into four equal beams with intensity ratio of 1:1:1:1, as shown in FIG. 17D. The light can be coupled into four fibers, for example fibers F11, F13, F31 and F33 of the fiber array of FIG. 14.

FIG. 18 presents the three-dimensional intensity distribution at the focal plane of the lens 12 for the wavelength of 1.5803 microns and relative rotation angles of 0, 90, 180 and 270 degrees, respectively. The light distribution consists of a single diffraction-limited beam and does not change with changes in relative angular orientation. The beam can be coupled into any fiber of the fiber array of FIG. 14, for example fiber F22.

For any given wavelength the light distributions at the focal plane are a function of the relative rotation angle of DS1 and DS2. The light distributions at the focal plane of the lens 12 for any given wavelength at intermediate angular orientations of DS1 and DS2 represent a continuous transition between the above patterns shown at 90 degree increments. The light distribution undergoes transition between the individual beams with different amounts of light in those beams. The beams' spatial orientation and shape also undergo transitions as DS1 and DS2 rotate relative to each other.

EXAMPLE 2

The diffractive structure is made from fused silica and the offset t is reduced from 0.1745 mm to 0.1737 mm for all of the components of the diffractive structures DS1 and DS2. In this case the system's performance for relative rotations that correspond to FIGS. 13A through 13D are presented in the Table 6 below for different wavelengths.

Figure 19A:
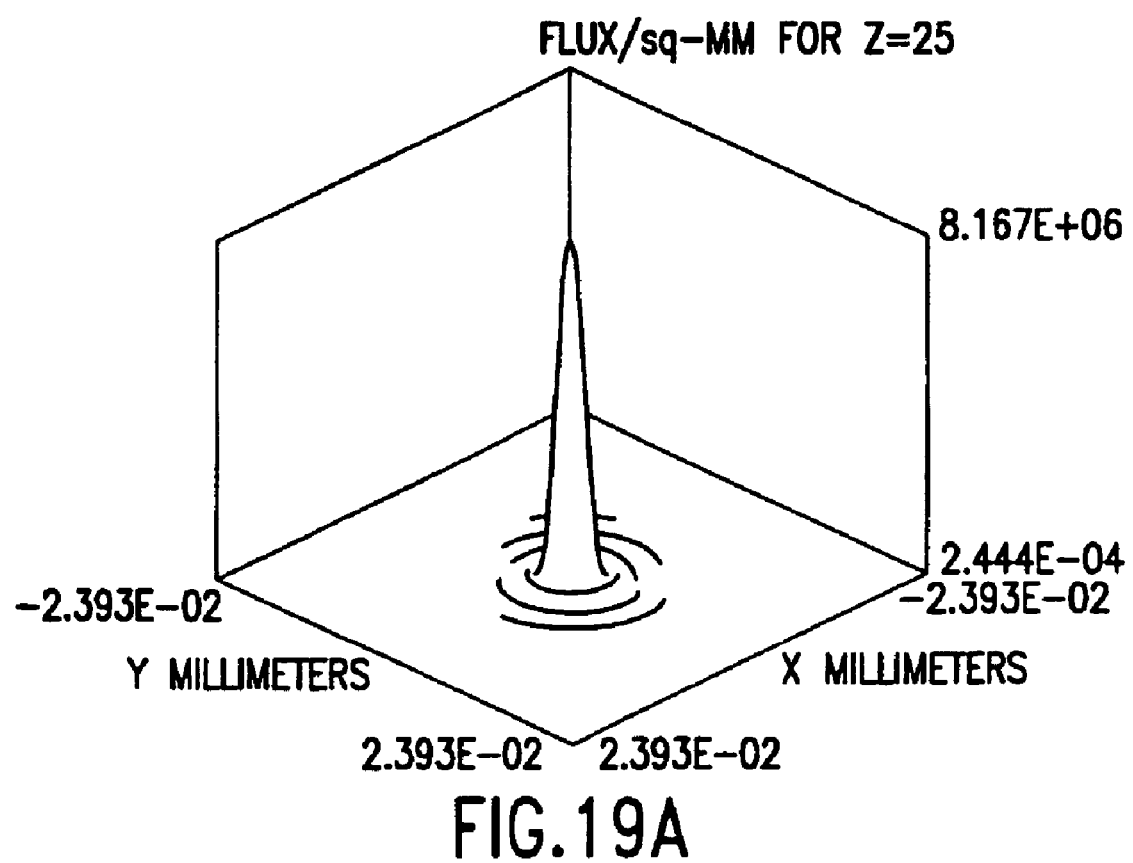
Figure 19B:
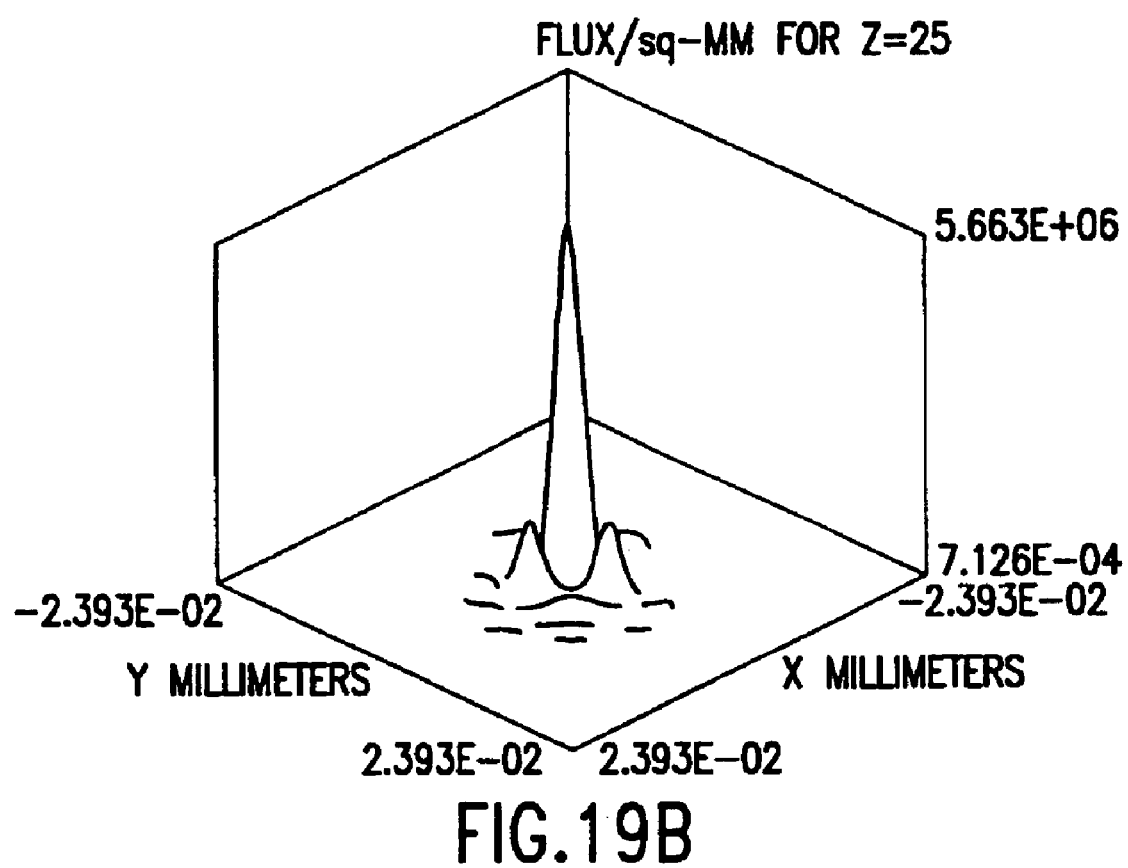
Figure 19C:
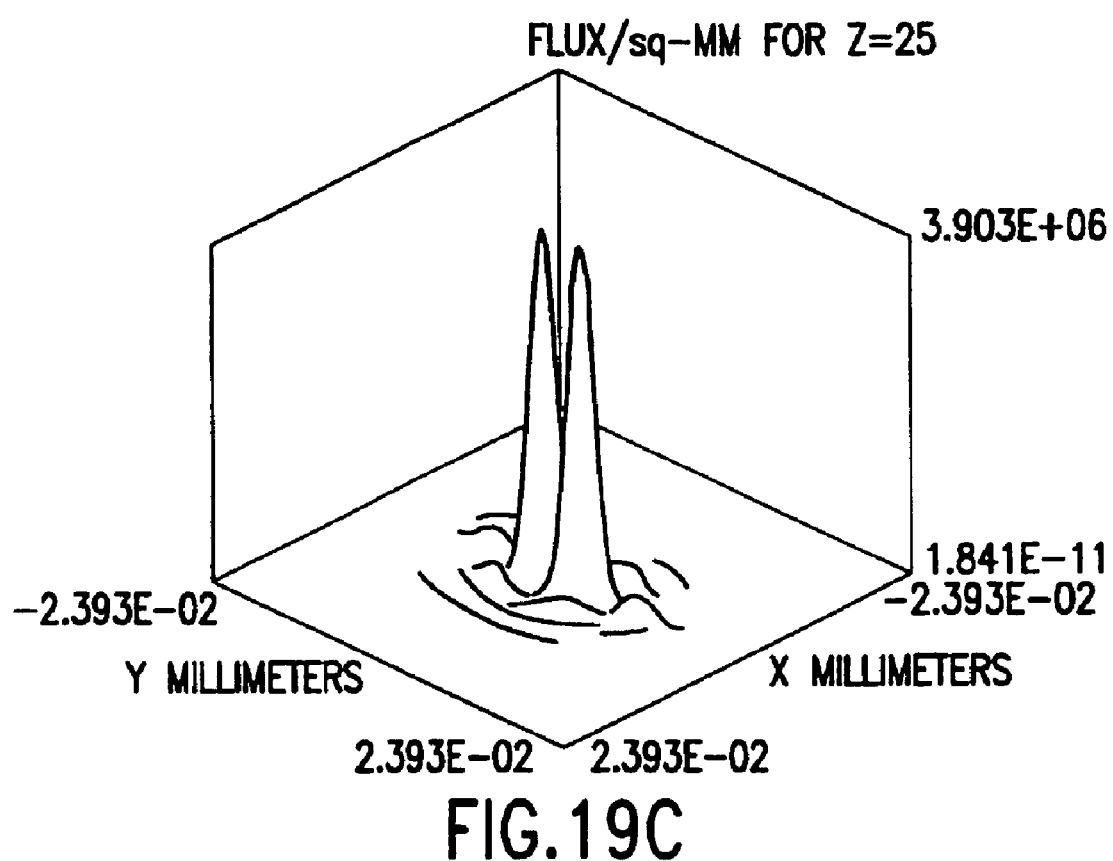
Figure 19D:
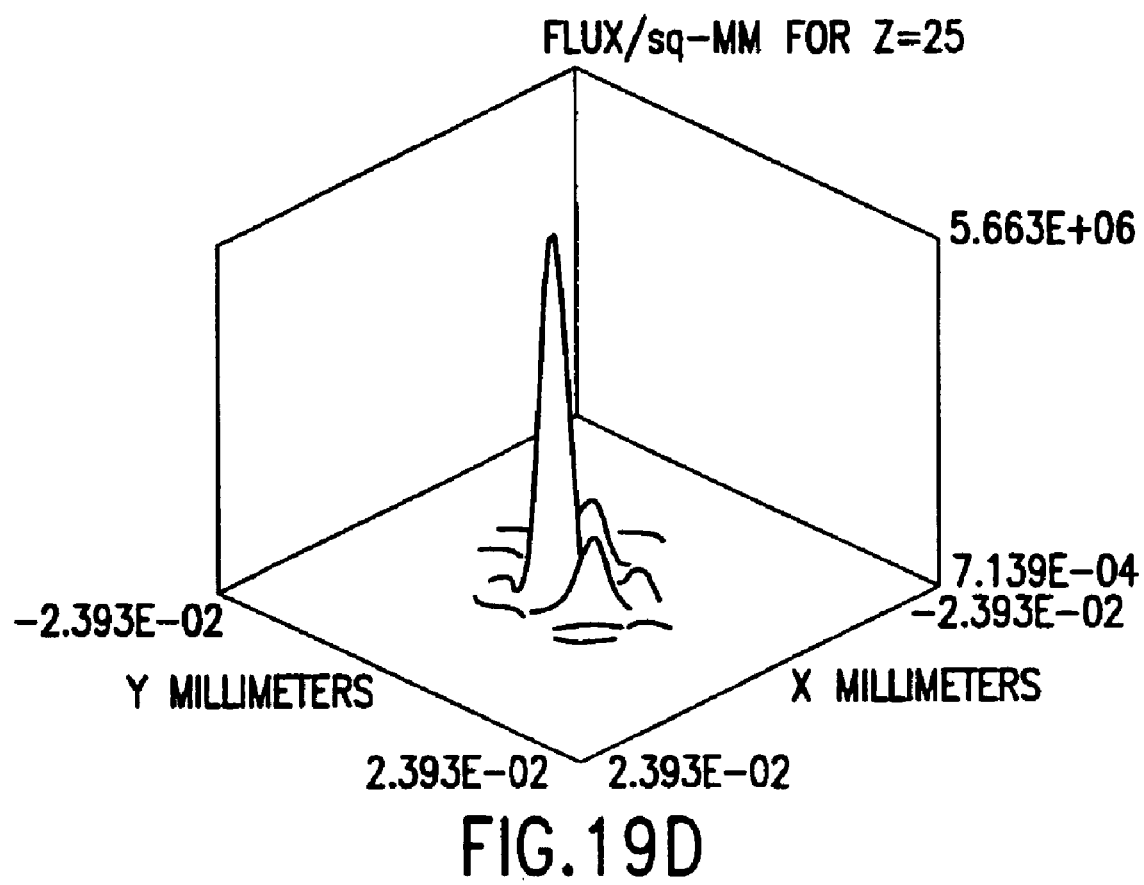

FIGS. 19A through 19D present three-dimensional intensity distributions at the focal plane of the lens 12 for the wavelength of 1.5500 microns and relative rotation angles of 0, 90, 180 and 270 degrees, respectively. In position #1 the light distribution consists of a single diffraction-limited beam, as shown in FIG. 19A. The light can be coupled into a single fiber, for example fiber F22 of the fiber array of FIG. 14. In position #2 the light distribution is split into three beams with intensity ratio of 1:5:1, as shown in FIG. 19B. The light can be coupled into three fibers, for example fibers F12, F22 and F23 of the fiber array of FIG. 14. In position #3 the light distribution is split into two equal beams with intensity ratio of 1:1, as shown in FIG. 19C. The light can be coupled into two fibers, for example fibers F12 and F32 of the fiber array of FIG. 14. In position #4 the light distribution is split again into three beams with intensity ratio of 1:5:1, as shown in FIG. 19D. The light can be coupled into three fibers, for example fibers F12, F21 and F22 of the fiber array of FIG. 14.

FIG. 20 presents the three-dimensional intensity distribution at the focal plane of the lens 12 for the wavelength of 1.5726 microns and relative rotation angles of 0, 90, 180 and 270 degrees, respectively. The light distribution consists of a single diffraction-limited beam and does not change with the change of relative angular orientation. The beam can be coupled into any fiber of the fiber array of FIG. 14, for example fiber F22.

Figure 21A:
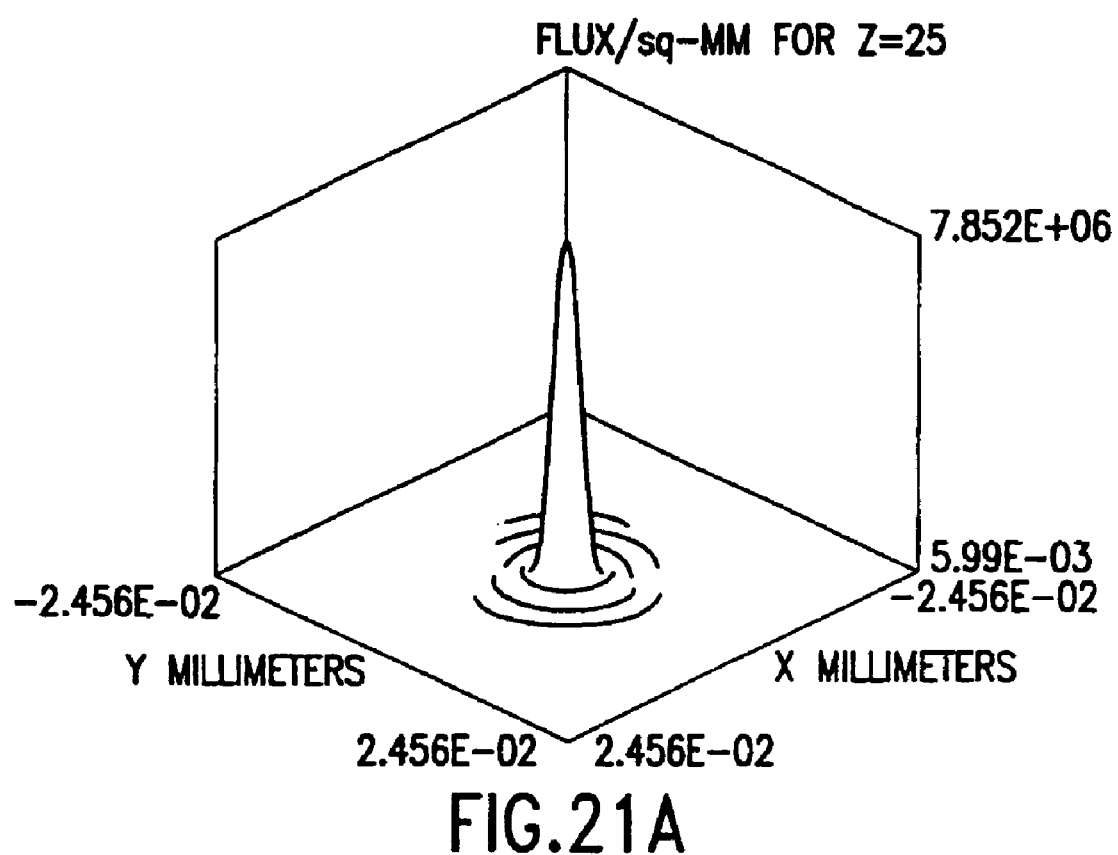
Figure 21B:
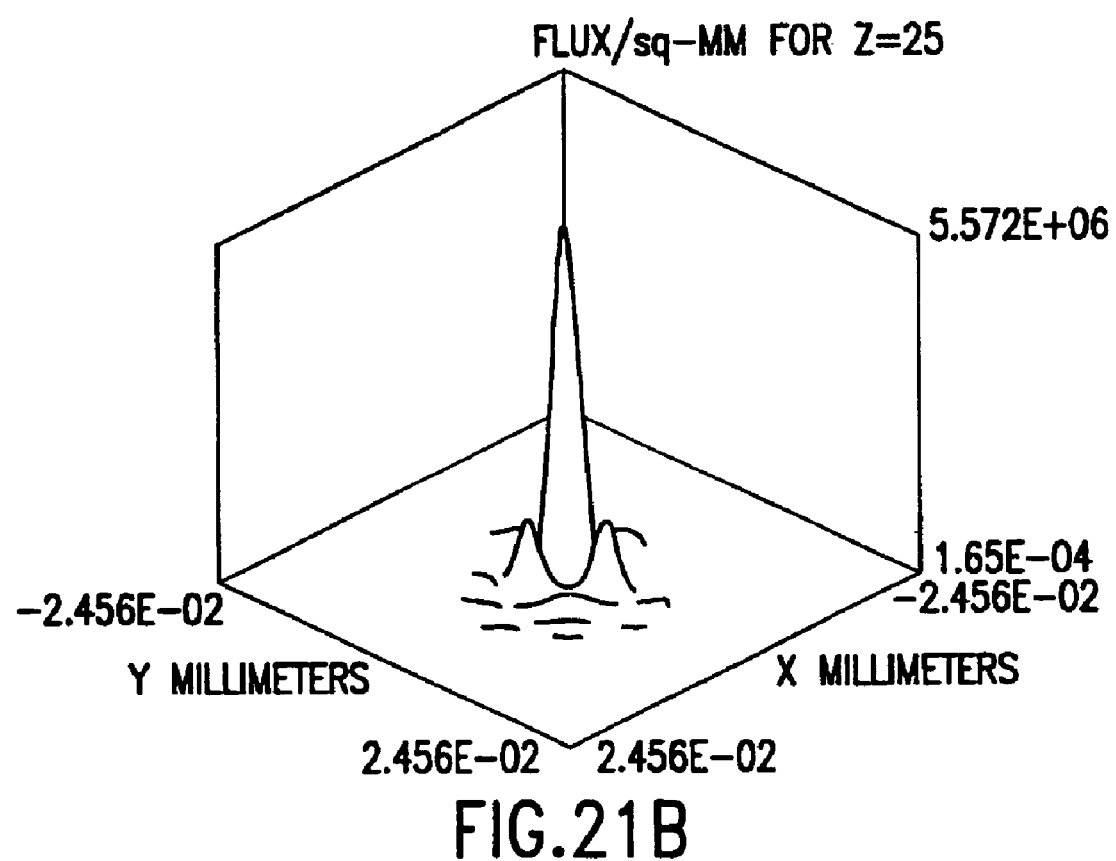
Figure 21C:
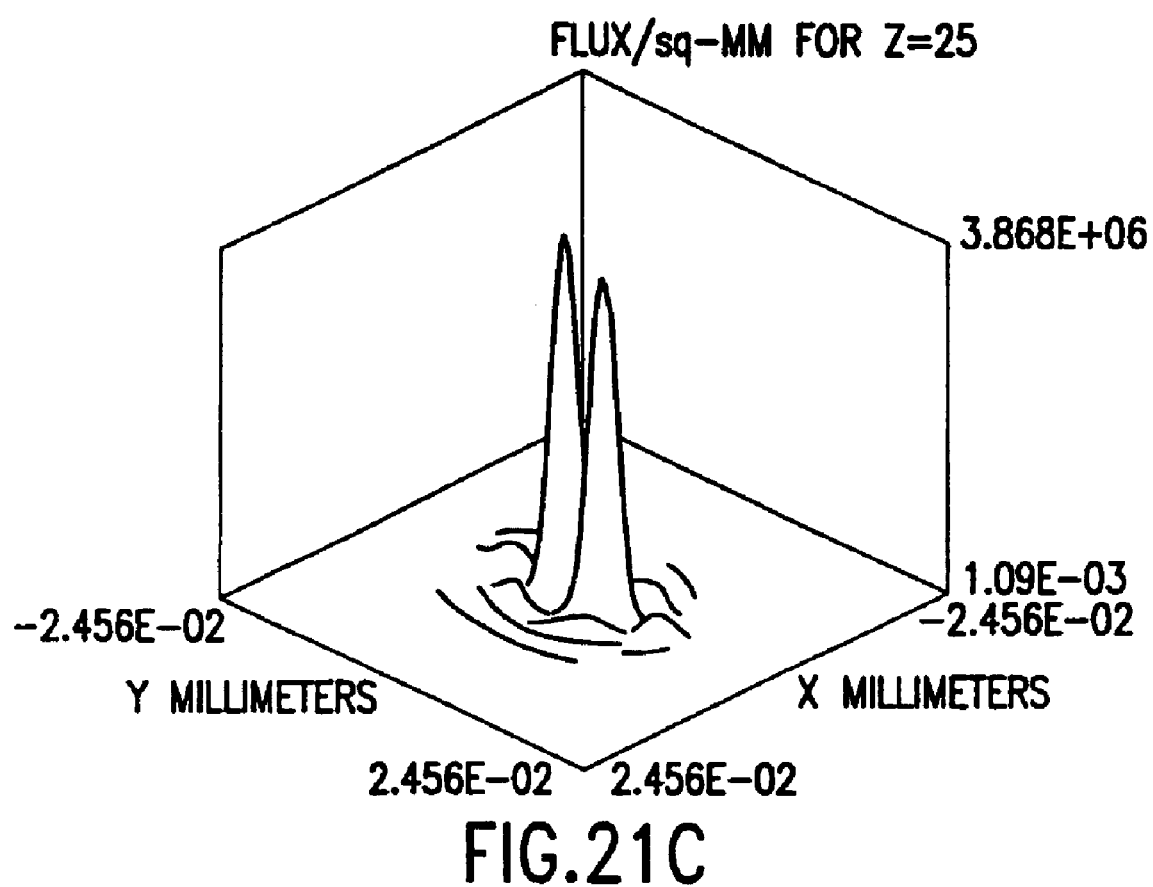
Figure 21D:
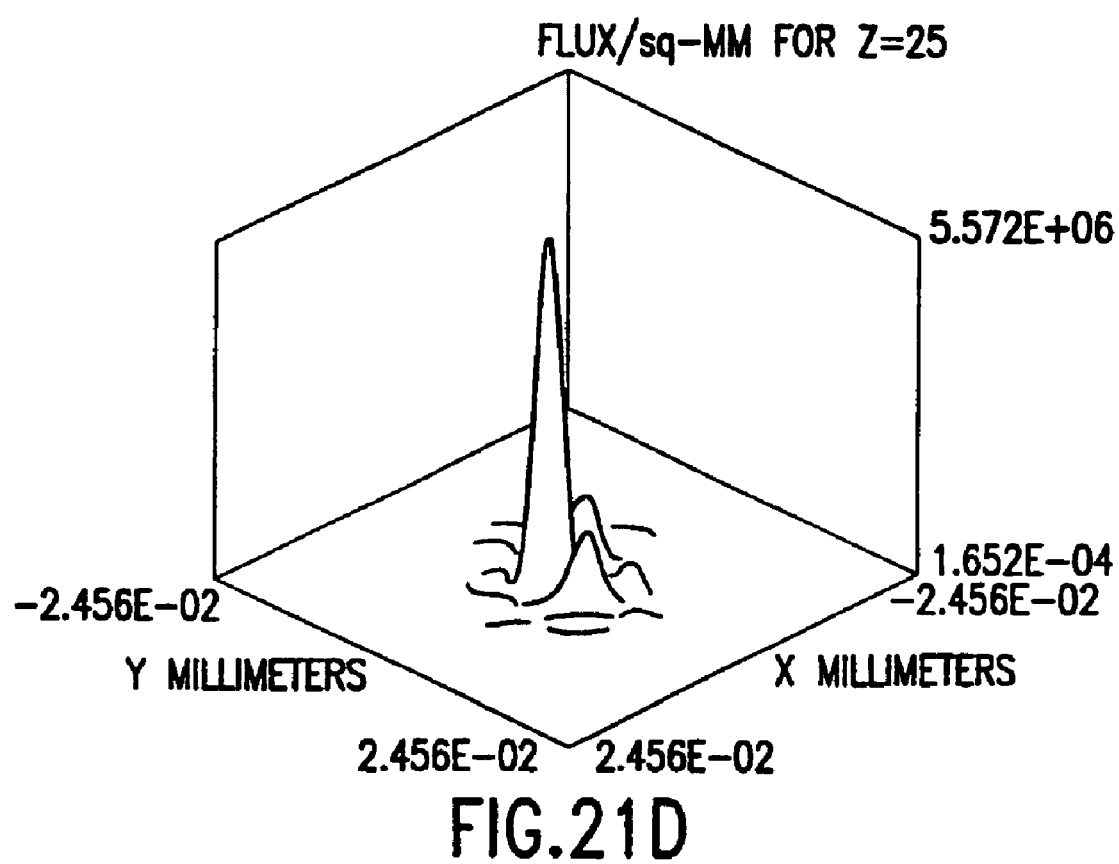

FIGS. 21A through 21D present three-dimensional intensity distributions at the focal plane of the lens 12 for the wavelength of 1.5803 microns and relative rotation angles of 0, 90, 180 and 270 degrees, respectively. In position #1, the light distribution consists of a single diffraction-limited beam, as shown in FIG. 21A. The light can be coupled into a single fiber, for example fiber F22 of the fiber array of FIG. 14. In position #2 the light distribution is split into three beams with intensity ratio of 1:5:1, as shown in FIG. 21B The light can be coupled into three fibers, for example fibers F12, F22 and F23 of the fiber array of FIG. 14. In position #3 the light distribution is split into two equal beams with intensity ratio of 1:1, as shown in FIG. 21C. The light can be coupled into two fibers, for example fibers F12 and F32 of the fiber array of FIG. 14. In position #4 the light distribution is split again into three beams with intensity ratio of 1:5:1, as shown in FIG. 21D. The light can be coupled into three fibers, for example fibers F12, F21 and F22 of the fiber array of FIG. 14.

Comparing the results in tables 5 and 6 as well as the respective figures one can see that the spectral selectivity of the device in the above two examples is quite different. For example, in Table 5 for the wavelength of 1.55 $\mu$m and the four relative orientations of the DSs according to the first example, the output of the device at the focal plane of the focusing lens does not change and consists of a single diffraction limited beam located on-axis. For the same wavelength of 1.55 $\mu$m and the same respective four relative orientations of the DSs in accordance with the second example, the output at the focal plane of the focusing lens consists respectively of one, three, two and three beams. Adjusting the OPD between S11 and S12, as well as between S21 and S22, will change the performance of the device. Changing the refractive index and/or axial distance between the respective surfaces of the diffractive structures creates this adjustment of OPD.

The device according to this embodiment can be reconfigured by, for example:

1. Relative axial rotation of the diffractive structures DS1 and DS2 around the optical axis. This type of adjustment can be done, for example, during the assembly stage or dynamically during use of the device.
2. Rotation of DS1, DS2, or both, relative to an axis that is perpendicular to the optical axis.
3. Changing the OPD between the components of DS1 and/or DS2 by adjusting the refractive index of the medium and/or the axial distance between the respective surfaces of the diffractive structures to, for example, make fine adjustments to the output. Adjustment in the axial distance between the components of DS1 and/or DS2 can be achieved during the fabrication stage. Alternatively, changing the temperature, pressure, magnetic or electric field, etc. will change the axial distance between the components of DS1 and DS2 and/or the refractive index of the medium.

Embodiment 3

The device according to the third embodiment is shown schematically in FIG. 1. Diffractive structure 2 according to the third embodiment is comprised of four quadrants having incremental thickness, as shown in FIGS. 3A through 3C. Although the OPD increment (minimum OPD) between the individual quadrants is not limited to any value, in this embodiment for a diffractive structure composed of four quadrants it was chosen to be an integer of 3.491 mm (or integer of 1000 waves OPD for the wavelength of 1.5500 micrometers). The device according to this embodiment has a spectral resolution about an order of magnitude higher than that of the devices of embodiments 1 and 2.

The four quadrants of the diffractive structure according to the present embodiment are shown in FIG. 22 and are designated Q1, Q2, Q3 and Q4, respectively. We assume that quadrant Q1 introduces the shortest OPD to the propagating wavefront.

Table 7 summarizes different configurations of the DS with different OPD increments introduced by the four quadrants of the DS according to this embodiment of the present invention. It is assumed that the OPD between the individual quadrants is an integer number of the smallest OPD between the respective quadrants (components of the DS).

The smallest OPD is defined as follows:

$$OPD_{min} = t_{min}(n_M - n_S) \quad (7)$$

where $t_{min}$ is the minimum axial offset between the respective four quadrants, and $n_M$ and $n_S$ are respectively the refractive indices of the DS material and the surrounding media.

For the DS shown in FIG. 3A the OPD between the quadrant with the shortest optical path and the other quadrants is incremented clockwise as $OPD_{min}$ integers of 1, 2 and 3. Identical output characteristics are achieved when the OPD between the quadrant with the shortest optical path and the other quadrants is incremented clockwis as $OPD_{min}$ integers of 3, 2 and 1.

For the DS shown in FIG. 3B the OPD between the quadrant with the shortest optical path and the other quadrants is incremented clockwise as $OPD_{min}$ integers of 1, 3 and 2. Identical output characteristics are achieved when the OPD between the quadrant with the shortest optical path and the other quadrants is incremented clockwise as $OPD_{min}$ integers of 2, 3 and 1.

For the DS shown in FIG. 3C the OPD between the quadrant with the shortest optical path and the other quadrants is incremented clockwise as $OPD_{min}$ integers of 2, 1 and 3. Identical output characteristics are achieved when the OPD between the quadrant with the shortest optical path and the other quadrants is incremented clockwise as $OPD_{min}$ integers of 3, 1 and 2.

As in the above embodiments, the focusing lens 3 is an achromatic refractive/diffractive singlet made from fused silica that has focal length of 20 mm, F/# of 2.0 and is corrected for spherical aberration for the wavelength 1.5500 $\mu$m. The first surface of the singlet is an SDS that has a concave base surface with a radius of curvature of $-251.374$ mm and a constant step height of 3.49 $\mu$m. The second surface is an asphere with a radius of curvature of $-8.8805$ mm, conic constant of $-2.085204$ and an aperture radius of 5.575 mm corresponding to an f/# of 2.0. The SDS corrects the axial chromatic aberration of the singlet employed in the MRDD of this embodiment.

The fiber array employed in this embodiment is a two-dimensional three-by-three array of the type shown schematically in FIG. 14. The fibers are designated by two numerals. The first numeral represents the row number and the second numeral represents the column number. Two concentric circles designate each fiber, the outer circle representing the cladding and the inner one representing the core.

Mode 1: Coupling Mode of Operation

The increment in thickness between the steps of the structure (t=3.491 mm) corresponds to an integer number of $OPD_{min}$'s for certain wavelengths, as shown in Table 8.

For the wavelengths listed in Table 8 the diffractive structure has no effect on the diffractive pattern in the focal plane of the lens regardless of configuration, i.e., the light propagates through the device as if there was no DS in the path. The wavelength spacing that corresponds to integer values of $OPD_{min}$ varies from 1.48 nm to 1.50 nm. The light is focused into the axial fiber F22 of the fiber array shown in FIG. 14. The Airy disk size is defined only by the lens F/# and the wavelength of light propagating through the system. The coupling efficiency into fiber F22 depends on the fiber core size and the size of the diffractive pattern. FIG. 23 presents the typical three-dimensional light distribution at the focal plane of the achromatic refractive-diffractive singlet calculated for the nominal wavelength 1.5500 $\mu$m for any of the configurations shown in FIG. 3. This regime corresponds to a coupling mode of operation, where most of the light at the wavelengths listed in Table 8 is directed into the central optical fiber F22 of the fiber array of FIG. 14.

Mode 2: Operation as a Wavelength Router

Given the same offset t=3.491 mm between the segments of the DS, there are certain wavelengths within the operative wavelength range that have a remainder of the $OPD_{min}$ equal to half a wave. Some of these wavelengths, as well as the respective values of minimum OPDs, are listed in Table 9.

The wavelength spacing in Table 9 varies from 1.48 nm to 1.50 nm. The resulting light distribution at the focal plane is different for the three types of DSs shown in FIGS. 3A through 3C. FIG. 24 presents a typical three-dimensional light distribution at the focal plane of the focusing lens 3 for the DS shown in FIG. 3A calculated for the wavelength 1.54926 $\mu$m. The intensity distribution at the focal plane of the lens 3 consists of four equal beams laterally offset from the optical axis. A combination of four fibers from the fiber array can be used for coupling. As an example, fibers F11, F13, F31 and F33 of FIG. 14 can be used.

FIG. 25 presents a typical three-dimensional light distribution at the focal plane of the focusing lens 3 for the DS shown in FIG. 3B calculated for the wavelength 1.54926 $\mu$m. The intensity distribution at the focal plane of lens 3 consists of two equal beams laterally offset from the optical axis in the vertical plane. A combination of two fibers from the fiber array can be used for coupling. As an example, fibers F12 and F32 of FIG. 14 can be used.

FIG. 26 presents a typical three-dimensional light distribution at the focal plane of the focusing lens 3 for the DS shown in FIG. 3C calculated for the wavelength 1.54926 $\mu$m. The intensity distribution at the focal plane of lens 3 consists of two equal beams laterally offset from the optical axis in the horizontal plane. A combination of two fibers from the fiber array can be used for coupling. As an example, fibers F21 and F23 of FIG. 14 can be used.

The foregoing regimes correspond to a splitting mode of operation, where most of the light at the wavelengths listed in Table 9 is equally split between two or four optical fibers from the fiber array, depending on the DS configuration. At the same time there is almost no light propagating on-axis, so the wavelengths shown in Table 9 would be effectively isolated from on-axis fiber F22 of the fiber array of FIG. 14.

For any wavelength not listed in Tables 8 and 9, the light distribution at the focal plane of the focusing lens is a function of a specific wavelength and DS configuration. Table 10 presents a progression of wavelengths from 1.54933 $\mu$m through 1.54993 $\mu$m based on $OPD_{min}$ increments of 0.05 waves, as well as respective minimum OPDs associated with these wavelengths.

Figure 27A:
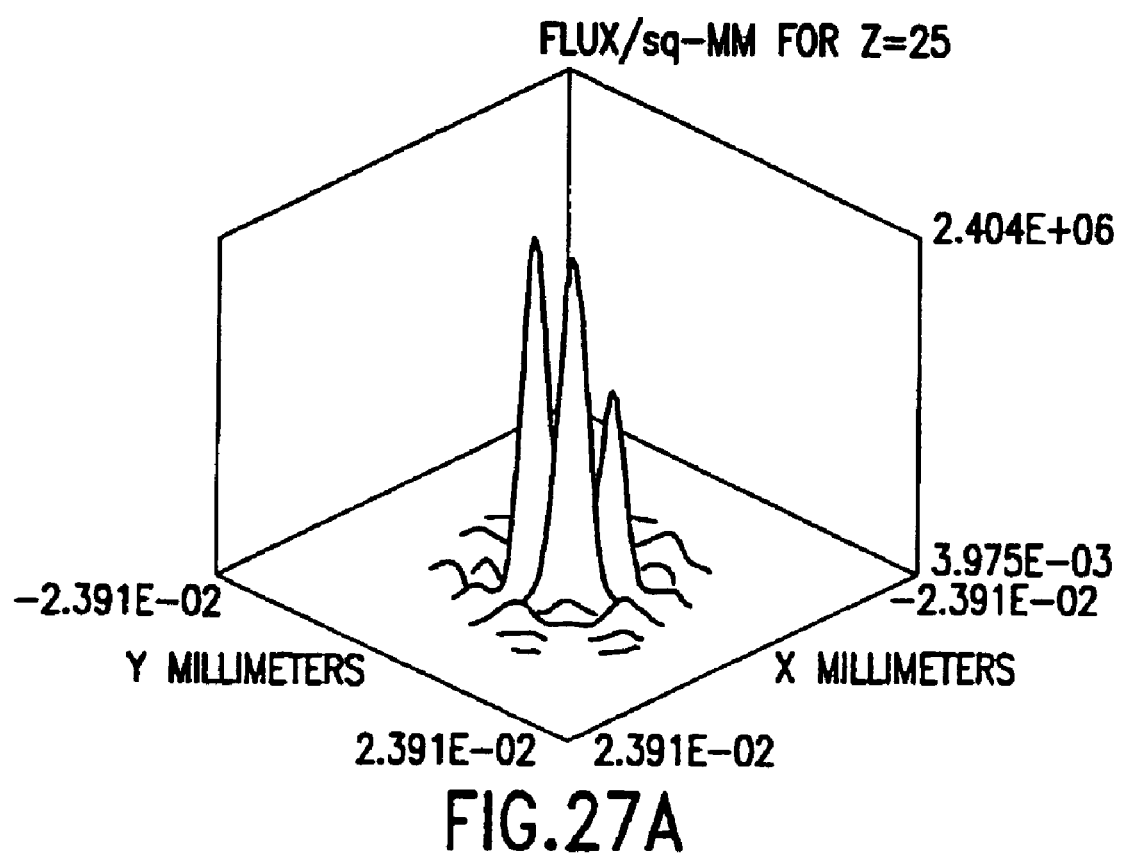
Figure 27B:
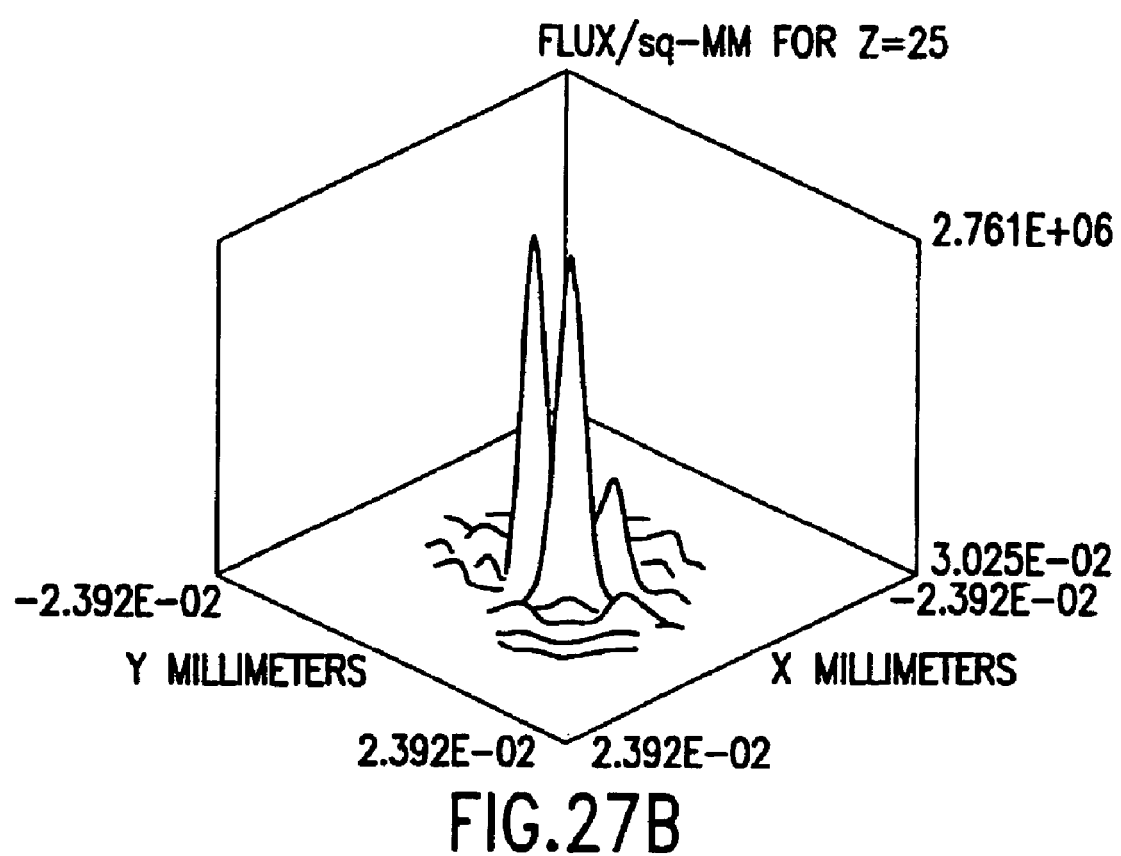
Figure 27C:
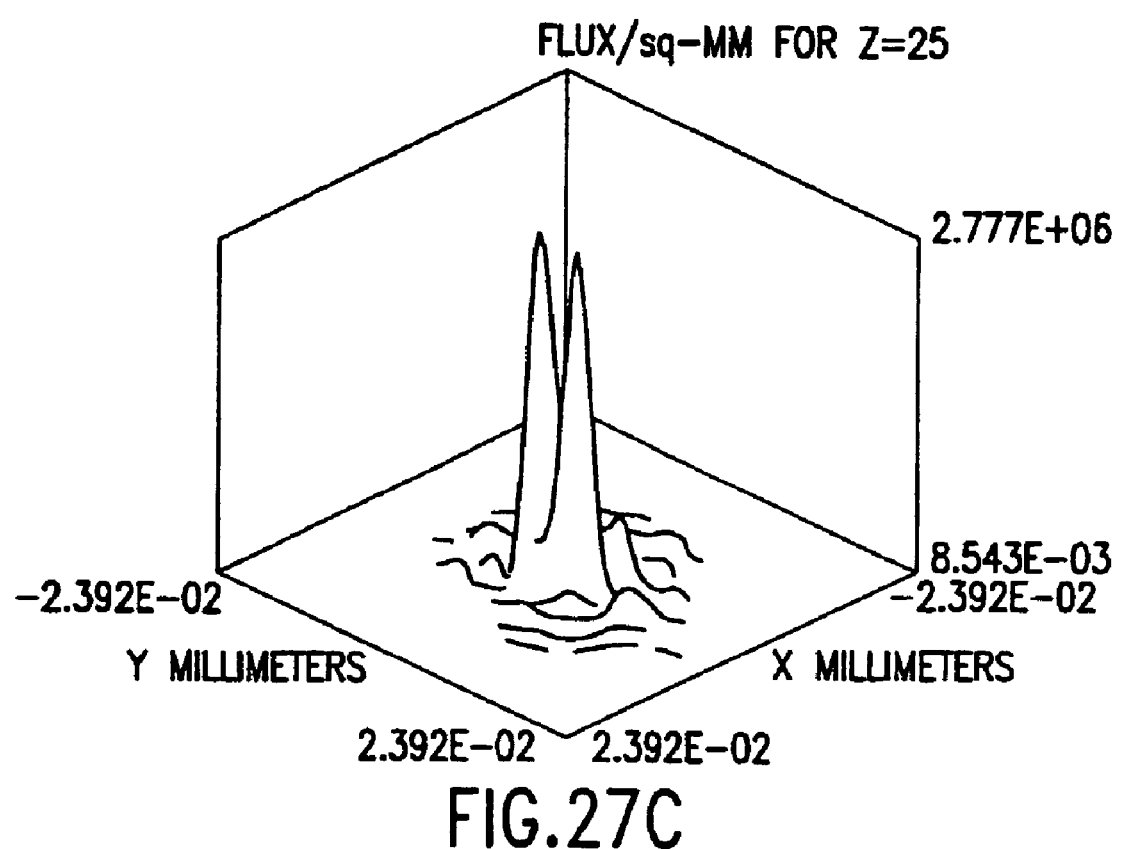
Figure 27D:
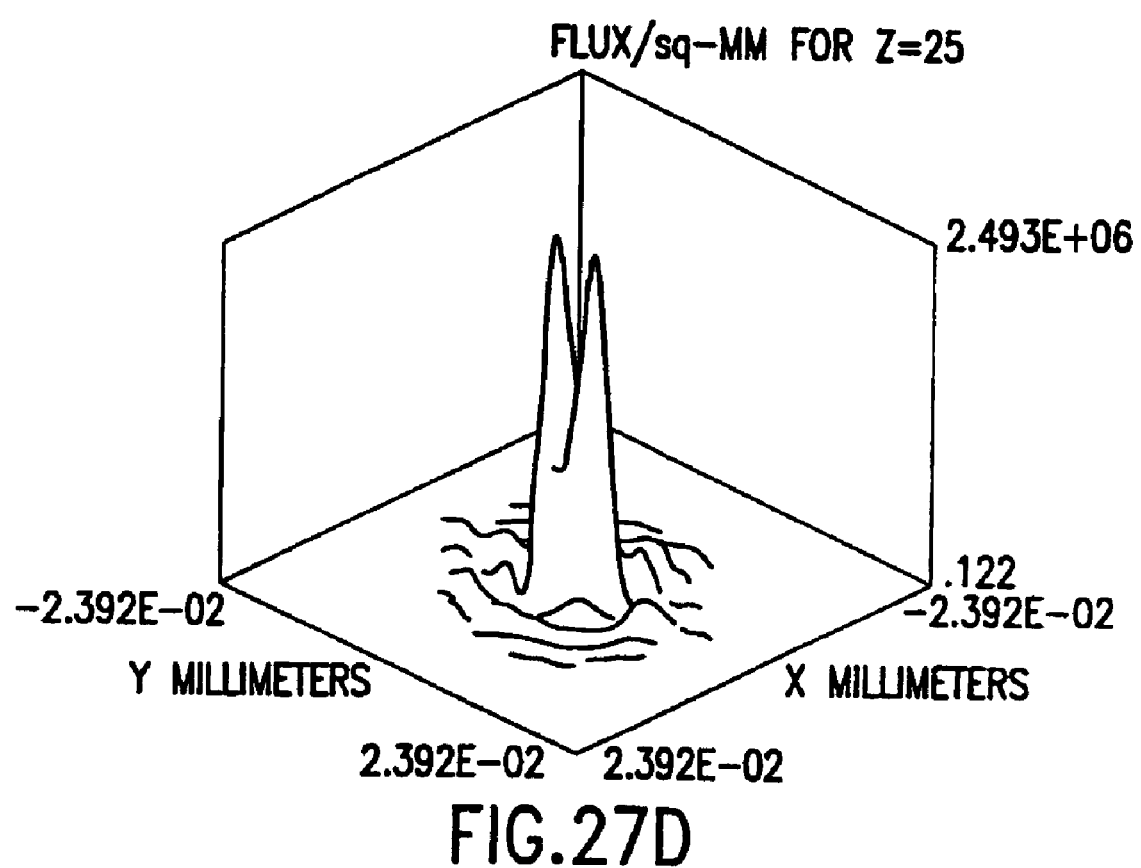
Figure 27E:
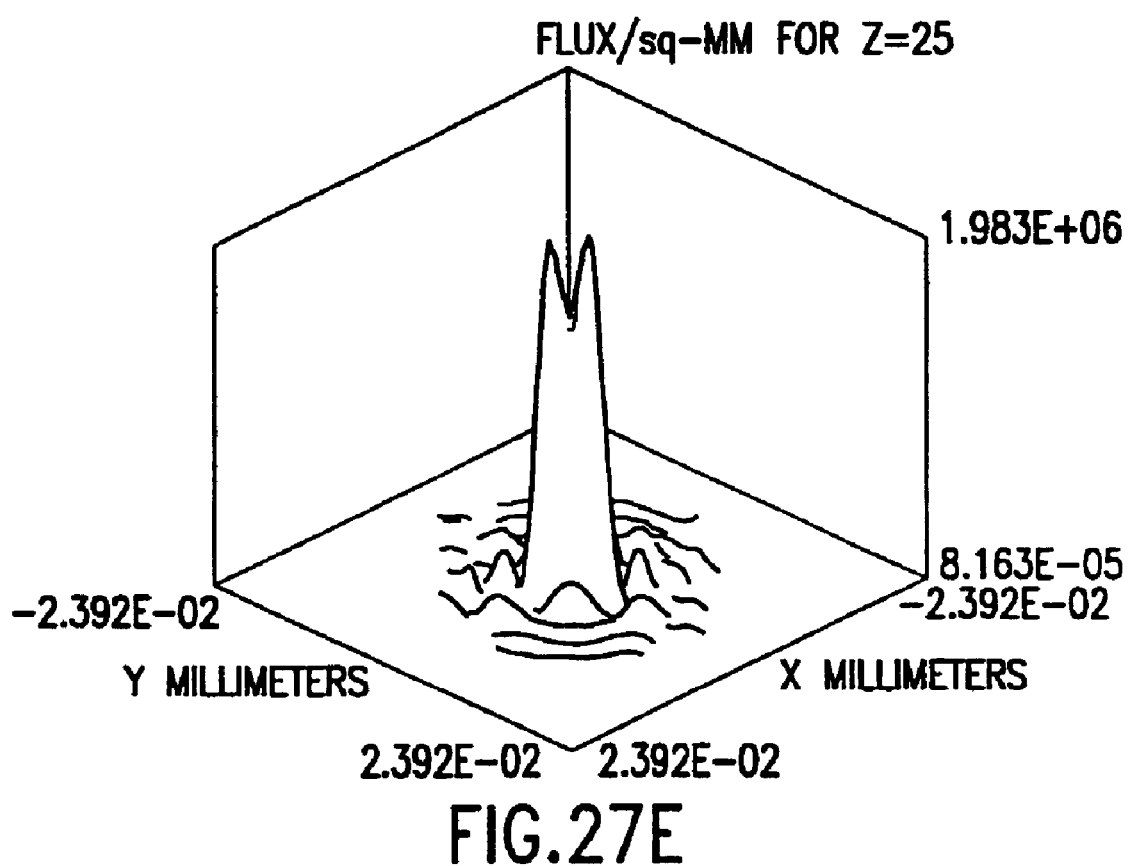
Figure 27F:
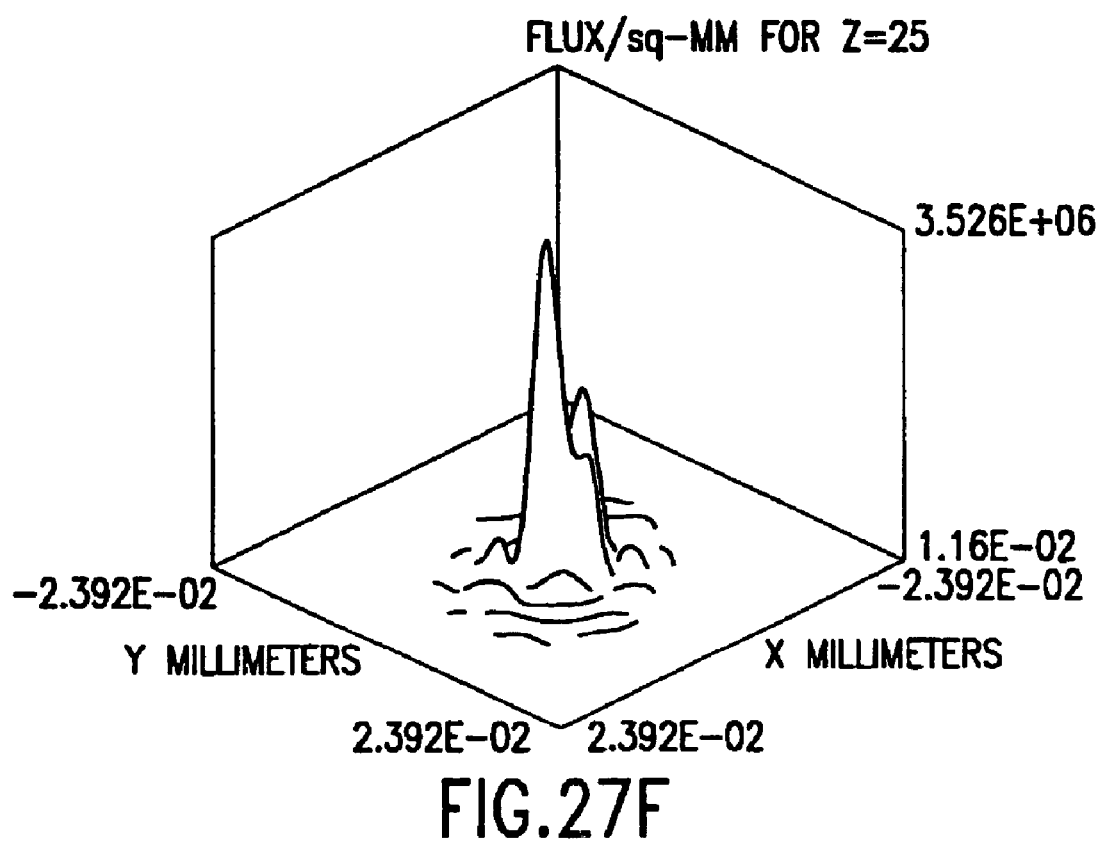
Figure 27G:
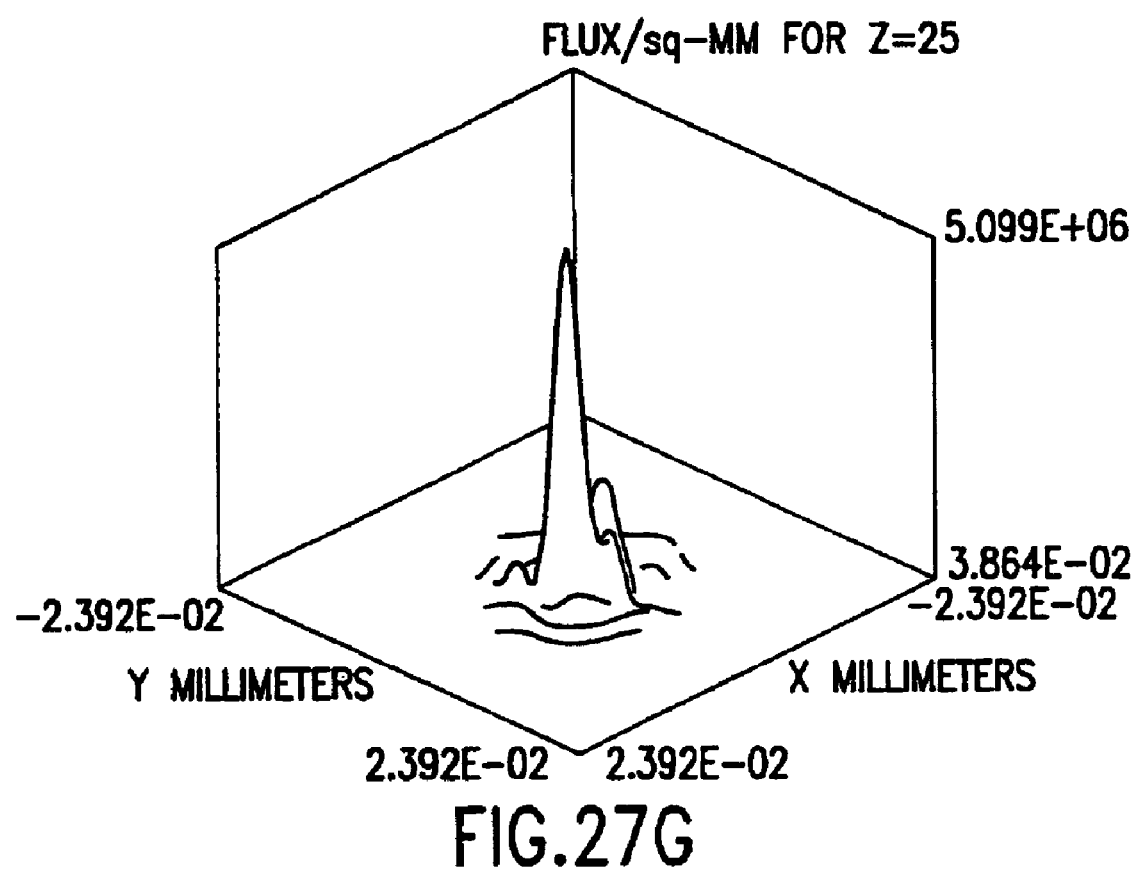
Figure 27H:
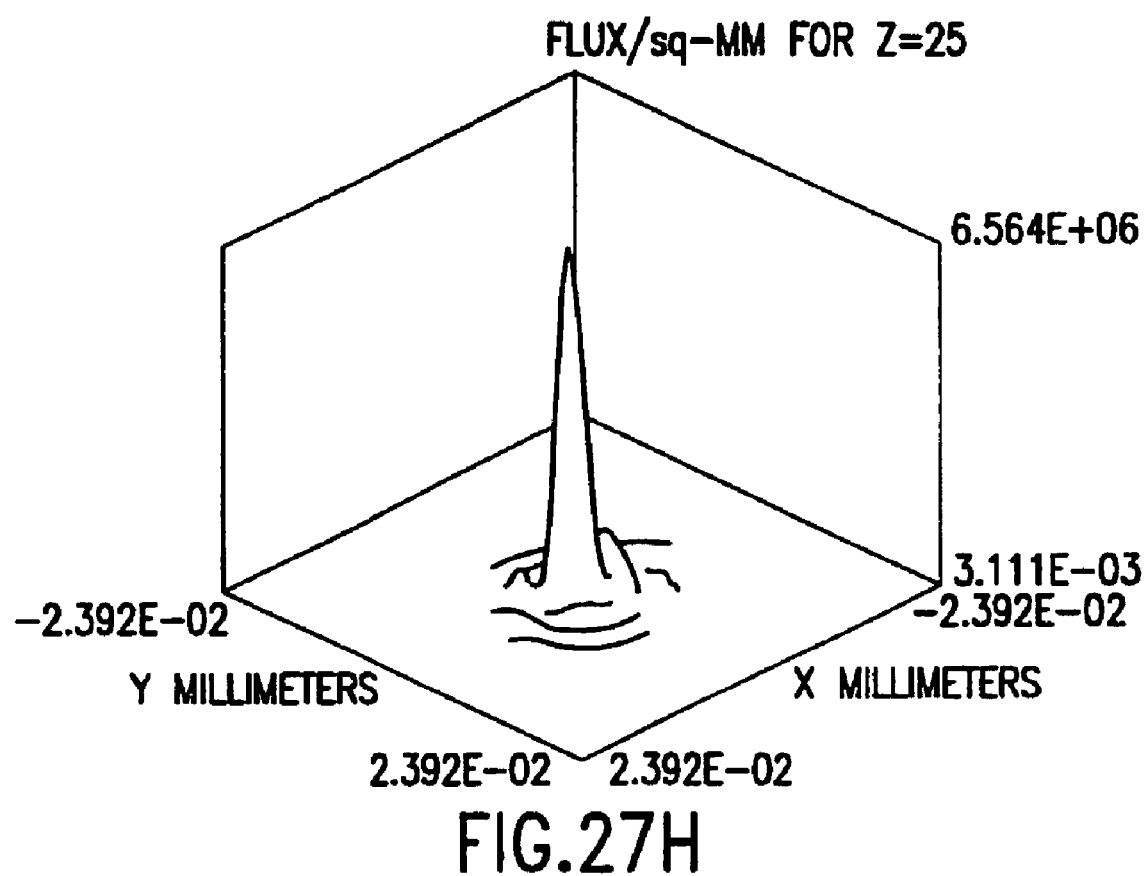
Figure 271:
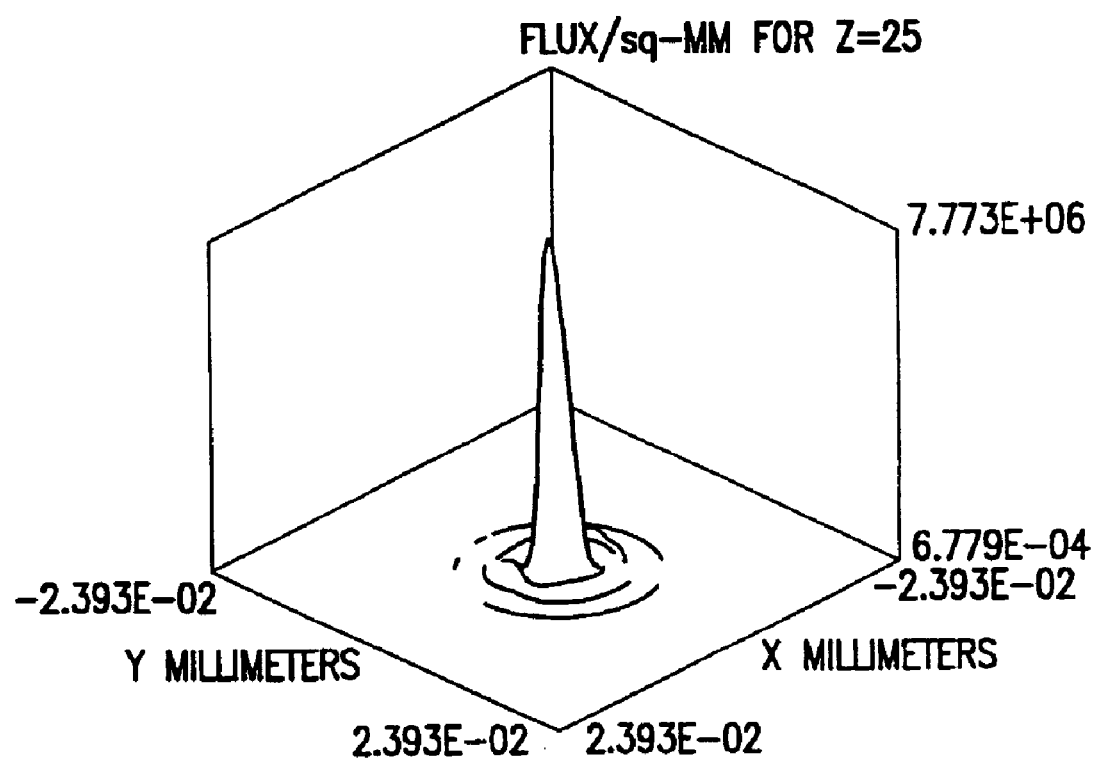

FIGS. 27A through 27I show the progression of three-dimensional light distributions at the focal plane of the focusing lens 3 for the wavelengths listed in Table 10 in ascending order and a DS configuration that corresponds to FIG. 3A. FIG. 27A corresponds to a wavelength of 1.54933 $\mu$m. FIG. 28I corresponds to a wavelength of 1.54993 $\mu$m.

Figure 28A:
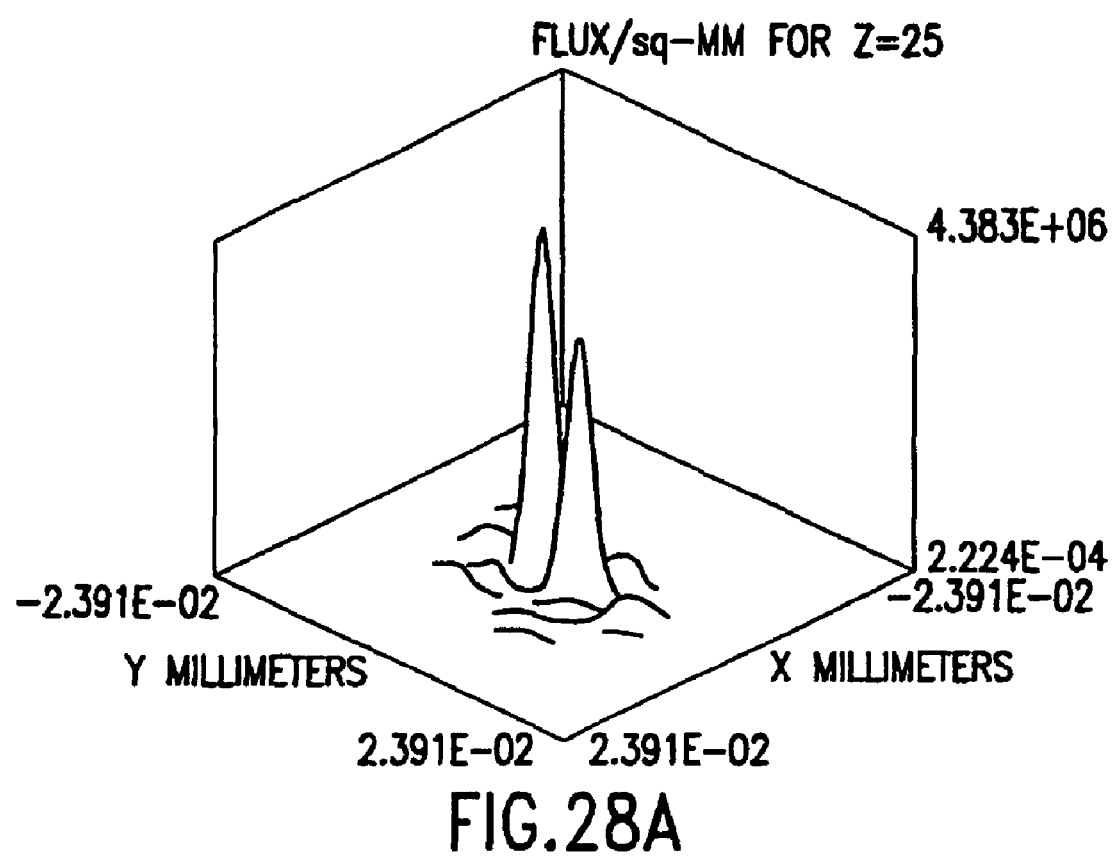
Figure 28B:
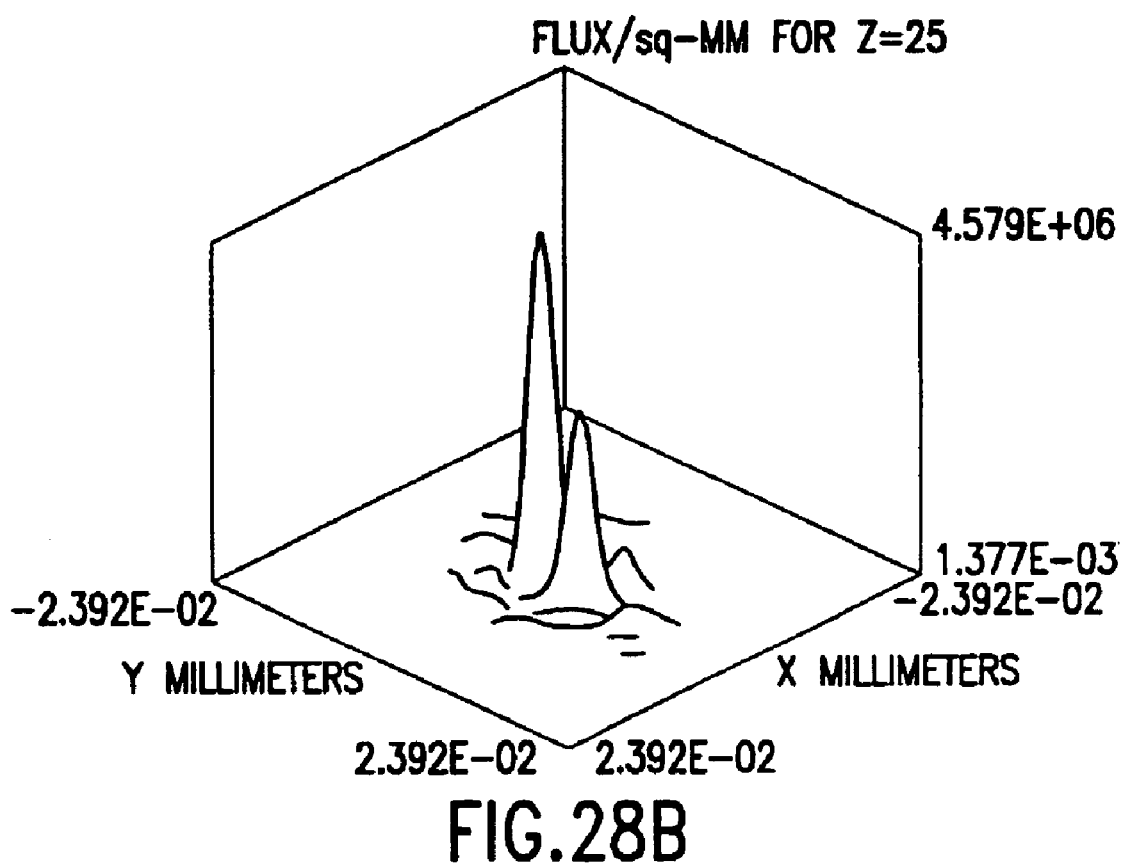
Figure 28C:
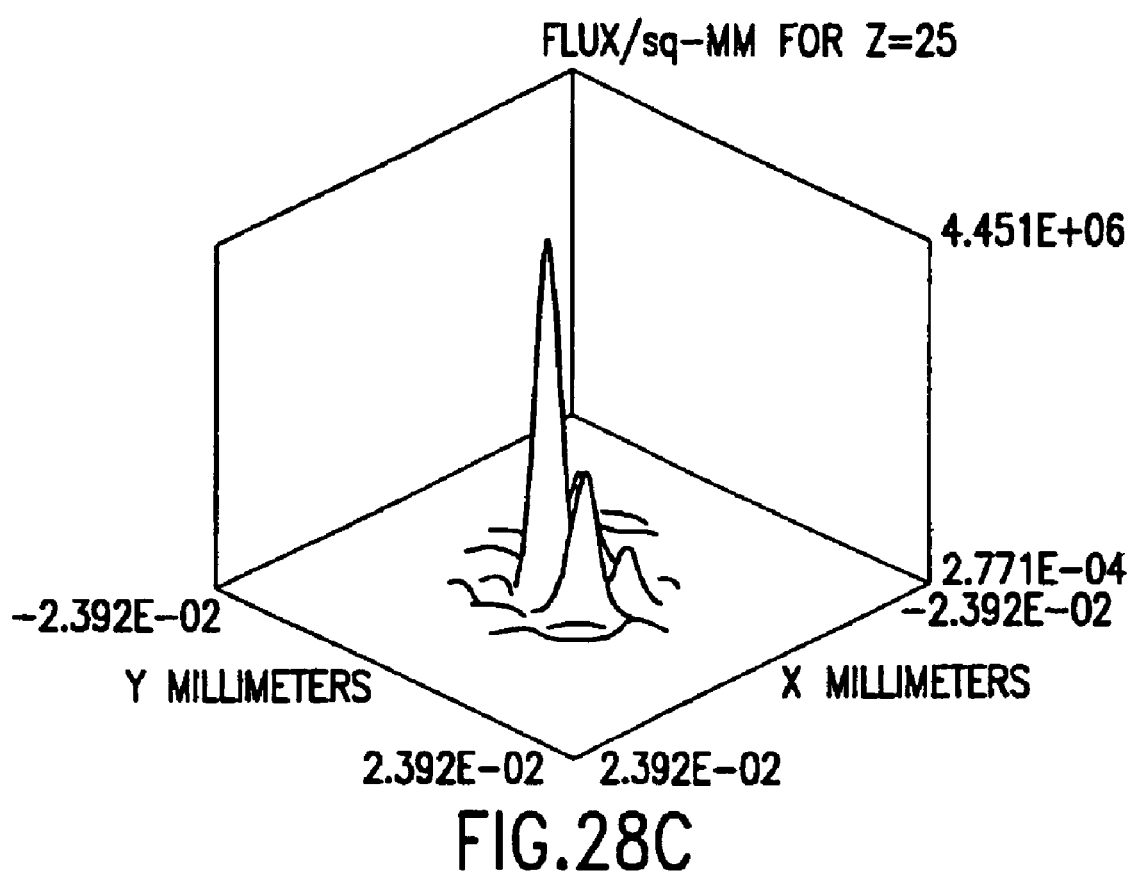
Figure 28D:
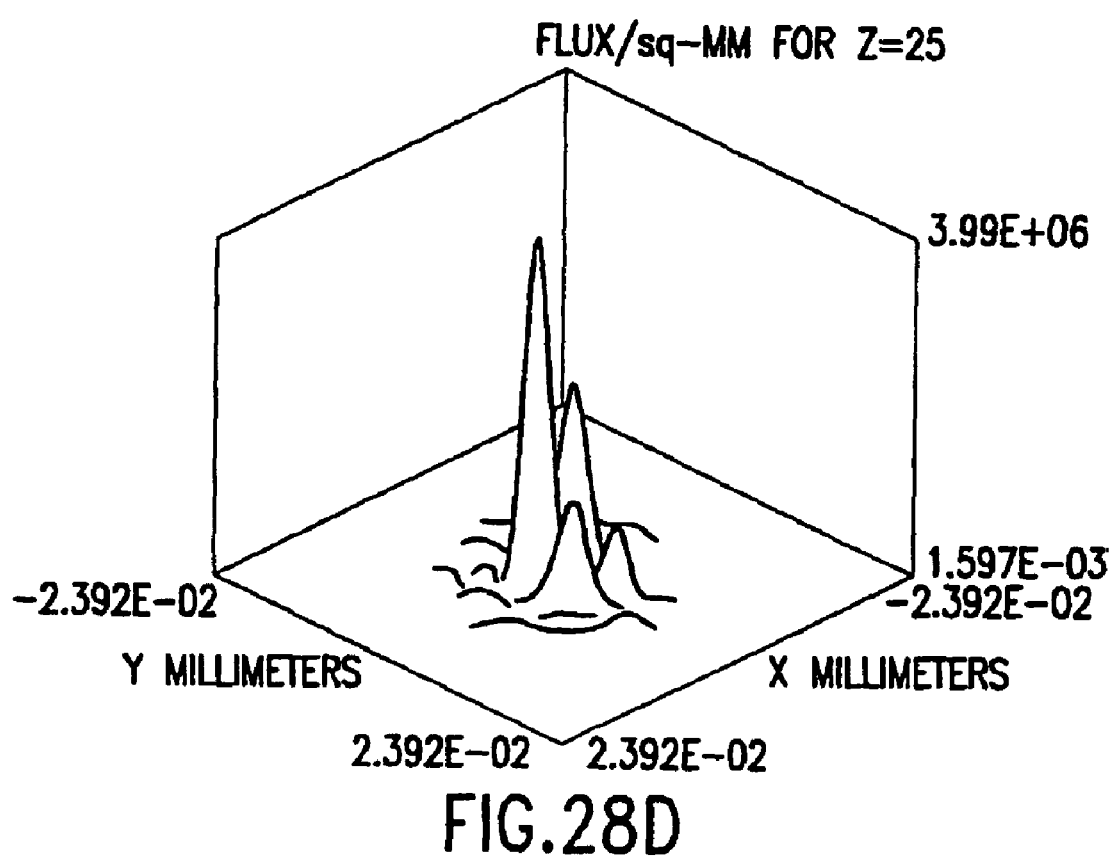
Figure 28E:
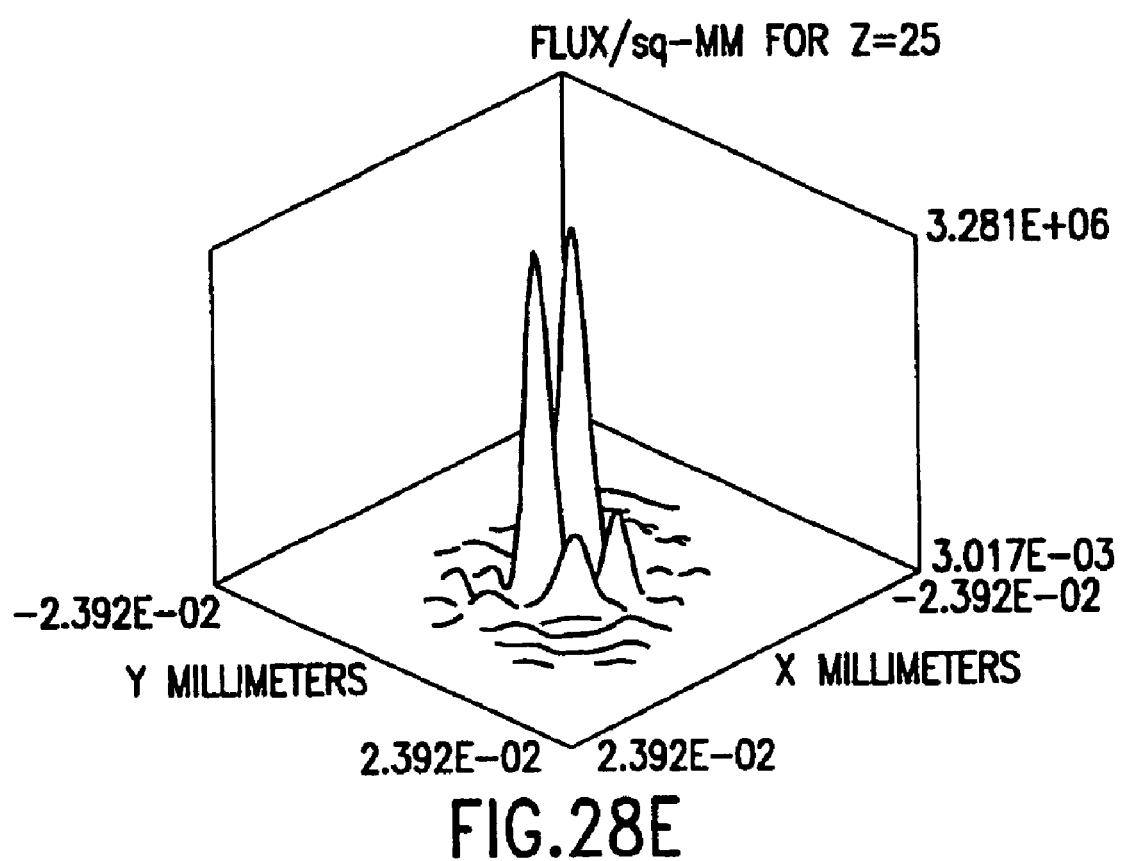
Figure 28F:
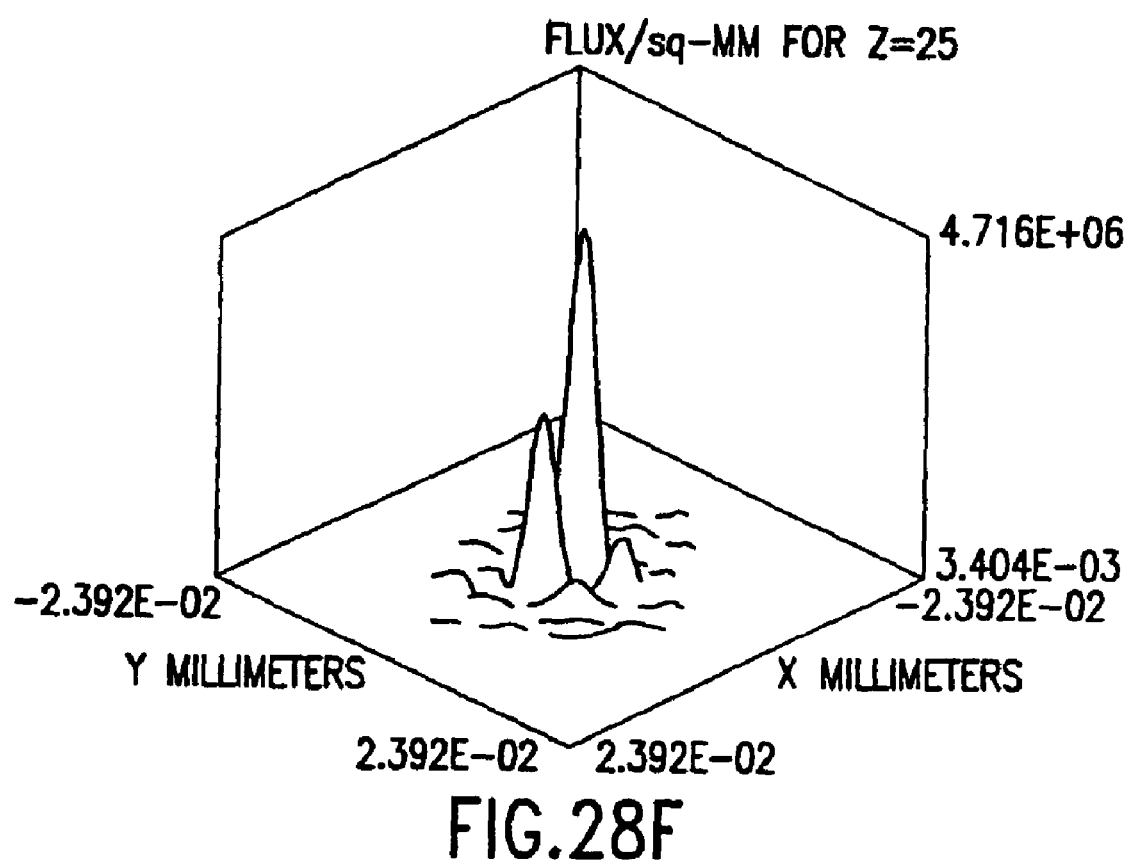
Figure 28G:
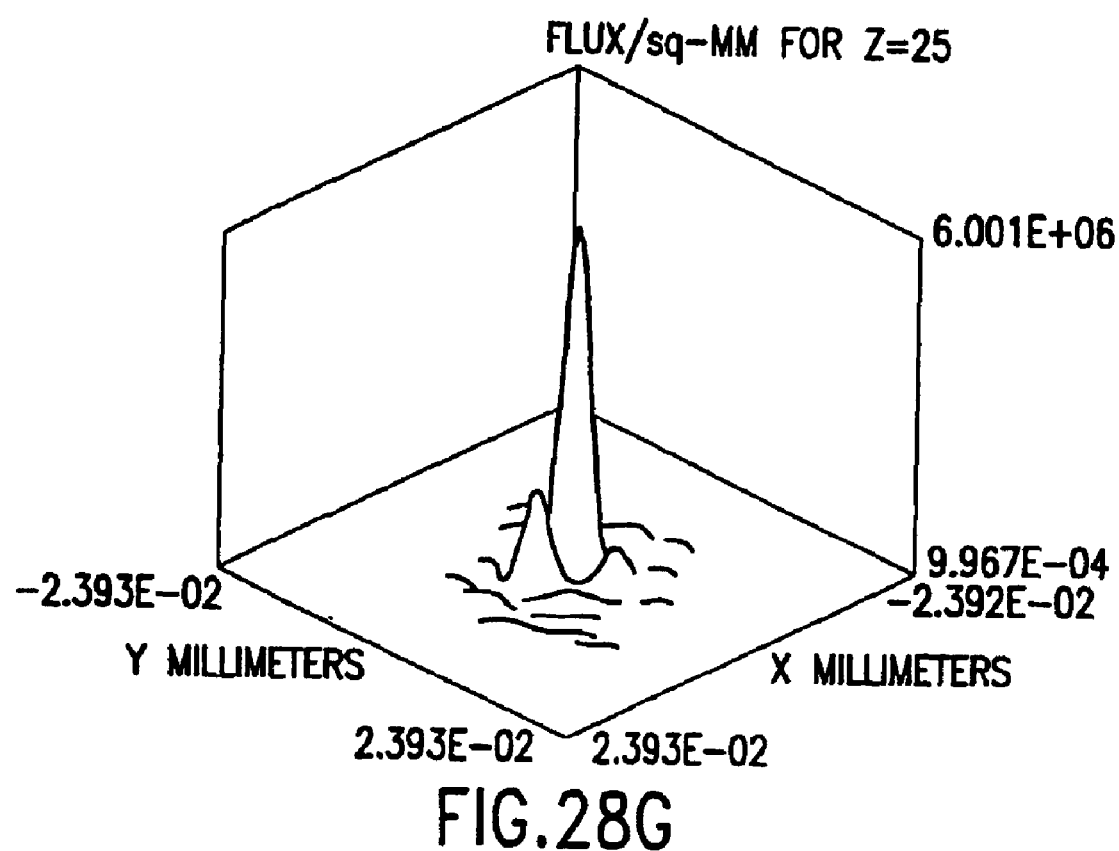
Figure 28H:
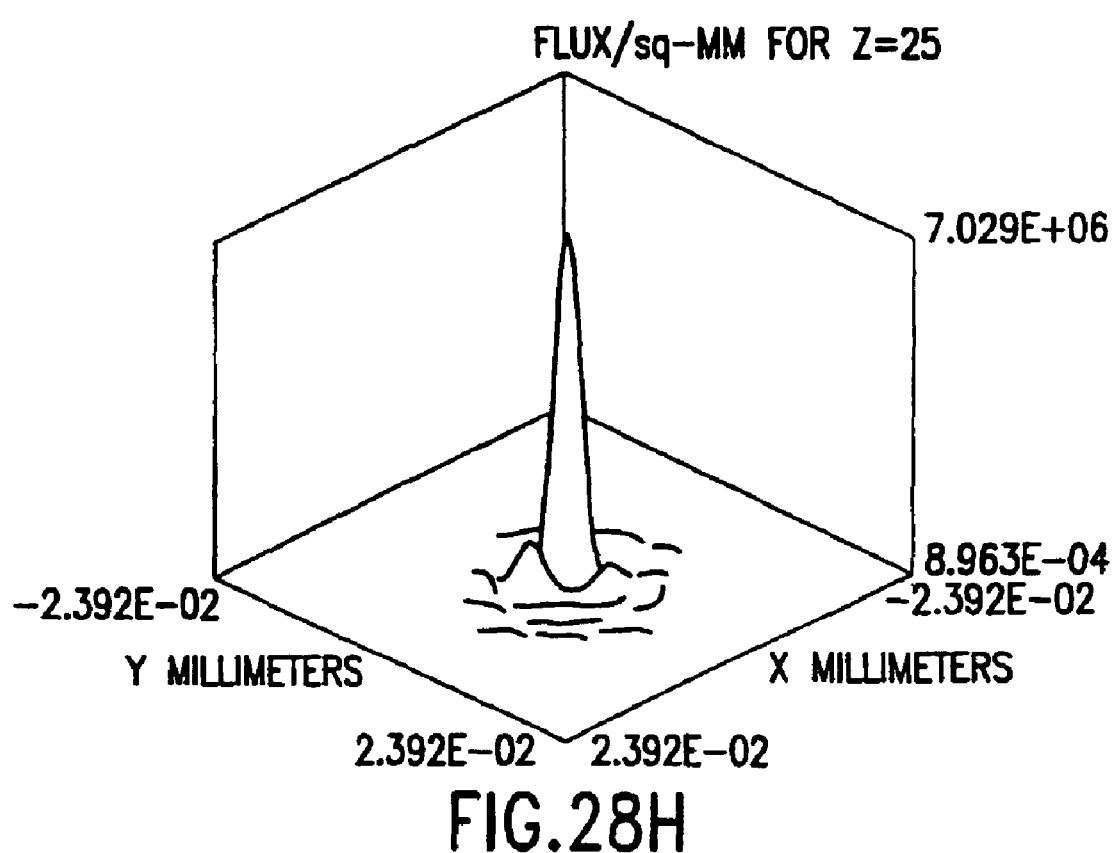
Figure 281:
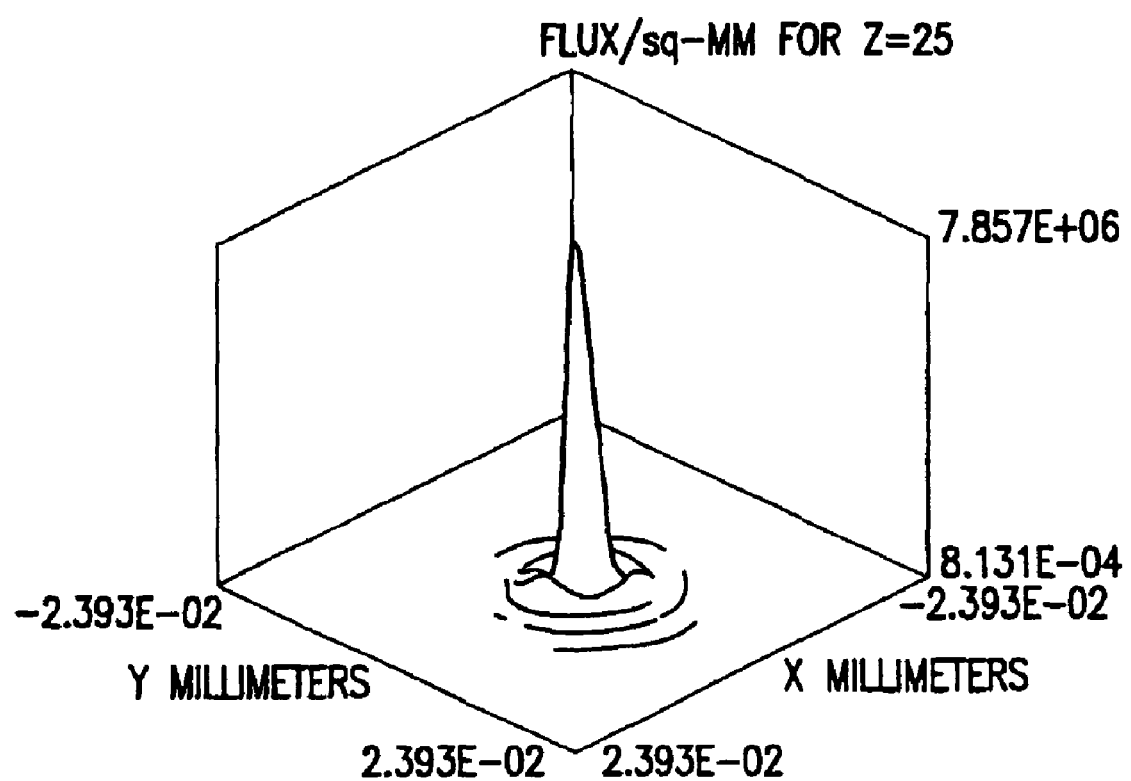

FIGS. 28A through 28I show the progression of three-dimensional light distributions at the focal plane of the focusing lens 3 for the wavelengths listed in Table 10 in ascending order and a DS that corresponds to FIG. 3B. FIG. 28A corresponds to a wavelength of 1.54933 $\mu$m. FIG. 28I corresponds to a wavelength of 1.54993 $\mu$m.

Figure 29A:
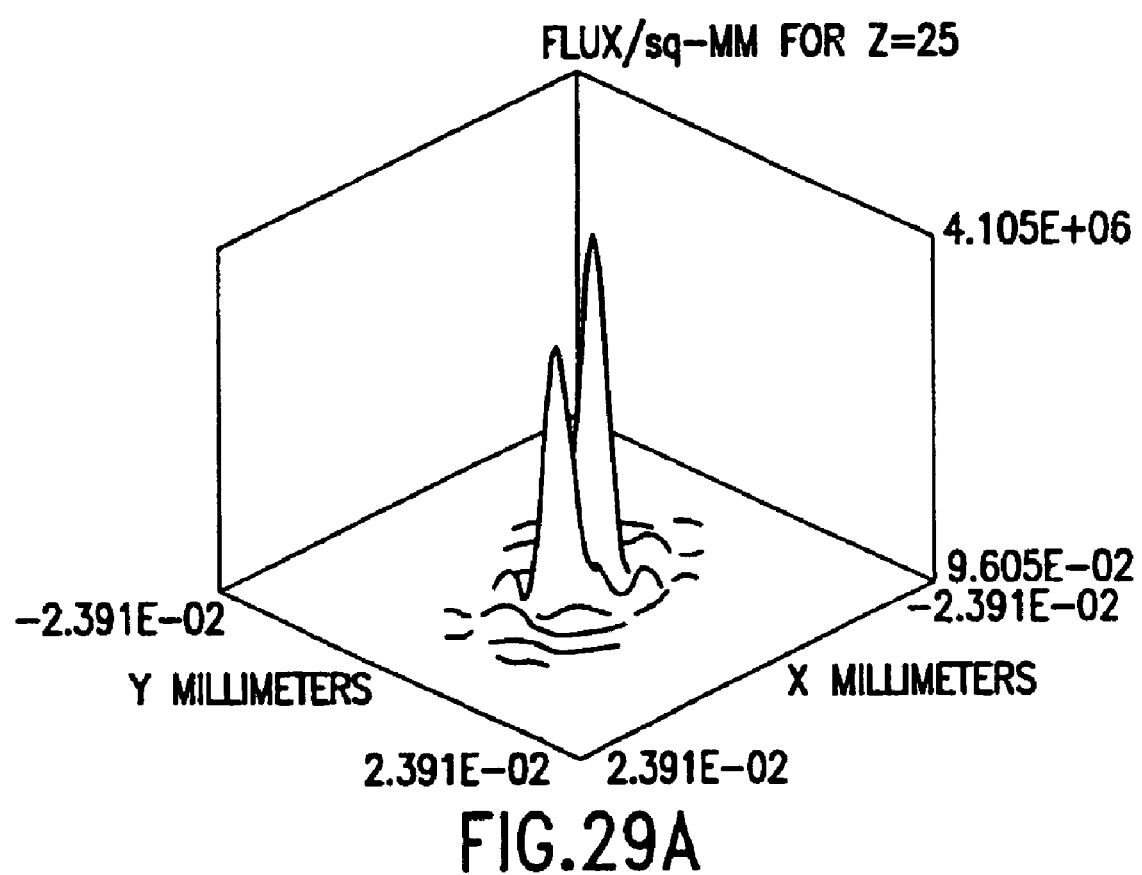
Figure 29B:
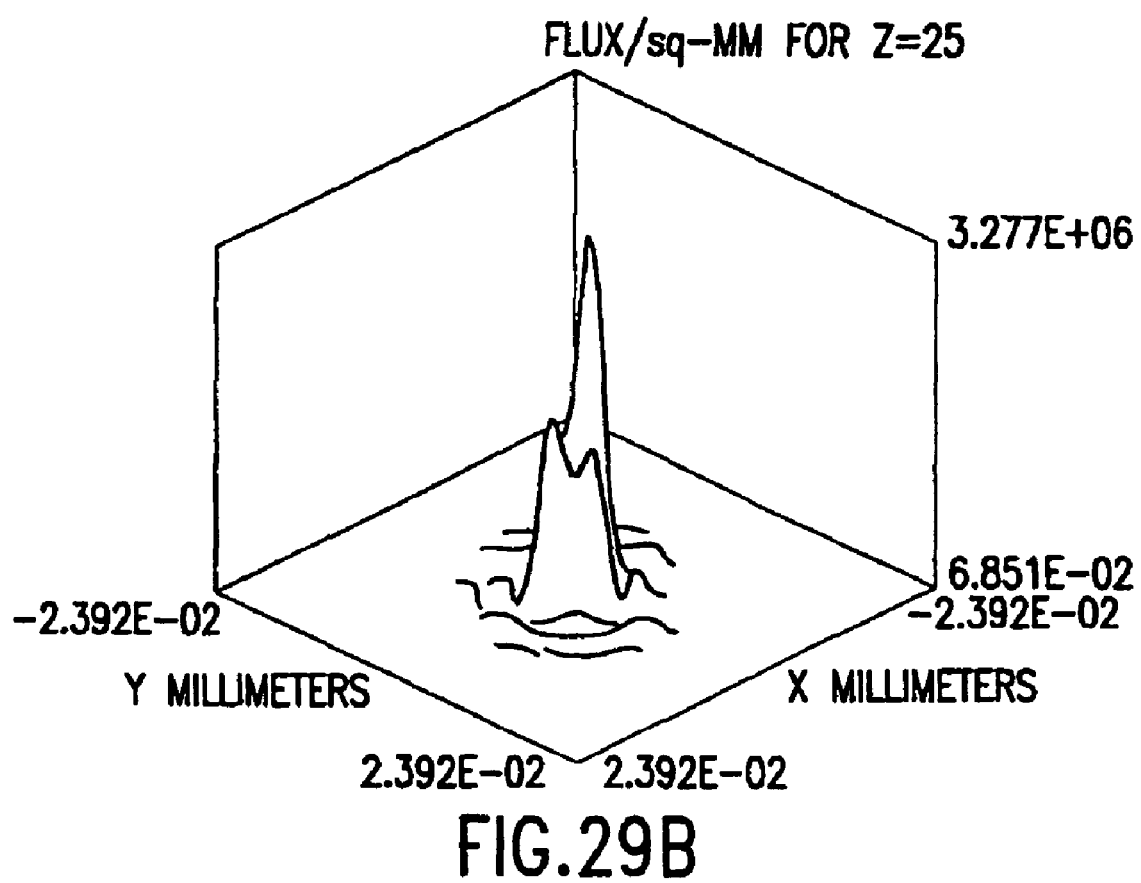
Figure 29C:
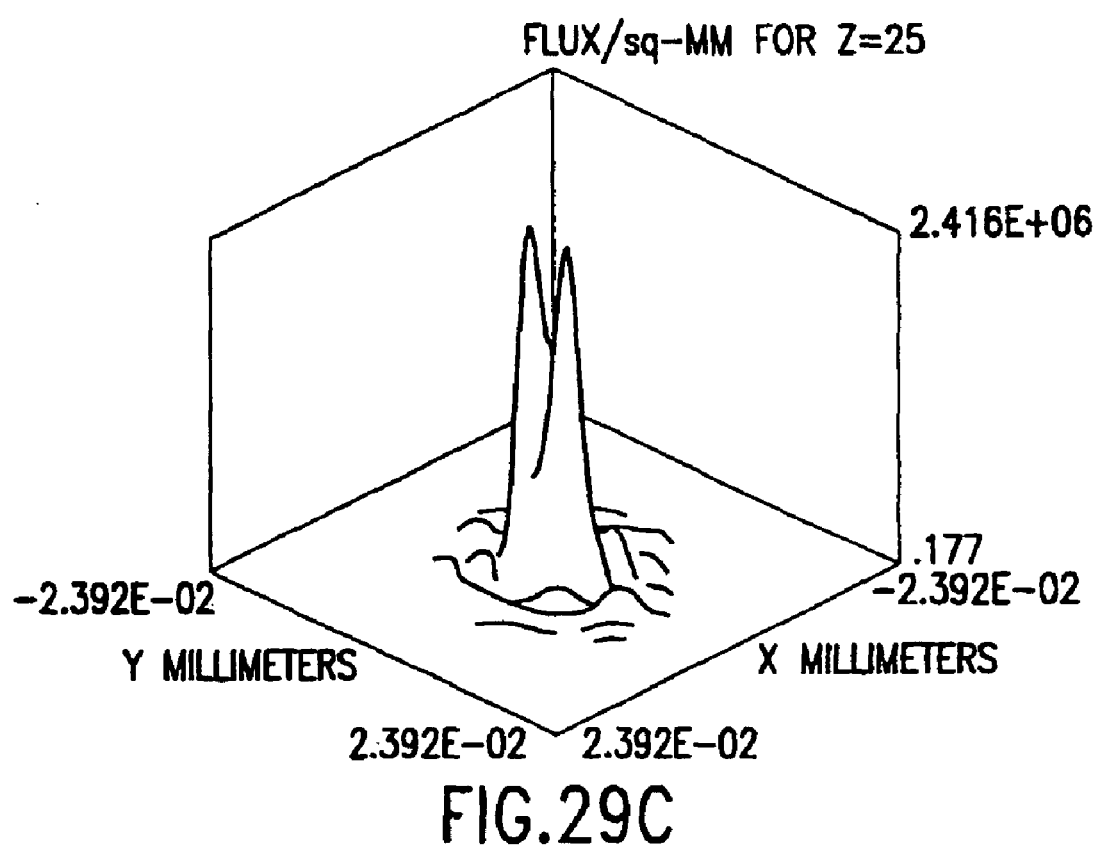
Figure 29D:
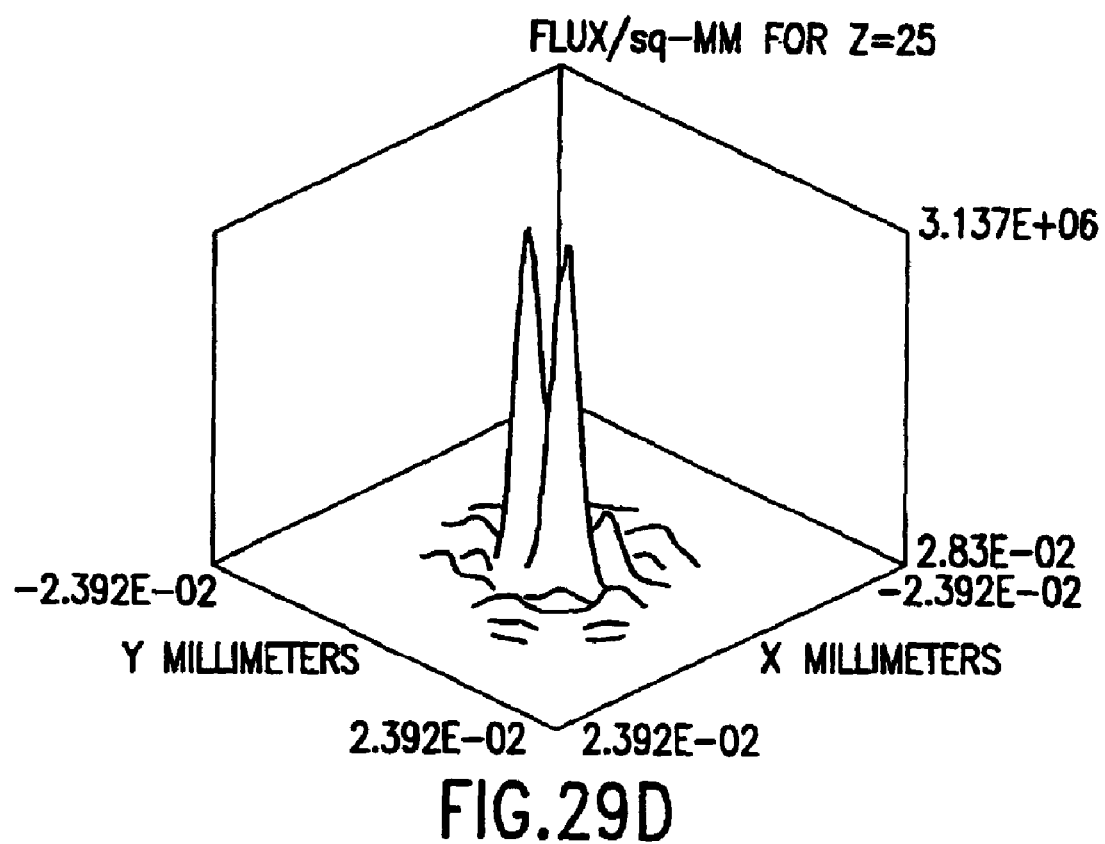
Figure 29E:
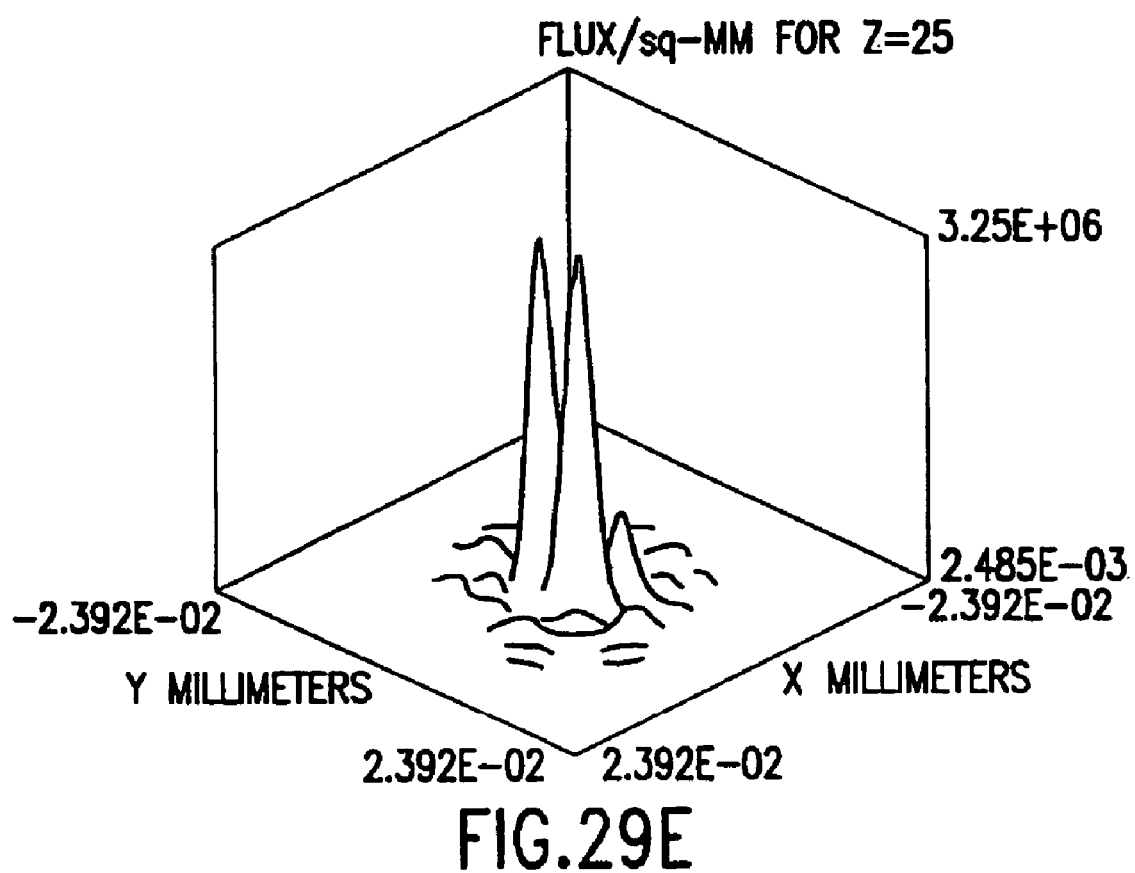
Figure 29F:
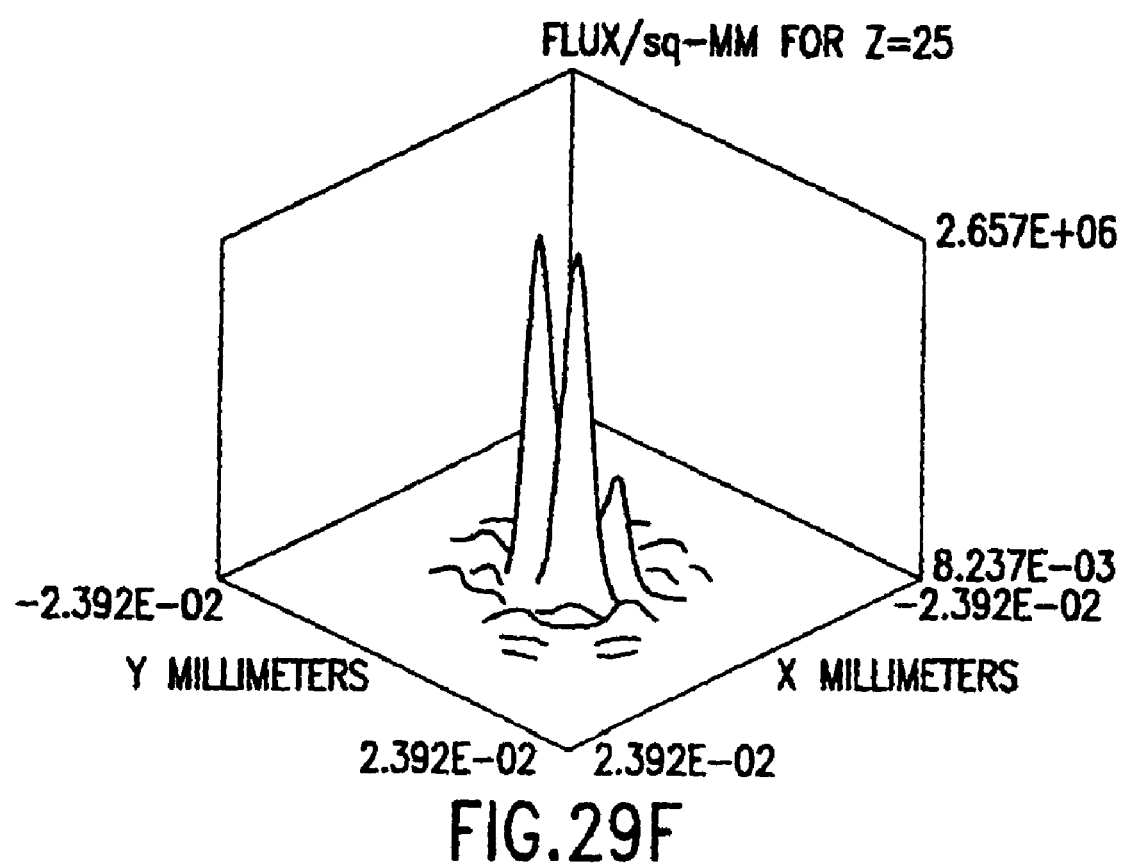
Figure 29G:
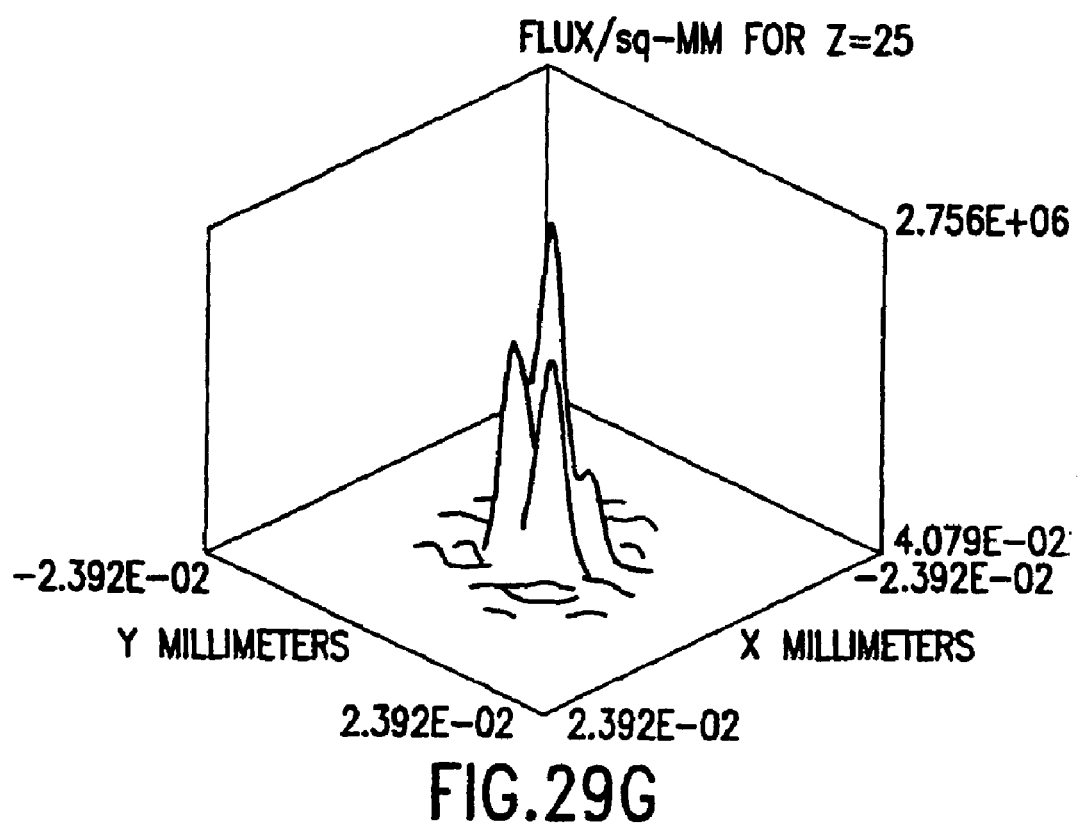
Figure 29H:
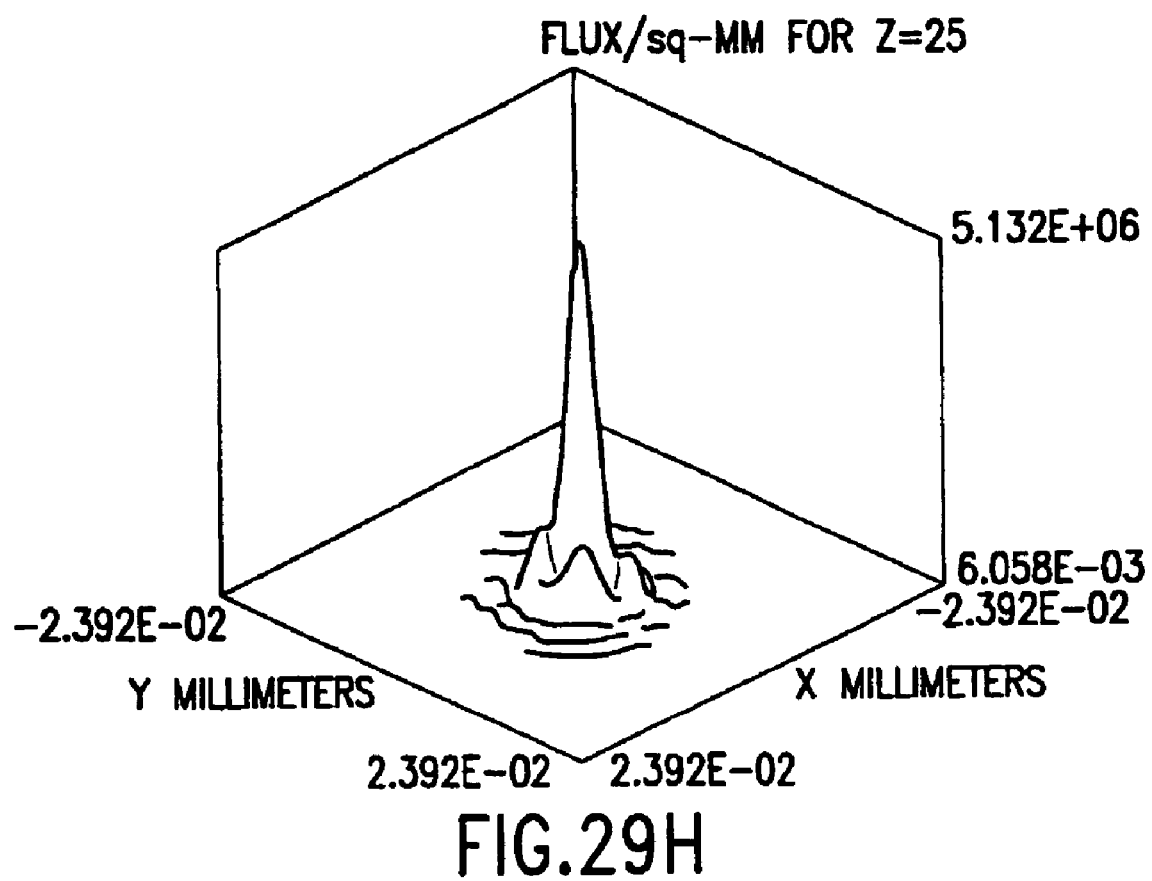
Figure 291:
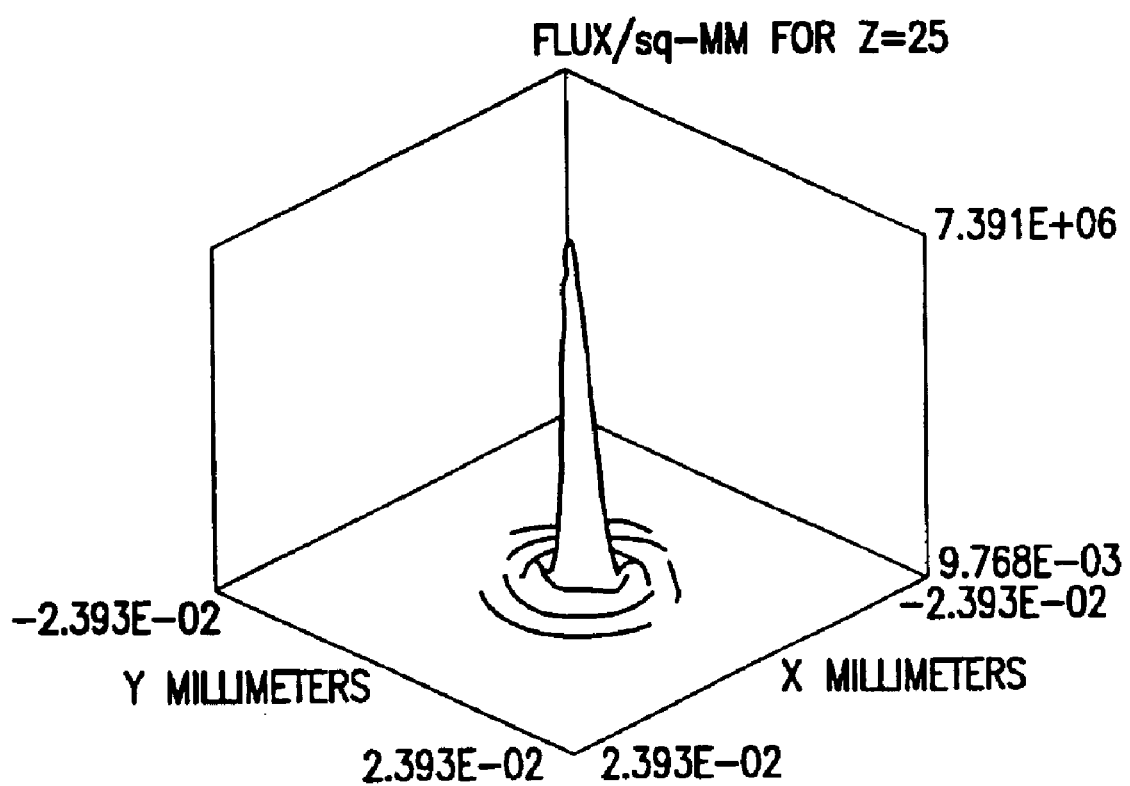

FIGS. 29A through 29I show the progression of three-dimensional light distributions at the focal plane of the focusing lens 3 for the wavelengths listed in Table 10 in ascending order and a DS that corresponds to FIG. 3C. FIG. 29A corresponds to wavelength of 1.54933 $\mu$m. FIG. 29I corresponds to wavelength of 1.54993 $\mu$m.

The results for the three configurations are summarized in Table 11:

Mode 3: Operation as a Splitter/Divider

Changing the $OPD_{min}$ of the diffractive structure will reconfigure the MRDD so that it can meet operation requirements.

Changes in the refractive indices of the DS material and/or the surrounding medium, as well as the length of the offset t, will change the $OPD_{min}$ and will cause changes in the intensity distribution at the focal plane of the focusing lens. Table 12 shows the nature of the beam pattern at the focal plane based on the $OPD_{min}$ for any given wavelength within the working range.

Changes to $OPD_{min}$ of the diffractive structure can be achieved, for example, by one of the following:
1. Adjusting the refractive index of the DS medium by changing the temperature, pressure, magnetic or electric field, etc.
2. Rotation of the DS relative to an axis that is perpendicular to the optical axis of the system.

Embodiment 4

In the above embodiments the DS structure has had planar symmetry, i.e. the components of the structure were shaped as individual circular segments. This led to light distributions at the focal plane that also had planar symmetry.

Sometimes it is desirable to have wavelength routing capabilities that have circular symmetry at the focal plane of the focusing lens. In this case the DS is composed of individual annular zones. Examples of DSs of this type are shown in FIG. 5. The fibers at the focal plane in this case are arranged in a circular pattern, as shown schematically in FIG. 30.

Other Configurations

In addition to the transmissive MRDDs shown above (see FIGS. 1 and 8), reflective type MRDDs are also possible. FIG. 31 shows reflective type MRDDs that employ reflective DSs. Each MRDD consists of input and output fibers 111 and 211, collimator 311, and DS 411 in FIG. 31A and DS 82 in FIG. 31B. The DS can be composed of mirror components, as shown in FIG. 31A. Alternatively the reflective surface of the DS can be a second surface, as shown on FIG. 31B. In this case the DS is made from optically transparent material. An advantage of the reflective type MRDD is its compactness and reduction in the number of components. It employs only one lens that is used for both collimation and focusing. The transmissive version of an MRDD requires individual collimation and focusing lenses. Reflective MRDDs also allow reduction in the step height of the components of the DS.

Transmissive Characteristics
1. Bandpass Narrowing

The spectral relative transmission of a single MRDD has the characteristic sinusoidal shape shown in FIG. 32A, curve 1. This curve is computed for a fused silica DS having the configuration of FIG. 2 working in transmission with a step height of 2.0498 mm. The spacing between the peaks is 50 GHz and the FWHM is 25 GHz. Arranging consecutive MRDD units in series substantially narrows the transmission peak and improves the selectivity. Curve 2 in FIG. 32A represents the transmission characteristics of a two-stage unit composed of two identical units with transmission characteristics shown in curve 1. The spacing between the peaks is 50 GHz and the FWHM is 18 GHz. Curve 3 in FIG. 32A represents the transmission characteristics of a three-stage unit composed of three identical units with transmission characteristics shown in curve 1. The spacing between the peaks is 50 GHz and the FWHM is 12.5 GHz. Curves 1 through 3 in FIG. 32B shows transmissive characteristics in dB for respective curves 1 through 3 of FIG. 32A.
2. Comb Filter When working with a fixed grid of frequencies as established by a telecommunication standard (see, for example, ITU-T Recommendation G.957), it is often required to have a device that can be effectively used as a comb filter. FIG. 33A shows the relative transmissive characteristics of an MRDD working in reflection for a fixed frequency grid having a channel spacing of 50 GHz anchored to a 193.10 THz reference and ranging from 192.1 THz through 196.1 THz. The diffractive structure is made from fused silica, has the configuration of FIG. 2, a step height of 1.0249 mm, and is used in reflection as shown in FIG. 31B. The corresponding curve in dB is shown in FIG. 33B. It is seen that an MRDD can be effectively used as a comb filter to transmit, reject or separate certain frequencies in the grid. It should be noted that the frequencies with low transmittance in FIG. 33 can be effectively coupled to a fiber with a different spatial position at the focal plane of the focusing lens.
3. Signal Equalization The signals transmitted through an optical communication system have spectral dependent losses/gain. It is often required to equalize the signals propagating through a fiber. An MRDD can provide both filtering and equalization.

FIG. 34A presents the relative transmissive characteristics for a frequency grid of 50 GHz through a MRDD of the type used to produce FIG. 33 but with a step height of 1.0225 mm. FIG. 34B is a corresponding plot for transmission defined in dB and a frequency grid of 100 GHz spacing. Transmission is gradually decreasing towards the higher frequencies for the high transmissivity part of the grid.

FIG. 35A presents relative transmissive characteristics for a frequency grid of 50 GHz through a MRDD of the type used to produce FIG. 33 but with a step height of 1.0275 mm. The characteristics are opposite to those shown in FIG. 34. Transmission is gradually decreasing towards the lower frequencies for the high transmissivity part of the grid. FIG. 35B is a corresponding plot for transmission defined in dB and a frequency grid of 100 GHz spacing.

FIG. 36A presents relative transmissive characteristics for a frequency grid of 50 GHz spacing through a MRDD of the type used to produce FIG. 33 but with a step height of 1.0377 mm. FIG. 36B is a corresponding plot for transmission defined in dB and a frequency grid of 50 GHz spacing. The DS divides the incoming wavefront in unequal portions so that the intensity modulation is 0.8.

FIG. 37A presents relative transmissive characteristics for a frequency grid of 50 GHz through a MRDD of the type used to produce FIG. 33 but with a step height of 1.0379 mm. FIG. 37B is a corresponding plot for transmission defined in dB and a frequency grid of 50 GHz spacing. The DS divides the incoming wavefront in unequal portions so that the intensity modulation is 0.8.

More sophisticated transmission characteristics are obtained for two-stage equalization and filtering. FIGS. 38 and 39 show representative multistage arrangements of MRDD devices.

FIG. 38A shows a two-stage MRDD. The incoming signal propagates through the input fiber 57 and a first MRDD unit 41 and is coupled into an intermediate fiber 21. From fiber 21 the signal propagates through MRDD 51 and is coupled into an output fiber 31. Fiber 21 can optionally be replaced by a spatial filter located at a focal plane shared by MRDDs 41 and 51.

FIG. 38B shows another two-stage MRDD. The incoming signal propagates through the input fiber 92 and a first MRDD unit 42 and is coupled into an intermediate fiber 22. From fiber 22 the signal is coupled into a second MRDD unit 52. The DS of unit 52 has a reflective coating applied to its back surface so that the signal is reflected, coupled into fiber 22, propagates a second time through the first MRDD stage 42 and then exits via the output fiber 32. Fiber 22 can optionally be replaced by a spatial filter located at a shared focal plane of MRDDs 42 and 52.

FIG. 38C shows a two-stage MRDD based on a four-port circulator and MRDDs with DSs employing reflective coatings of the type used in MRDD unit 52 of FIG. 38B. The incoming signal enters the circulator 73 through the entrance port 72, propagates through the circulator 73, is directed into the first MRDD unit 53 via the circulator port 23, is reflected back by the mirror surface 83 on the back of the DS and is coupled back into the circulator 73. The signal is further directed into the second MRDD unit 63 via the circulator port 33, is reflected back by the mirror surface 93 on the back of the DS, is coupled back into the circulator 73 through port 33 and exits the circulator 73 via the output port 43. Multi-port circulators with more than 4 ports can be employed to provide devices with more than two stages.

Although only two-stage configurations are shown in FIG. 38, more than two MRDD devices can be combined in accordance with the representative approaches shown.

A three-port circulator can also be used with a reflective MRDD to avoid axial offset of input and output fibers. FIG. 39 shows a two-stage MRDD of the type shown in FIG. 38B combined with a three-port circulator 74. The incoming signal enters the circulator 74 through the entrance port 75, propagates through the circulator 74 and is directed into a first MRDD unit 44. From that unit, the signal is coupled into an intermediate fiber 24. From fiber 24 the signal is coupled into a second MRDD unit 54. The DS of unit 54 has a reflective coating applied to its back surface 64 so that the signal is reflected, coupled into fiber 24, and propagates a second time through the first MRDD stage 44. Thereafter, the signal is coupled back into the circulator 74 and exits the circulator via the output port 34.

Figure 2:
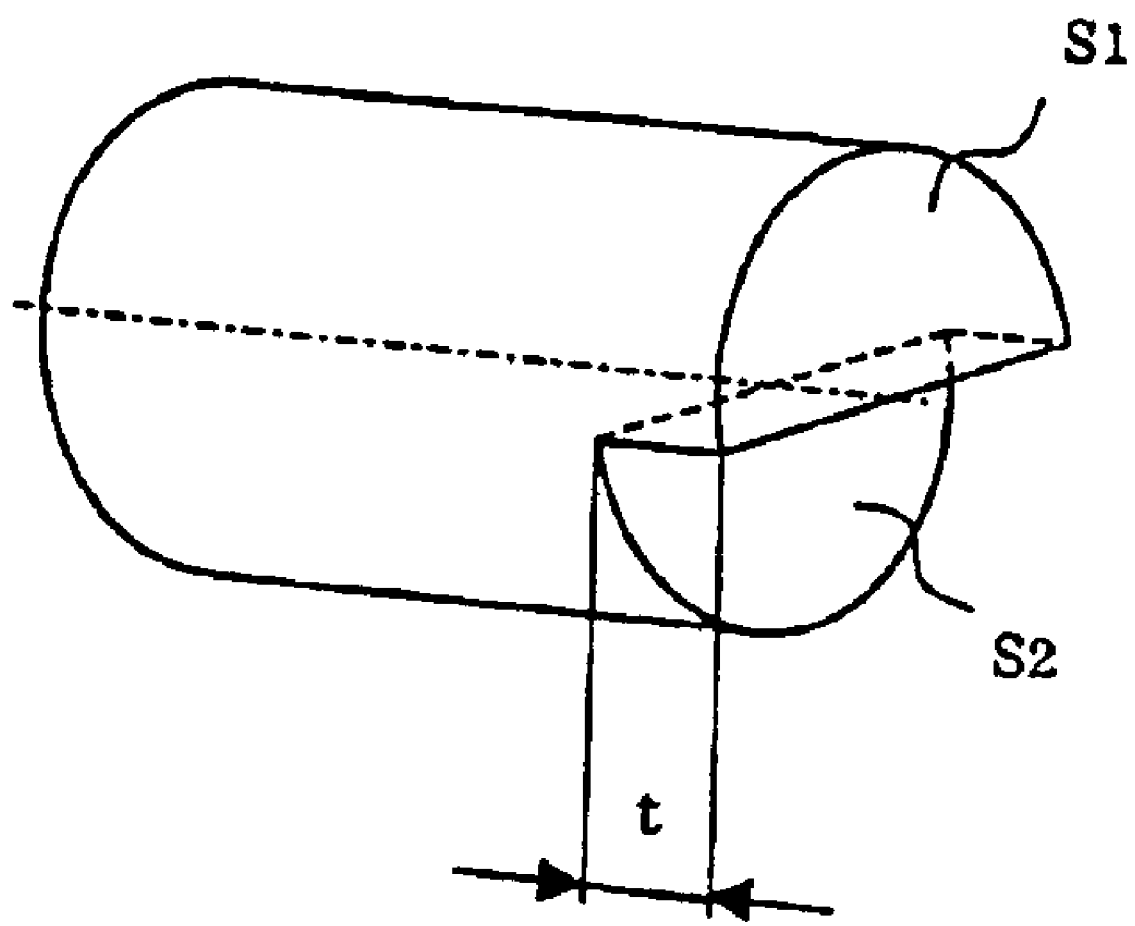
FIG. 2 illustrates a diffractive structure according to the present invention based on two semicircular sectors.

FIG. 40A presents relative transmissive characteristics for a frequency grid of 50 GHz when two MRDDs working in transmission with DSs made from fused silica and having the configuration of FIG. 2 are arranged in series (see FIG. 38A). Curve 1 is for MRDDs employing offsets (t's) of 2.05466 mm and 2.07547 mm. Curve 2 is for MRDDs with DSs employing offsets of 2.05509 mm and 2.07547 mm. Curve 3 is for MRDDs with DSs employing offsets of 2.05466 mm and 2.07574 mm. Curve 4 is for MRDDs with DSs employing offsets of 2.05509 mm and 2.07574 mm. FIG. 40B presents the above curves when transmission is defined in dB.

Sub-System Implementation

Using MRDDs of the type described above as building blocks, several important components for optical communications can be implemented, as shown below.

1. Add-Drop Configurations.

FIG. 41 shows add/drop configurations with a MRDD employed as a key component.

Figure 41A:
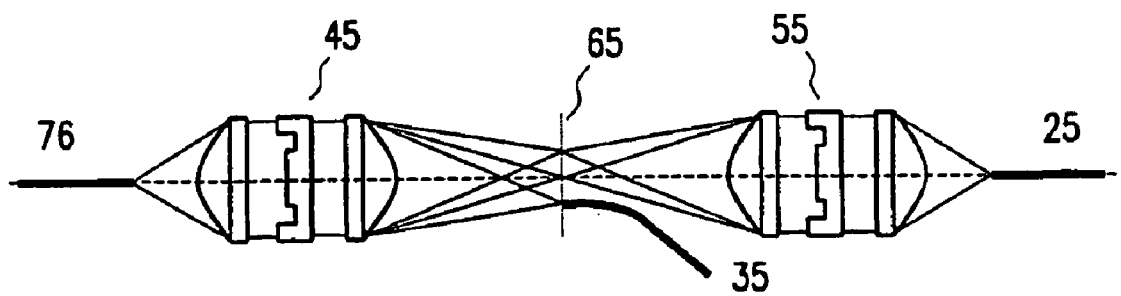

The device of FIG. 41A consists of two MRDD units 45 and 55 that share the focal plane denoted as 65. For that configuration, numeral 76 represents the input fiber, numeral 25 is the output fiber, and numeral 35 represents a drop channel. The light enters the system via the input fiber 76, propagates through the first MRDD unit 45 and is spatially distributed in the focal plane 65 of the MRDD focusing lens. The light is spatially processed in the focal plane 65.

Spatial processing of the light can include spatial filtering and/or spatial redirection of incoming light. Spatial redirection can be accomplished by reflection (using a single mirror or a micro-mirror array), diffraction (using a transmissive or a reflective diffractive structure) or refraction (using a prism or a micro-prism array).

In the device shown in FIG. 41A, the spatial filtering is accomplished by placing a waveguide 35 in the focal plane 65. The transverse dimensions of the waveguide 35 act as a spatial filter. The portion of the light that propagates through the waveguide 35 is dropped from the system. The lateral position of the waveguide relative to the optical axis of the system can be adjusted. This would affect the spectral distribution and amount of light in the drop channel. Although only one waveguide is shown on FIG. 41A, several waveguides can be placed in the focal plane 65 to drop more than one portion of the signal. The rest of the incoming signal that was not coupled into the drop channel (waveguide 35), propagates through the second MRDD stage 55 and is coupled into the output channel 25.

Figure 41B:
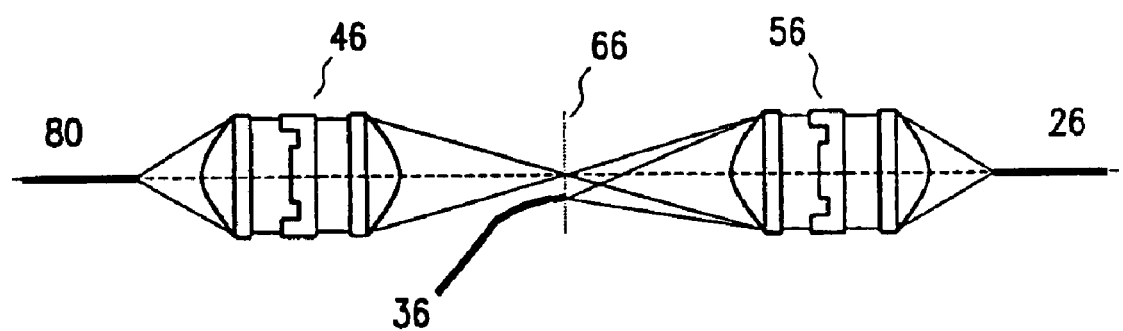

A waveguide can also be inserted at the focal plane 66 to add signal to the output of the system, as shown in FIG. 41B. In this case the added signal coming from waveguide 36 propagates through second MRDD stage 56 and is coupled into the output fiber 26 together with the incoming signal which is provided on input fiber 80 and has passed through first MRDD stage 46.

Figure 41C:
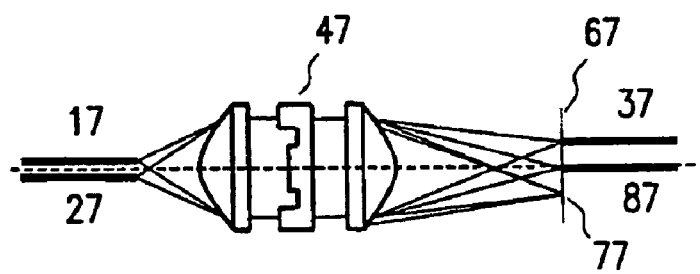

A more compact add/drop configuration that employs a single MRDD module 47 is illustrated in FIG. 41C. A mirror 77 with an opening is located at the focal plane location 67. The mirror 77 functions as a spatial filter. The lateral position of the opening can be adjusted. More than one opening can be employed in the mirror. Instead of a mirror with an opening, a single fiber with a reflective surface applied to the cladding can be employed. The fiber can be laterally translated in the focal plane between the axial position 87 and the marginally offset axis position 37.

As shown in FIG. 41C, an incoming signal enters the device through input fiber 17 and propagates through an MRDD 47 to the focal plane 67. A reflective surface 77 with two openings is placed at the focal plane 67. Two fibers 37 and 87 are located behind the respective openings and are used as the drop channels. Any number of openings and respective fibers for signal collection can be employed with the reflective surface 77. The amount and spectral content of the dropped light is based on the lateral position of the respective openings relative to the optical axis of the system. The rest of the incoming signal is reflected back into MRDD 47 and is coupled into the output channel 27. Fibers 17 and 27 are symmetrically offset from the optical axis of the device. The mirror 77 may optionally contain more than 2 openings for different spectral coupling of the input signal into a plurality of drop channels.

Figure 41D:
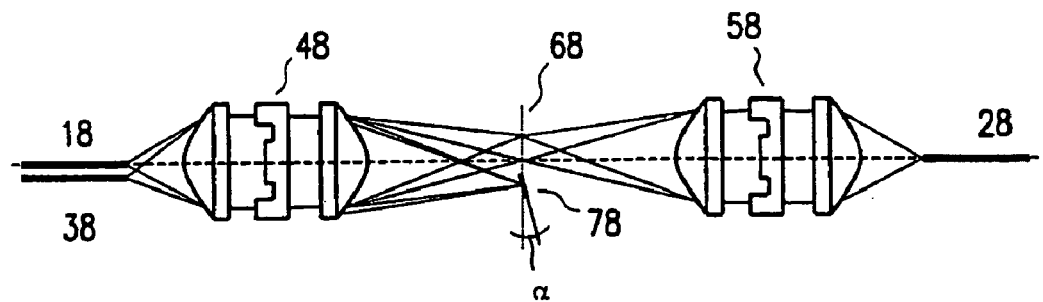

The device of FIG. 41D presents another add/drop configuration. It consists of two MRDD units 48 and 58 that share the focal plane denoted as 68. A micromirror 78 is inserted at an angle $\alpha$ to redirect the light from the input fiber 18 to the drop fiber 38. Numeral 28 denotes the output channel. Spatial filtering and redirection of the incoming light according to FIG. 41D is performed by the micromirror 78. The size and lateral position of the micro-mirror 78 relative to the optical axis of the system define the amount and spectral content of the dropped signal.

By making the micromirror angle $\alpha$ adjustable, the device can be also be used as an add-drop switch. The signal can be dropped or added to any fiber of a fiber array 39, as shown schematically in FIG. 42A. The incoming signal propagates through the input channel 19 and the first MRDD unit 49 and is spatially redistributed in the focal plane 69 of the first MRDD unit 49. The micro-mirror 79 with adjustable angle of rotation is positioned at the focal plane 69. The axis of rotation of the micro-mirror 79 is perpendicular to the optical axis of the system. For the system shown in FIG. 42A the rotation axis is perpendicular to the plane of the figure. The size and lateral position of the micro-mirror 79 relative to the optical axis of the system define the amount and spectral content of the dropped signal. By changing the angular orientation of the micro-mirror 79, a portion of the incoming light is coupled to one of the drop fiber channels from the drop fiber array 39. The rest of the incoming signal propagates through the second MRDD unit 59 and is coupled into the output fiber 29.

Figure 42A:
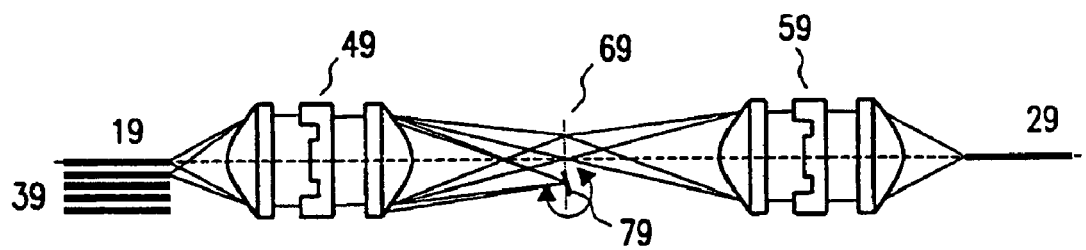
Figure 42B:
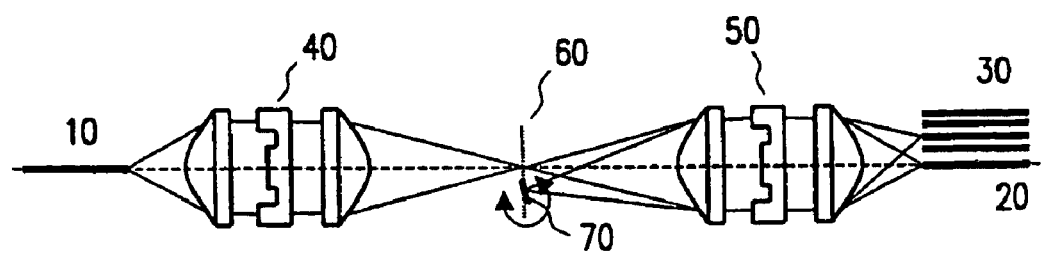

Similar schematics can be used for a reconfigurable add configuration, as shown in FIG. 42B. In this case the incoming signal is coupled through the input fiber 10 into the first MRDD unit 40, propagates through the focal plane 60, through the second MRDD unit 50 and is coupled into the output fiber 20. A micro-mirror 70 with adjustable angle of rotation is positioned at the focal plane 60. The axis of rotation of the micro-mirror 70 is perpendicular to the plane of the figure. The size and lateral position of the micro-mirror 70 relative to the optical axis of the system define the amount and spectral content of the added signal. The add signal is coupled from one of the fibers of the add fiber array 30 into the second MRDD unit 50, propagates through MRDD unit 50 and is redistributed in the focal plane 60. A portion of the incoming add signal is reflected by the micro-mirror 70 back into the MRDD unit 50, propagates through MRDD unit 50 and is added to the incoming signal by being coupled into the output fiber 20. By changing the angular orientation of the micro-mirror 70, signals from different fibers from the add fiber array 30 are routed into the output fiber 20 and added to the incoming signal.

Instead of a single mirror 78, 79 or 70 (FIGS. 41D, 42A and 42B), more than one micro-mirror can be used to redistribute the incoming light between more than one drop or add channel.

Figure 42C:
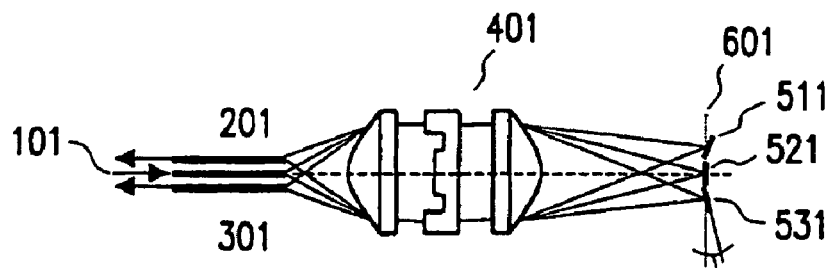

A micro-mirror array can be positioned in the focal plane of a MRDD unit as shown in FIG. 42C to redistribute the incoming light between more than one drop channel. The incoming signal propagates through the input fiber 101, is coupled into MRDD unit 401 and is redistributed in the focal plane 601. A micro-mirror array consisting of individual micro-mirrors 511 through 531 is placed at the focal plane 601. The angular orientation α of the individual micro-mirrors is adjustable. The incoming signal is reflected by the micro-mirror array, propagates through the MRDD unit 401 and is redistributed between the output fibers 201 and 301. Optionally, a portion of the incoming signal can be reflected back and coupled into the input fiber 101. Any number of output fibers as well as mirrors in the micro-mirror array can be used.

Figure 42D:
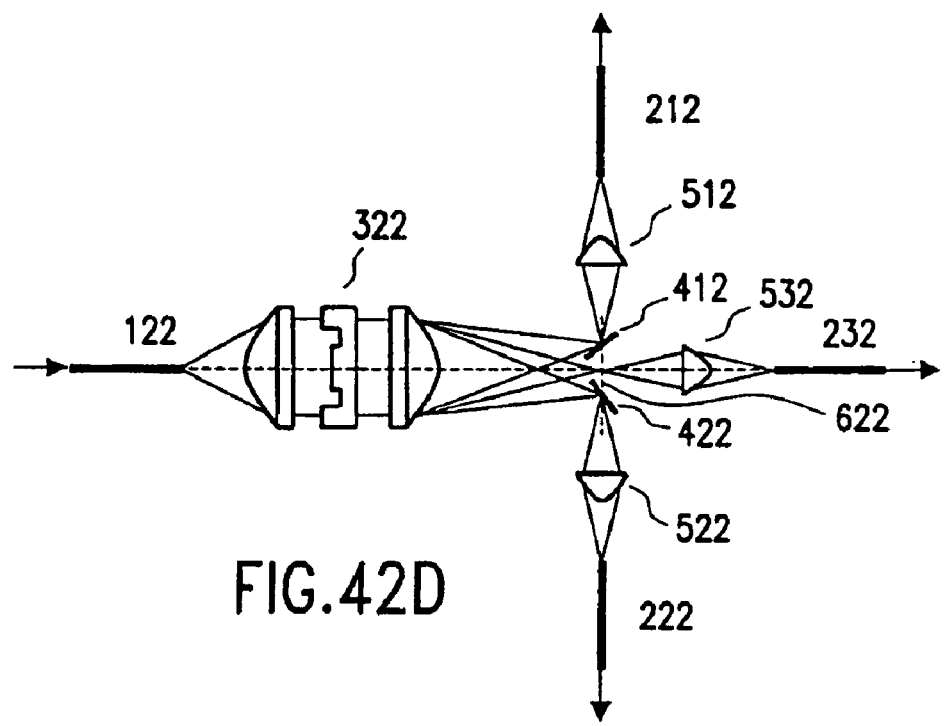

FIG. 42D shows the case where individual micro-lenses are employed to couple the redistributed input signal into the output fibers 212, 222, and 232. The input signal propagates through the input fiber 122, is coupled into the MRDD unit 322, propagates through MRDD unit 322 and is spatially redistributed in the focal plane 622. A portion of the signal propagates through the micro-lens 532 and is coupled into the output fiber 232. Other portions of the input signal are reflected by the micro-mirrors 412 and 422, propagate through the respective micro-lenses 512 and 522 and are coupled into the respective output fibers 212 and 222. Any number of micro-mirrors with respective coupling micro-lenses and output fibers can be used to redistribute the input signal.

Optical principles other than reflection can be used for spatial redirection of the input signal in the focal plane of the MRDD. Both refraction and diffraction can be used. Micro-prisms and micro-prism arrays can be placed at the focal plane of the MRDD unit to spatially redirect portions of the input signal.

Figure 42E:
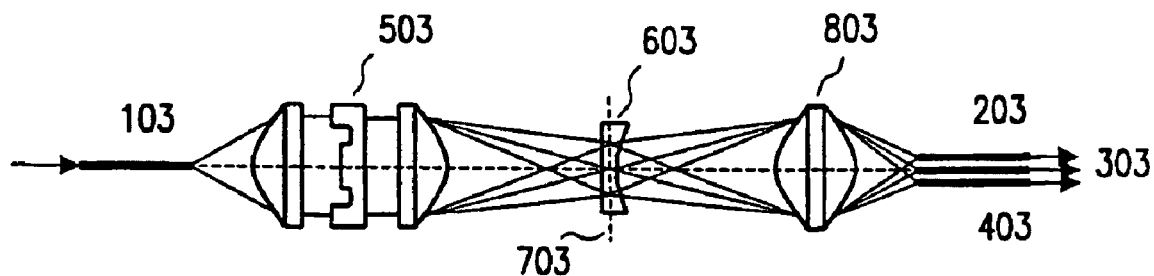

FIG. 42E presents the case where a micro-prism array 703 is placed at the focal plane 603 of MRDD unit 503. The input signal propagates through the input fiber 103 and the MRDD unit 503 and is spatially redistributed in the focal plane 603 of MRDD 503. A micro-prism array 703 is placed at the focal plane 603. Individual portions of the input signal are refracted by individual micro-prisms at different angles, propagate through the coupling lens 803 and are coupled into the output fiber array that schematically consists of fibers 203 through 403. Diffractive arrays, either transmissive or reflective can also be used in place of the refractive micro-prism array 703. Diffractive liquid crystal arrays are good cost-effective devices for this purpose.

More than one input fiber can be used in the above configurations (FIGS. 41 through 42) to achieve simultaneous spatial redistribution of more than one incoming signal.

2. Spectrally Selective Switches.

FIG. 43 shows how a MRDD can be employed as a key component in spectrally selective switches.

FIG. 43A shows a 1 by 2 switch consisting of an input fiber 104, a MRDD module 404 and output fibers 204 and 304. A mirror 504 with an opening is located at the focal plane of the MRDD focusing lens. Alternatively, fiber 304 is located in the focal plane of the MRDD and has a reflective surface applied to its cladding. The core of the fiber is left uncoated. Based on the OPD introduced by the MRDD, the incoming signal can be switched between the output channels 204 and 304. Fibers 104 and 204 are symmetrically displaced from the MRDD axis. Alternatively, mirror 504 may have more than one opening with a fiber positioned behind each opening. Alternatively, more than one fiber with reflectively coated claddings and uncoated cores may be employed. Alternatively, different reflective, refractive or diffractive arrangements can be used for wavelength selective switching, as illustrated above in FIGS. 41 and 42.

FIG. 43B shows two views of a 1 by 2 switch consisting of a input fiber 105 (labeled 106 in the bottom view), a MRDD module 405 (labeled 406 in the bottom view), and output fibers 205 and 305 (labeled 206 and 306 in the bottom view). The diffractive structure of the MRDD is used in a double pass configuration by employing a mirror 505 (labeled 506 in the bottom view) as one surface of the diffractive structure. The incoming signal from the input fiber 105 is collimated by the MRDD lens, passes twice through the diffractive structure and is coupled back into the output fibers 205 or 305 via a waveguide structure 605 shown as being composed of waveguide structures 606 and 706 in the bottom view of FIG. 43B. Depending on the OPD introduced by the MRDD to the incoming signal, it can be switched between the output channels 205 and 305 by selectively coupling into waveguide structures 706 or 606. As shown in the top view of FIG. 43B, the input fiber 105 and the waveguide structure 605 are symmetrically displaced from the MRDD axis. The waveguide 706 couples the signal to the output fiber 206, whereas the waveguide 606, shown as having a V-shape, couples the signal to the output fiber 306.

FIG. 43C shows a 1 by 2 switch consisting of an input fiber 107, a circulator 607, a MRDD module 407 and output fibers 207 and 307. The incoming signal from the input fiber 107 is directed via the circulator to the MRDD module and is collimated by the MRDD lens. Depending on the OPD introduced by the MRDD to the incoming signal, it can be switched between the output channels 207 and 307. The signal can be coupled into the core of the output fiber 207 or reflected back from, for example, a mirror surface on the cladding of the fiber 207. The reflected signal passes through the MRDD module and circulator and is then coupled into output fiber 307. Alternatively, a reflective surface with an opening followed by a fiber can be employed at the focal plane 507 of MRDD unit 407. Alternatively, mirror 507 may have more than one opening with a fiber positioned behind each opening. Alternatively, more than one fiber with reflectively coated claddings and uncoated cores may be employed. Alternatively, different reflective, refractive or diffractive arrangements can be used for wavelength selective switching, as illustrated above in relation to FIGS. 41 and 42.

For the switches of FIG. 43, the OPD of the MRDD can be adjusted to achieve switching by applying pressure, an electric or magnetic field, a temperature change, etc. to the diffractive structure. Optionally, micro-mechanical means can be provided to affect the OPD by changing the angular orientation of the diffractive structure.

3. Spectrally Selective 1 by N Optical Switch/Attenuator.

FIG. 44 shows a MRDD employed as a key component in a spectrally selective 1 by N switch. It consists of an input fiber 108, a reflective MRDD module 208 employing a collimator 308 and a reflective diffractive structure 408 with reflective surface 508 and an output fiber array 608 employing N fibers. Means 708, e.g., a MEMS device or another micro-motor, is provided for changing the angular orientation of the diffractive structure 408 so that the input signals are spectrally filtered and redirected to any fiber from the output fiber array 608. Optionally means 808, e.g., means for applying pressure, an electric field, a temperature change, etc., are provided for adjusting the spectral transmission of the MRDD. In addition to switching, the device of FIG. 44 can be used to attenuate the output signal in accordance with system requirements.

4. Spectrally Selective N by N Switch/Signal Equalizer.

More than one input fiber can be employed with devices according to the present invention. FIG. 45 shows a MRDD employed as a key component in a spectrally selective N by N switch. It consists of an input fiber array 109, a reflective MRDD 209 and an output fiber array 309. The MRDD 309 employs a diffractive structure 409 with a reflective surface 509. It also employs means 609 for altering the spectral transmission characteristics of the MRDD. As mentioned above, means 609 can apply pressure, an electric field, a magnetic field, a temperature change or the like to the DS. Any combinations of the above procedures can be applied simultaneously. The device of FIG. 45 can be also used for signal equalization.

5. Spectrally Selective 1 by N Switch/Coupler/Equalizer.

FIG. 46 shows a 1 by N spectrally selective switch/coupler/equalizer. The device consists of an input fiber $1_{in}$, a circulator $C_1$ with N+1 ports, N MRDD modules $M_1$ through $M_N$ and output fibers $1_o$ through $N_o$ that have reflective coatings applied to their claddings. Each MRDD module employs means (see above) for altering spectral transmission characteristics for switching and/or signal equalization. The input signal is switched, coupled and equalized between the N output fibers.

6. C mb Filter for ASE Suppression and Signal Equalization in Erbium-Doped Fiber Amplifiers.

FIG. 47 shows a device that employs a MRDD to suppress Amplified Spontaneous Emission (ASE) in an Erbium-Doped Fiber Amplifier (EDFA) and at the same time selectively transmits and amplifies the input signals. The device consists of an input fiber 1111, a three port circulator 2111, an EDFA 3111, a MRDD module 4111 and an output fiber 5111. The input signals enter the device through the input fiber 1111 and are directed to the EDFA through the circulator 2111. The incoming signals are amplified by propagating through the EDFA and enter the MRDD module 4111. The DS 6111 has a mirror surface 7111 that is 100% reflective at the working wavelengths. The signal is reflected back and coupled into the EDFA 3111. It is amplified a second time by propagating through the EDFA 3111 in the opposite direction and is directed to the output fiber 5111 through the circulator 2111. The MRDD 4111 acts as an efficient comb filter, as described above. The ASE outside of the filter bands is not coupled into the EDFA and is effectively rejected from the output. Because the EDFA gain is spectrally dependent, the DS of the MRDD module can also be used to provide signal equalization, in addition to ASE filtering, as also described above.

The mirror surface 7111 of diffractive structure 6111 can be made as a dichroic coating. In this case the coating is 100% reflective at the working wavelengths and is transparent to the EDFA pump radiation. The pump radiation enters the MRDD module through the fiber 8111 and is coupled into the EDFA 3111 through the MRDD module 4111. The device can optionally employ a monitoring fiber 9111 with monitoring means 1011 to assure efficient signal coupling/equalization.

7. Wavelength Selective Coupler, Filter and Equalizer with Performance Monitoring Means.

FIG. 48 shows a device that employs a MRDD to couple several sources to an output fiber with spectral filtration of the source radiation. It consists of four transmitters $T_{X1}$ through $T_{X4}$, a 1 by 4 coupler 1112, a MRDD module 2112, an optional amplification module 3112 and an output fiber 4112. The output signals from the four transmitters $T_{X1}$ through $T_{X4}$ are coupled via a coupler 1112 to the MRDD module 2112 where they are filtered and equalized. The signals are further coupled into an amplifier 3112 and propagate to the output of the system via fiber 4112. A monitoring fiber 5112 is placed at the focal plane of the MRDD focusing lens to monitor the output signals $\lambda_1$ through $\lambda_4$.

The number of transmitters used is not limited to four, but can be any number in accordance with the system specifications.

8. Spectral Slicing of Broadband Sources.

FIG. 49A shows a device that employs a MRDD to perform spectral slicing of broadband sources. The device consists of four transmitters $T_{X1}$ through $T_{X4}$ with relatively broad spectral emission characteristics, an array 110 of four input fibers, an MRDD module 210, an array 510 of four output fibers and a 1 by 4 coupler 610. The MRDD module 210 is of the reflective type with a diffractive structure that employs a reflective surface 310. The MRDD module 210 also employs means 410 (see above) to adjust the output grid of signals $\lambda_1$ through $\lambda_4$ in accordance with the system specifications. The output grid of signals $\lambda_1$ through $\lambda_4$ propagates through the coupler 610 to the output fiber 710. FIG. 49B shows schematically the output spectrum from the four transmitters $T_{X1}$ through $T_{X4}$ having relatively broad spectral emitting characteristics (the dashed line). It also shows four positions of the output signals $\lambda_1$ through $\lambda_4$ at the exit fiber 710 after passage through the system.

The number of transmitters used is not limited to four, but can be any number in accordance with system specifications. Accordingly, the number of the output spectral bands is not limited to four, but can be any number in accordance with system specifications.

9. Laser Coupling with Active Wavelength Control.

FIG. 50 shows a device that employs a MRDD to couple the light from a Laser Diode (LD) to the output of a system and to actively tune the output spectrum. The device consists of a LD 61, a MRDD module 81, an output fiber 312, a monitoring fiber 84, a spectrum analyzer 611, a controller 711 and means 811 for tuning the transmittance of MRDD module 81. The means 811 can be used to change the output of the MRDD module by applying pressure, an electric or magnetic field, a temperature change, etc. to the diffractive structure. Optionally, micro-mechanical means can be provided to affect the output of the MRDD module by changing the angular orientation of the diffractive structure. MEMS-type devices or other micro-motors are well suited for this purpose.

The output from the LD 61 propagates through the MRDD unit 81 and is redistributed in the focal plane 85. A portion of the LD output that corresponds to the working wavelength $\lambda$hd outis coupled into the output fiber 312 and is directed to the output of the system. A portion of the output of the LD 61 is coupled into the monitoring fiber 84 and directed into the optical spectrum analyzer 611. One of the wavelengths $\lambda$ in the vicinity of the working wavelength $\lambda_{out}$ can be used for monitoring purposes. In this case the system output at the working wavelength can be maximized.

Alternatively, a fraction of the working wavelength $\lambda_{out}$ can be directed into the monitoring fiber 84. In this case the system output is lower compared to the above case when the wavelength $\lambda$ that is used for monitoring purposes is different from the working wavelength $\lambda_{out}$. The advantage of this case is direct monitoring capability at the working wavelength $\lambda_{out}$.

In either cases the output from the analyzer 611 is directed into controller 711. The controller 711 affects the means 811 for tuning the spectral transmittance of MRDD module 81 thus providing an active wavelength control at the system output.

Although specific embodiments of the invention have been described and illustrated, it is to be understood that modifications can be made without departing from the invention's spirit and scope. For example, the devices of the invention can be athermalized using standard athermalization techniques known in the art. Similarly, to provide high coupling efficiencies, the f/# and other optical properties, e.g., aberrations, of the lens portions of the system can be optimized to match the numerical aperture(s) of the fibers with which the devices are used.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

TABLE 1

| Wavelength ($\mu$m) | 1.5066 | 1.5208 | 1.5353 | 1.5500 | 1.5650 | 1.5803 | 1.5959 |
|---|---|---|---|---|---|---|---|
| OPD in Waves | 103 | 102 | 101 | 100 | 99 | 98 | 97 |
| Strehl ratio | 0.9986 | 0.9993 | 0.9997 | 1.0000 | 0.9999 | 0.9993 | 0.9982 |

TABLE 2

| Wavelength ($\mu$m) | 1.5137 | 1.5280 | 1.5426 | 1.5575 | 1.5726 | 1.5881 |
|---|---|---|---|---|---|---|
| OPD in Waves | 102.5 | 101.5 | 100.5 | 99.5 | 98.5 | 97.5 |

TABLE 3

| Wavelength, ($\mu$m) | 1.5500 | 1.5552 | 1.5567 | 1.5575 | 1.5582 | 1.5597 | 1.5650 |
|---|---|---|---|---|---|---|---|
| OPD in Waves | 100.00 | 99.65 | 99.55 | 99.50 | 99.45 | 99.35 | 99.00 |

TABLE 4

| OPD in Waves | 100.00 | 99.75 | 99.60 | 99.50 | 99.40 | 99.25 | 99.00 |
|---|---|---|---|---|---|---|---|
| Number of Beams | 1 | 2 | 2 | 2 | 2 | 2 | 1 |
| Intensity Ratio | N/A | 1:5 | 1:2 | 1:1 | 2:1 | 5:1 | N/A |

TABLE 5

| Wavelength, $\mu$m | 0 Degrees Rotation | 90 Degrees Rotation | 180 Degrees Rotation | 270 Degrees Rotation |
|---|---|---|---|---|
| 1.5500 | 1 Beam | 1 Beam | 1 Beam | 1 Beam |
| 1.5537 | 1 Beam | 3 Beams | 2 Beams | 3 Beams |
| 1.5575 | 1 Beam | 3 Beams | 2 Equal Beams | 3 Beams |
| 1.5612 | 1 Beam | 4 Beams | 2 Beams | 4 Beams |
| 1.5650 | 1 Beam | 4 Equal Beams | 1 Beam | 4 Equal Beams |
| 1.5688 | 1 Beam | 4 Beams | 2 Beams | 4 Beams |
| 1.5726 | 1 Beam | 3 Beams | 2 Equal Beams | 3 Beams |
| 1.5765 | 1 Beam | 3 Beams | 2 Beams | 3 Beams |
| 1.5803 | 1 Beam | 1 Beam | 1 Beam | 1 Beam |

TABLE 6

| Wavelength, $\mu$m | 0 Degrees Rotation | 90 Degrees Rotation | 180 Degrees Rotation | 270 Degrees Rotation |
|---|---|---|---|---|
| 1.5500 | 1 Beam | 3 Beams | 2 Equal Beams | 3 Beams |
| 1.5575 | 1 Beam | 4 Equal Beams | 1 Beam | 4 Equal Beams |

TABLE 6-continued

| Wavelength, μm | 0 Degrees Rotation | 90 Degrees Rotation | 180 Degrees Rotation | 270 Degrees Rotation |
|---|---|---|---|---|
| 1.5650 | 1 Beam | 3 Beams | 2 Equal Beams | 3 Beams |
| 1.5726 | 1 Beam | 1 Beam | 1 Beam | 1 Beam |
| 1.5803 | 1 Beam | 3 Beams | 2 Equal Beams | 3 Beams |

TABLE 7

| | Q2-Q1 | Q3-Q1 | Q4-Q1 | Comments |
|---|---|---|---|---|
| Configuration 1 | 1 $OPD_{min}$ | 2 $OPD_{min}$ | 3 $OPD_{min}$ | Shown in FIG. 3A |
| Configuration 2 | 1 $OPD_{min}$ | 3 $OPD_{min}$ | 2 $OPD_{min}$ | Shown in FIG. 3B |
| Configuration 3 | 2 $OPD_{min}$ | 1 $OPD_{min}$ | 3 $OPD_{min}$ | Shown in FIG. 3C |
| Configuration 4 | 3 $OPD_{min}$ | 2 $OPD_{min}$ | 1 $OPD_{min}$ | Performs identical to Configuration 1 |
| Configuration 5 | 2 $OPD_{min}$ | 3 $OPD_{min}$ | 1 $OPD_{min}$ | Performs identical to Configuration 2 |
| Configuration 6 | 3 $OPD_{min}$ | 1 $OPD_{min}$ | 2 $OPD_{min}$ | Performs identical to Configuration 3 |

TABLE 8

| Wavelength, μm | 1.5456 | 1.5470 | 1.5485 | 1.5500 | 1.5515 | 1.5530 | 1.5545 |
|---|---|---|---|---|---|---|---|
| $OPD_{min}$ in Waves | 1003 | 1002 | 1001 | 1000 | 999 | 998 | 997 |

TABLE 9

| Wavelength, μm | 1.5463 | 1.5478 | 1.5493 | 1.5507 | 1.5522 | 1.5537 |
|---|---|---|---|---|---|---|
| $OPD_{min}$ in Waves | 1002.5 | 1001.5 | 1000.5 | 999.5 | 998.5 | 997.5 |

TABLE 10

| Wavelength, μm | 1.54933 | 1.54941 | 1.54948 | 1.54955 | 1.54963 |
|---|---|---|---|---|---|
| $OPD_{min}$ in Waves | 1000.45 | 1000.40 | 1000.35 | 1000.30 | 1000.25 |
| Wavelength, μm | 1.54971 | 1.54978 | 1.54985 | 1.54993 | |
| $OPD_{min}$ in Waves | 1000.20 | 1000.15 | 1000.10 | 1000.05 | |

TABLE 11

| Wavelength, μm | Configuration 1 | Configuration 2 | Configuration 3 |
|---|---|---|---|
| 1.54926 | 4 equal beams | 2 equal beams | 2 equal beams |
| 1.54933 | 4 beams | 4 beams | 2 beams |
| 1.54941 | 4 beams | 4 beams | 2 beams |
| 1.54948 | 4 beams | 4 beams | 2 beams |
| 1.54955 | 2 beams | 4 beams | 4 beams |
| 1.54963 | 4 beams | 4 beams | 4 beams |
| 1.54971 | 2 beams | 4 beams | 4 beams |
| 1.54978 | 2 beams | 3 beams | 5 beams |
| 1.54985 | 2 beams | 3 beams | 1 beam |
| 1.54993 | 2 beams | 2 beams | 1 beam |
| 1.55000 | 1 beam | 1 beam | 1 beam |

TABLE 12

| $OPD_{min}$ | Configuration 1 | Configuration 2 | Configuration 3 |
|---|---|---|---|
| 1000.50 | 4 equal beams | 2 equal beams | 2 equal beams |
| 1000.45 | 4 beams | 4 beams | 2 beams |
| 1000.40 | 4 beams | 4 beams | 2 beams |
| 1000.35 | 4 beams | 4 beams | 2 beams |
| 1000.30 | 2 beams | 4 beams | 4 beams |
| 1000.25 | 4 beams | 4 beams | 4 beams |
| 1000.20 | 2 beams | 4 beams | 4 beams |
| 1000.15 | 2 beams | 3 beams | 5 beams |
| 1000.10 | 2 beams | 3 beams | 1 beam |
| 1000.05 | 2 beams | 2 beams | 1 beam |
| 1000.00 | 1 beam | 1 beam | 1 beam |

What is claimed is:

1. A method for optically processing light from at least one input fiber comprising in order:
   (a) collimating the light;
   (b) propagating the light through a non-grating diffractive structure;
   (c) further propagating the light through a focusing optical system;
   (d) spatially processing the light in the focal plane of the focusing optical system; and
   (e) coupling at least some of the light into at least one output fiber.

2. The method of claim 1 wherein the focusing optical system is an achromatic optical system.

3. The method of claim 2 wherein the focusing optical system is a single lens element.

4. The method of claim 1 wherein there is more than one input fiber.

5. The method of claim 1 wherein there is more than one output fiber.

6. The method of claim 1 wherein the spatial processing comprises spatial filtering.

7. The method of claim 1 wherein the spatial processing comprises light redirection.

8. The method of claim 7 wherein the light redirection comprises light reflection.

9. The method of claim 7 wherein the light redirection comprises light refraction.

10. The method of claim 7 wherein the light redirection comprises light diffraction.

11. An optical processing method comprising:
   (a) providing at least one incoming light beam;
   (b) passing the at least one incoming light beam through a non-grating diffractive structure to produce a light distribution in a Fraunhofer diffraction region;
   (c) spatially processing the light distribution in the Fraunhofer diffraction region; and
   (d) collecting at least some of the light of the spatially processed light distribution to form at least one outgoing light signal.

12. The method of claim 11 wherein the at least one incoming light beam comprises signals at a plurality of wavelengths.

13. The method of claim 11 wherein there is more than one incoming light beam.

14. The method of claim 11 wherein there is more than one outgoing light signal.

15. The method of claim 11 wherein the at least one incoming light beam comprises a plurality of spectral components and a substantial portion of the light of at least one spectral component is distributed between two outgoing light signals.

16. The method of claim 11 wherein the at least one incoming light beam comprises at least two different spectral components and a substantial portion of the light for said at least two different spectral components is distributed between at least two outgoing light signals.

17. The method of claim 16 wherein at least one outgoing light signal comprises substantially a single spectral component.

18. The method of claim 11 wherein the spatial processing comprises spatial filtering.

19. The method of claim 11 wherein the spatial processing comprises light redirection.

20. The method of claim 19 wherein the light redirection comprises light reflection.

21. The method of claim 19 wherein the light redirection comprises light refraction.

22. The method of claim 19 wherein the light redirection comprises light diffraction.

23. A method for spatial redistribution of an optical signal comprising:
(a) propagating the optical signal through a non-grating diffractive structure to form one or more diffracted portions of the signal; and
(b) coupling at least one of said one or more diffracted portions of the signal into an output channel;
wherein a Fraunhofer diffraction region is associated with said non-grating diffractive structure and the optical signal is processed in said region.

24. The method of claim 23 wherein at least two diffracted portions of the signal are formed in step (a).

25. The method of claim 23 wherein a non-diffracted portion of the signal is formed in step (a).

26. The method of claim 25 further comprising coupling the non-diffracted portion of the signal into an output channel.

27. The method of claim 23 in which said step of propagating through a non-grating diffractive structure comprises collimating the optical signal.

28. The method of claim 23 wherein diffracted portion of the signal is spatially filtered in said Fraunhofer diffraction region.

29. The method of claim 28 wherein the spatial filtering is performed using a spatial filter that comprises a reflective surface with at least one opening.

30. The method of claim 23 wherein a diffracted portion of the signal is deflected in said Fraunhofer diffraction region.

31. The method of claim 30 wherein the deflection is performed using a mirror.

32. The method of claim 30 wherein the deflection is performed using a micromirror array.

33. The method of claim 30 wherein the deflection is performed using a liquid crystal diffractive array.

34. The method of claim 30 wherein the deflection is performed using a refractive microprism.

35. The method of claim 30 wherein the deflection is performed using a refractive microprism array.

36. The method of claim 23 wherein the signal is passed through an optical system so that the Fraunhofer diffraction region is located in the focal plane of the optical system.

37. The method of claim 36 wherein the optical system is an achromatic optical system.

38. The method of claim 37 wherein the optical system is a single lens element.

39. The method of claim 23 wherein the optical signal comprises multiple wavelengths.

40. The method of claim 23 wherein said one or more diffracted portions of the signal comprise a first portion having a first wavelength range and a second portion having a second wavelength range, and the first and second portions are spatially separated in the Fraunhofer diffraction region.

41. The method of claim 40 wherein each of the first and second wavelength ranges comprises essentially a single wavelength.

42. A diffractive device which has an optical axis and comprises:
(a) at least one input optical fiber for providing incoming light;
(b) at least one optical system for collimating the incoming light;
(c) a non-grating diffractive structure for producing wavefront-divided light from the collimated incoming light, said non-grating diffractive structure having a Fraunhofer diffraction region associated therewith and said wavefront-divided light comprising one or more portions that are offset from said optical axis;
(d) means for modifying at least one offset portion of the wavefront-divided light to produce at least one modified offset portion, said means being located in said Fraunhofer diffraction region; and
(e) one or more output optical fibers for outputting at least one modified offset portion of the wavefront-divided light.

43. The diffractive device according to claim 42 in which the wavefront-divided light comprises at least two portions that are offset from said optical axis.

44. The diffractive device according to claim 42 in which the wavefront-divided light comprises an on-axis portion which is not offset from the optical axis.

45. The diffractive device according to claim 44 in which the on-axis portion is outputted to an output optical fiber.

46. The diffractive device of claim 42 comprising at least two input optical fibers.

47. The diffractive device of claim 42 comprising at least two output optical fibers.

48. The diffractive device of claim 42 where the at least one optical system for collimating is achromatic.

49. The diffractive device of claim 48 wherein the at least one optical system for collimating is a single lens element.

50. The diffractive device of claim 42 where the non-grating diffractive structure comprises at least two sub-elements whose sizes, depths, shapes, and/or indices of refraction determine the location and amount of flux of the one or more offset portions of the wavefront-divided light in the Fraunhofer diffraction region.

51. The diffractive device of claim 50 wherein the shape of at least one sub-element is adjustable.

52. The diffractive device of claim 50 wherein the size of at least one sub-element is adjustable.

53. The diffractive device of claim 50 wherein the depth of at least one sub-element is adjustable.

54. The diffractive device of claim 50 wherein the index of refraction of at least one sub-element is adjustable.

55. The diffractive device of claim 42 wherein the non-grating diffractive structure is rotatable about an axis of rotation and the angle of rotation of the structure determines the location and amount of flux of the one or more offset portions of the wavefront-divided light in the Fraunhofer diffraction region.

56. The diffractive device of claim 55 wherein the axis of rotation corresponds to the optical axis.

57. The diffractive device of claim 55 wherein the axis of rotation is transverse to the optical axis.

58. The diffractive device of claim 42 wherein the non-grating diffractive structure comprises at least two non-grating diffractive sub-structures arranged in series along the optical axis.

59. The diffractive device of claim 58 wherein the non-grating diffractive sub-structures are identical.

60. The diffractive device of claim 58 wherein the relative orientation of the non-grating diffractive substructures is adjustable.

61. An optical filter comprising in order: an input optical fiber, collimating optics for producing a collimated beam, means to generate an optical path difference between portions of the collimated beam, said means comprising a non-grating diffractive structure, focusing optics, and an output optical fiber, wherein the collimating optics is achromatic.

62. The optical filter of claim 61 wherein the collimating optics is a single lens element.

63. An optical filter comprising in order: an input optical fiber, collimating optics for producing a collimated beam, means to generate an optical path difference between portions of the collimated beam, said means comprising a non-grating diffractive structure, focusing optics, and an output optical fiber, wherein the focusing optics is achromatic.

64. The optical filter of claim 63 wherein the focusing optics is a single lens element.

65. The optical filter of claim 63 wherein the collimating optics is achromatic.

66. The optical filter of claim 65 wherein the collimating optics is a single lens element.

67. A method for spatial redistribution of an optical signal comprising:

(a) propagating the optical signal through a non-grating diffractive structure to form one or more diffracted portions of the signal; and coupling at least one of said one or more diffracted portions of the signal into an output channel;

wherein the non-grating diffractive structure exhibits an optical path difference which in non-zero prior to the application of a control signal.

68. The method of claim 67 wherein at least two diffracted portions of the signal are formed in step (a).

69. The method of claim 67 wherein a non-diffracted portion of the signal is formed in step (a).

70. The method of claim 69 further comprising coupling the non-diffracted portion of the signal into an output channel.

71. The method of claim 67 in which said step of propagating through a non-grating diffractive structure comprises collimating the optical signal.

72. The method of claim 67 wherein the optical signal comprises multiple wavelengths.

* * * * *